US012775955B2

(12) United States Patent
Friesen et al.

(10) Patent No.: US 12,775,955 B2
(45) Date of Patent: Oct. 27, 2026

(54) SYSTEMS AND METHODS FOR FACILITATING COORDINATION OF DRIVE-UP RETURNS

(71) Applicant: Target Brands, Inc., Minneapolis, MN (US)

(72) Inventors: Brett Friesen, Minneapolis, MN (US); Jathin Jayan, Minneapolis, MN (US); Elise Pickett, Minneapolis, MN (US); Mithun Ravindranath, Minneapolis, MN (US); Alec Bakke, Minneapolis, MN (US); Deborah Wiswell, Minneapolis, MN (US); Brianna Johnson, Minneapolis, MN (US); Nicole M. Beckstead, Minneapolis, MN (US); Andria Rambow, Minneapolis, MN (US); Dawn Mackie O'Malley, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 317 days.

(21) Appl. No.: 18/132,578

(22) Filed: Apr. 10, 2023

(65) Prior Publication Data

US 2024/0338711 A1 Oct. 10, 2024

(51) Int. Cl.
*G06Q 30/016* (2023.01)

(52) U.S. Cl.
CPC .................................. *G06Q 30/016* (2013.01)

(58) Field of Classification Search
None
See application file for complete search history.

(56) References Cited

U.S. PATENT DOCUMENTS 11,205,181 B2 12/2021 Agasti et al.
2006/0080133 A1 * 4/2006 Das ........................ G06Q 20/20 705/335

(Continued)

OTHER PUBLICATIONS

Harman, "Target's curbside drive up service to offer Starbucks and returns," Feb. 24, 2022, retrieved Apr. 10, 2023 from URL <https://www.southernminn.com/owatonna_peoples_press/community/targets-curbside-drive-up-service-to-offer-starbucks-and-returns/article_f01f5a2c-95c2-11ec-8653-079cad491b27.html>, 4 pages.

(Continued)

*Primary Examiner* — Rashida R Shorter
(74) *Attorney, Agent, or Firm* — Fish & Richardson P.C.

(57) ABSTRACT

Disclosed are techniques for providing drive-up returns at a retail environment. A method includes receiving, from a customer device, selection of an item to return as a drive-up return, receiving, from the customer device, user input at a later time indicating that a customer associated with the device is on their way to the retail environment, populating a data file with information about the item to return and the customer, including the customer's current location, transmitting, to an employee device, the data file that causes the employee device to display a first graphical user interface (GUI) including a list of drive-up returns for arriving customers, receiving, from the employee device, selection of a control to handle the return for the customer, receiving, from the customer device, user input indicating the customer arrived, and providing, to the employee device, instructions to display a second GUI for performing the drive-up return.

19 Claims, 29 Drawing Sheets

(56) References Cited

U.S. PATENT DOCUMENTS

| | | | | |
|---|---|---|---|---|
| 2007/0187183 | A1 | 8/2007 | Saigh et al. | |
| 2011/0106714 | A1* | 5/2011 | Junger | G06Q 30/016 235/375 |
| 2013/0085889 | A1* | 4/2013 | Fitting | G06Q 30/06 705/26.35 |
| 2016/0247113 | A1* | 8/2016 | Rademaker | G06Q 10/083 |
| 2016/0350757 | A1* | 12/2016 | Bolling | G07F 7/06 |
| 2017/0337509 | A1* | 11/2017 | Veras-Nunez | G06Q 10/087 |
| 2018/0025319 | A1* | 1/2018 | Lievens | G06Q 10/0837 |
| 2021/0133665 | A1* | 5/2021 | Hsiao | G06Q 10/087 |
| 2023/0245215 | A1* | 8/2023 | Subrahmannian | G06Q 30/0635 705/26.64 |
| 2023/0298087 | A1* | 9/2023 | Nelson | G06Q 30/0635 705/26.81 |

OTHER PUBLICATIONS

Twelmeyer, "2021: The Year of the Curbside Return, " Nov. 13, 2020, retrieved Apr. 10, 2023 from URL <https://blog.shipperhq.com/2020/11/curbside-returns-2021/>, 11 pages.

* cited by examiner

SYSTEMS AND METHODS FOR FACILITATING COORDINATION OF DRIVE-UP RETURNS

TECHNICAL FIELD

This document generally relates to architecture of computer systems, communications between computing devices, and graphic user interfaces for eliciting user input.

BACKGROUND

Computing devices are devices that accept data input, process the data, and provide data output using hardware and software. Computing devices can communicate with other computing devices using wired or wireless networks or a combination thereof. For example, computing devices can communicate over the Internet. User interactions with a computing device can cause the computing device to transmit communications to a second computing device, which can cause the second computing device to provide output such as changes to a visual display, sounds, or tactile output. Such output at the second computing device can elicit user input from a user of the second computing device, which can in turn cause the second computing device to transmit one or more communications to the first computing device thereby causing the first computing device to generate additional output.

SUMMARY

This document generally describes a network-based order return and fulfillment system that provides information to one or more user devices that allow users of the user devices to complete drive-up order returns at a fulfillment location (such as a physical store location). The disclosed techniques also provide information to the one or more user devices that allow the users of the user devices to complete drive-up orders at the fulfillment location simultaneously with the drive-up order returns. More specifically, the disclosed techniques provide for coordinating efforts between users, such as store employees and customers, to efficiently fulfill drive-up order returns at the fulfillment location. In general, customers can interact with one or more graphical user interface (GUI) displays presented at their respective user devices to initiate a drive-up return, notify the store employees when they're on their way with the items to be returned, and complete the drive-up return process in a parking lot or other drive-up location associated with the fulfillment location. In general, fulfilling a drive-up return can include scanning, using a user device of an employee, identifiers for items to be returned when a customer arrives in their vehicle at the drive-up location, verifying the items to be returned, completing the drive-up return on the spot at the drive-up location, and completing any additional processes before the customer leaves, such as fulfilling a drive-up order for the customer. Accordingly, the disclosed techniques provide an ability to coordinate drive-up orders with drive-up order return services through easy and user-friendly GUI displays that coordinate drive-up returns for both customers and employees at the fulfillment location.

One or more embodiments described herein can include a system for providing drive-up returns to customers at a retail environment, the system including: a computing system having processors and memory, the computing system being in communication with a group of customer devices and a group of employee devices, the computing system being configured to perform operations including: receiving, from a customer device of the group of customer devices, user input indicating selection of at least one item to return from an order, the user input including selection of a drive-up return for the at least one item, generating a temporary data file to contain information about the at least one item for the drive-up return and customer information associated with the customer device, receiving, from the customer device, user input at a later time indicating that a customer associated with the customer device is on their way to the retail environment for the drive-up return, the later time being within a threshold return-time-window, populating the temporary data file with the information, the information including current location information associated with the customer device, transmitting, to a first employee device of the group of employee devices, the populated data file that, when processed by the first employee device, causes the first employee device to display a first graphical user interface (GUI) including a list of drive-up returns for customers arriving at the retail environment, the list of drive-up returns including the drive-up return for the at least one item of the customer at the customer device, receiving, from the first employee device, user selection of a first control in the first GUI indicating an intention to handle, from the list of drive-up returns, the drive-up return for the at least one item of the customer at the customer device, receiving, from the customer device, user input indicating that the customer has arrived at the retail environment, responsive to receiving the user input indicating that the customer has arrived at the retail environment, providing, to the first employee device, instructions that cause the first employee device to display a second GUI, the second GUI including instructions for the employee at the first employee device to perform the drive-up return for the at least one item at the vehicle of the customer, receiving, from the first employee device, user input indicating completion of the drive-up return for the at least one item, generating return confirmation information indicating that (i) the drive-up return for the at least one item is complete and (ii) a refund has been issued to a payment method of the customer, and providing, to the customer device, the return confirmation information that includes instructions for presenting, in a GUI display at the customer device, a notification that displays at least one of (i) or (ii).

In some implementations, the embodiments described herein can optionally include one or more of the following features. For example, the order can be an online order through an electronic platform having a relationship with the retail environment. The order can be an in-store order performed at a physical retail environment having a relationship with the retail environment. The threshold return-time-window can be 7 days since the customer provided the user input at the customer device to return the at least one item from the order. The threshold return-time-window can be an amount of days remaining in a return window for the at least one item, the amount of days remaining in the return window being counted from a time that the customer provided the user input at the customer device to return the at least one item from the order. The operations further can include: determining an estimated arrival time of the customer based on the current location information in the temporary data file.

Performing the drive-up return for the at least one item can include at least one of (i) scanning, using a scanning device of the first employee device, an item identifier for the at least one item or (ii) receiving, from the first employee device, user input indicating manual entry of an item identification code for the at least one item. The operations can include providing, to the first employee device, instructions that, when executed, cause the first employee device to output a graphical element as partially overlaying a visual indication of the at least one item presented in the second GUI indicating that the at least one item is validated based on at least one of (i) or (ii). The graphical element can be a checkmark.

In some implementations, the operations can include receiving, from the first employee device, user input indicating selection of a graphical element presented with a visual indication of the at least one item presented in the second GUI indicating a cancellation of the drive-up return of the at least one item, and providing, to the first employee device, instructions that, when executed, cause the first employee device to present a pop-out window visually overlaying a portion of the second GUI, the pop-out window including at least one data field for user input indicating a reason for the cancellation of the drive-up return of the at least one item. The graphical element can be a trashcan.

The operations can also include receiving, from the customer device, user input indicating that the customer placed a drive-up order, providing, to the first employee device, instructions that, when processed by the first employee device, causes the first employee device to display a third GUI including a list of drive-up orders for customers arriving at the retail environment, the list of drive-up orders including the drive-up order for the customer at the customer device, receiving, from the first employee device, user selection of a control in the third GUI indicating an intention to prepare, from the list of drive-up orders, the drive-up order for the customer at the customer device, providing, to the first employee device, instructions that, when processed by the first employee device, cause the first employee device to display a fourth GUI, the fourth GUI including indications of one or more order hold locations in retail information and one or more bags associated with each of the one or more order hold locations for the selected drive-up order to be prepared, receiving, from the first employee device, user input indicating identifying information for one or more of the bags associated with the drive-up order, providing, to the first employee device, instructions to update the fourth GUI such that, for each bag associated with the drive-up order to be prepared, the indication is updated from a first indicia to a second indicia based on the respective associated bag having been identified by the identifying information, and providing, to the first employee device, instructions to update the fourth GUI to include a selectable option to complete the preparing of the drive-up order based on a determination that the identifying information for each bag associated with the drive-up order has been received by the computing system. The operations may also include providing, to each of at least a subset of the group of employee devices, information that, when processed by each of the at least the subset of the group of employee devices, causes each of the at least the subset of the group of employee devices to display the third GUI with a list of drive-up orders ready to be delivered, receiving, from a first employee device of the subset of the group of employee devices, an indication of user selection of a control in the third GUI indicating an intention to deliver the prepared drive-up order for the customer, and providing, to each of the subset of the group of employee devices, instructions to update the third GUI to include an indication that the prepared drive-up order for the customer is being delivered by an employee at the first employee device of the subset of the group of employee devices. The operations can include providing, to the first employee device of the subset of the group of employee devices, instructions that, when executed by the first employee device of the subset of the group of employee devices, cause the first employee device of the subset of the group of employee devices to present a notification that includes instructions for (i) delivering the prepared drive-up order at the vehicle of the customer and (ii) performing the drive-up return for the at least one item at a same time as (i). The first employee device of the subset of the group of employee devices is the same as the first employee device of the group of employee devices. The first employee device of the subset of the group of employee devices is different than the first employee device of the group of employee devices. The current location information can include information provided as user input at the customer device, the information provided as the user input including a make and model of the vehicle of the customer, a location in the vehicle from which to pick up the at least one item for the drive-up return.

One or more embodiments described herein can include a system for providing drive-up returns to customers at a retail environment, the system including: a computing system having processors and memory, the computing system being in communication with a group of customer devices and a group of employee devices, the computing system being configured to perform operations including: transmitting, to a customer device of the group of customer devices, first instructions that, when executed by the customer device, cause the customer device to display a list of past orders in a graphical user interface (GUI) display at the customer device, receiving, from the customer device, user input indicating selection of at least one item to return from an order presented in the list of past orders, the user input including selection of a drive-up return option for the at least one item, transmitting, to the customer device, second instructions that, when executed by the customer device, cause the customer device to display return questions in the GUI display for the at least one item selected for the drive-up return, receiving, from the customer device, user input indicating responses to the return questions, generating a temporary data file that contains the user input indicating the responses to the return questions and customer information associated with the customer device, receiving, from the customer device, user input at a later time indicating that a customer associated with the customer device is on their way to the retail environment for the drive-up return, the later time being within a threshold return-time-window, receiving, from the customer device, user input indicating that the customer has arrived at the retail environment for the drive-up return, and responsive to receiving user input from an employee device of the group of employee devices indicating completion of the drive-up return for the at least one item at a vehicle of the customer after the customer arrived at the retail environment, generating return confirmation information indicating that (i) the drive-up return for the at least one item is complete and (ii) a refund has been issued to a payment method of the customer, and providing, to the customer device, the return confirmation information that includes instructions for presenting, in the GUI display at the customer device, a notification that displays at least one of (i) or (ii).

The system can optionally include one or more of the following features. For example, the operations can include responsive to the customer device presenting the list of past orders in the GUI display, receiving, from the customer device, user input indicating selection of the order presented in the list of past orders, transmitting, to the customer device, instructions that, when executed by the customer device, cause the customer device to present a list of items associated with the selected order in the GUI display, and receiving, from the customer device, user input indicating selection of the at least one item to return from the list of items presented in the GUI display. The operations can include, responsive to receiving the user input indicating selection of the at least one item to return from the order presented in the list of past orders, transmitting instructions that, when executed by the customer device, cause the customer device to present a list of selectable return options in the GUI display, the list of selectable return options including the drive-up return option, an in-store return option, and a mail-in return option. The return questions can include a question prompting the customer at the customer device to verify that they have an item identification label for the at least one item. The return questions can include a question prompting the customer at the customer device to provide user input indicating selection of a retail environment location for performing the drive-up return for the at least one item. The selected retail environment location for performing the drive-up return for the at least one item can be different than the retail environment where the at least one item was purchased. The selected retail environment location for performing the drive-up return for the at least one item can be the same as the retail environment where the at least one item was purchased. The operations can also include: transmitting, to the customer device, instructions that, when executed by the customer device, cause the customer device to present a list of retail environment locations for performing the drive-up return for the at least one item, the list of retail environment locations including: at least one recently visited retail environment, at least one retail environment that is a threshold distance away from a current or last known location of the customer device, and at least one retail environment that is the threshold distance away from the current or last known location of the customer device that does not allow drive-up returns.

In some implementations, the return questions can include at least one question prompting the customer at the customer device to provide user input indicating at least one reason for performing the drive-up return for the at least one item. The return questions can include a question prompting the customer to select an option to receive a replacement item for the at least one item or a refund to an original electronic payment method of the customer. The at least one item can be part of an order that was placed, by the customer, online using the customer device. The at least one item can be part of an order that was placed, by the customer, in the retail environment. The operations can also include, responsive to receiving, from the customer device, user input indicating responses to the return questions, transmitting, to the customer device, return information for presentation in the GUI display, and receiving, from the customer device, user input indicating confirmation of the return information. The operations further can include: responsive to receiving, from the customer device, user input at a later time indicating that the customer is on their way to the retail environment for the drive-up return, transmitting, to the customer device, instructions that, when executed by the customer device, cause the customer device to present a map with the retail environment in the GUI display of the customer device.

Sometimes, the return confirmation information can be generated and returned to the customer device in real-time. The return confirmation information can be generated and returned to the customer device in near real-time before the customer leaves the retail environment. The operations further can include: receiving, from the customer device, user input indicating selection of an item for a drive-up order pickup, transmitting, to the customer device, instructions that, when executed by the customer device, cause the customer device to present, in the GUI display, (i) an indication that the item is ready for the drive-up order pickup and (ii) a reminder to bring the at least one item for the drive-up return. The user input indicating that the customer is on their way can include: an indication of a make and model of the vehicle of the customer and an indication of a location in the vehicle where the at least one item for the drive-up return is located. The user input indicating that the customer has arrived can include user input indicating a parking space or location outside the retail environment where the vehicle of the customer is parked. The operations further can include: receiving, from the customer device, user input indicating cancellation of the drive-up return for the at least one item, and deleting the temporary data file responsive to receiving the user input.

The devices, system, and techniques described herein may provide one or more of the following advantages. For example, the disclosed techniques provide for reducing monetary and time costs associated with returning items by mail, thereby decreasing supply chain impact of high return volumes in some scenarios. Drive-up returned items may also be reinserted into stock at the fulfillment location rather than having to be processed at a shipping facility, thereby improving in-store stock options by optimizing profitability of merchandise items and overall efficiency in replenishment efforts. Therefore, the disclosed techniques can meet customer demand for safe and easy return services by also extending a growing fulfillment channel to support reverse logistics.

The disclosed techniques also provide for streamlining a shopping experience by combining order pickups and returns using drive-up services. This combination of drive-up services can reduce an overall amount of time, resources, and costs incurred by both customers and employees during a shopping experience. Moreover, the disclosed technology provides user-friendly GUI displays at both customer and employee user devices to facilitate seamless and efficient execution of drive-up returns and/or the combination of drive-up orders and returns.

Additionally, the disclosed techniques provide streamlined communications between user devices operated by customers and employees working at fulfillment locations and an order fulfillment system can reduce the amount of time spent interacting with the user devices, thereby reducing power consumption and improving battery life of the user devices. Additionally, by streamlining communications while providing for computer network-based returns, ordering, and drive-up services, the disclosed techniques can reduce the amount of communications to and from user devices, thereby reducing bandwidth usage of one or more communications networks and freeing up communications bandwidth for other purposes.

Additionally, user interface elements described herein can reduce physical interaction and physical proximity between customers and employees in a retail environment thereby reducing risk of spread of communicable, airborne diseases. Additionally, unique user interface elements at the user devices described herein can improve user experiences, thereby leading to improved outcomes with respect to efficiency and accuracy of both user interactions with the user devices and fulfillment of drive-up returns and optionally drive-up orders in combination with drive-up returns.

The disclosed techniques further can provide for dynamically updating information presented at user devices of the employees in the fulfillment location such that the employees can be aware of the status of drive-up return activities. Information can be updated at the user devices in real-time or near real-time, so that drive-up return activities, and optionally drive-up order fulfillment activities as well, can be efficiently claimed and addressed by the employees. This can increase efficiency in fulfillment of the drive-up returns and/or drive-up orders and can prevent or otherwise mitigate potential that more than one employee will try to claim one or more of these activities at the same time. As a result, drive-up orders and/or drive-up returns can be completed more efficiently and on time so that customers may arrive at the fulfillment location and not wait for extended periods of time while their drive-up returns are being completed and potential drive-up orders are being prepared, staged, and delivered.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to systems, methods, and techniques for allowing customers to return previously purchased items using drive-up order return services at fulfillment locations, such as physical stores or other types of retail environments, warehouses, storage facilities, etc. For example, a customer can access their previous order information in a GUI display presented at their user device and indicate that they would like to return a previously purchased item. The customer can select an option to perform a drive-up return, then click through a process of steps to start a drive-up return process for the item(s) at a retail environment of the customer's choice or a recommended retail environment offering drive-up return services. For employees of the retail environment offering the drive-up return services, an employee's user device can include drive-up returns in a same feed as drive-up purchase orders, with returns being marked as returns and drive-up purchase orders being marked as order pickups. The customer can make a drive-up order and drive-up return at the same time. In such cases, the customer's order, as appearing at the employee's user device, can indicate that the customer also has a return (along with a number of items being returned). The employee can click through the order to see details about the item(s) to be returned so that the employee can make an appropriate visual inspection of the item(s) upon return during the drive-up service. Upon successful retrieval of the returned item(s) from the customer's vehicle during the drive-up service, the employee can select a "complete return" control on their user device, which initiates a refund to the customer's original payment method. As a result, the drive-up return can be completed and the refund can be issued on the spot, before the customer leaves the retail environment. The drive-up return can also be completed simultaneously with the drive-up order, thereby improving the overall customer experience.

Figure 1:
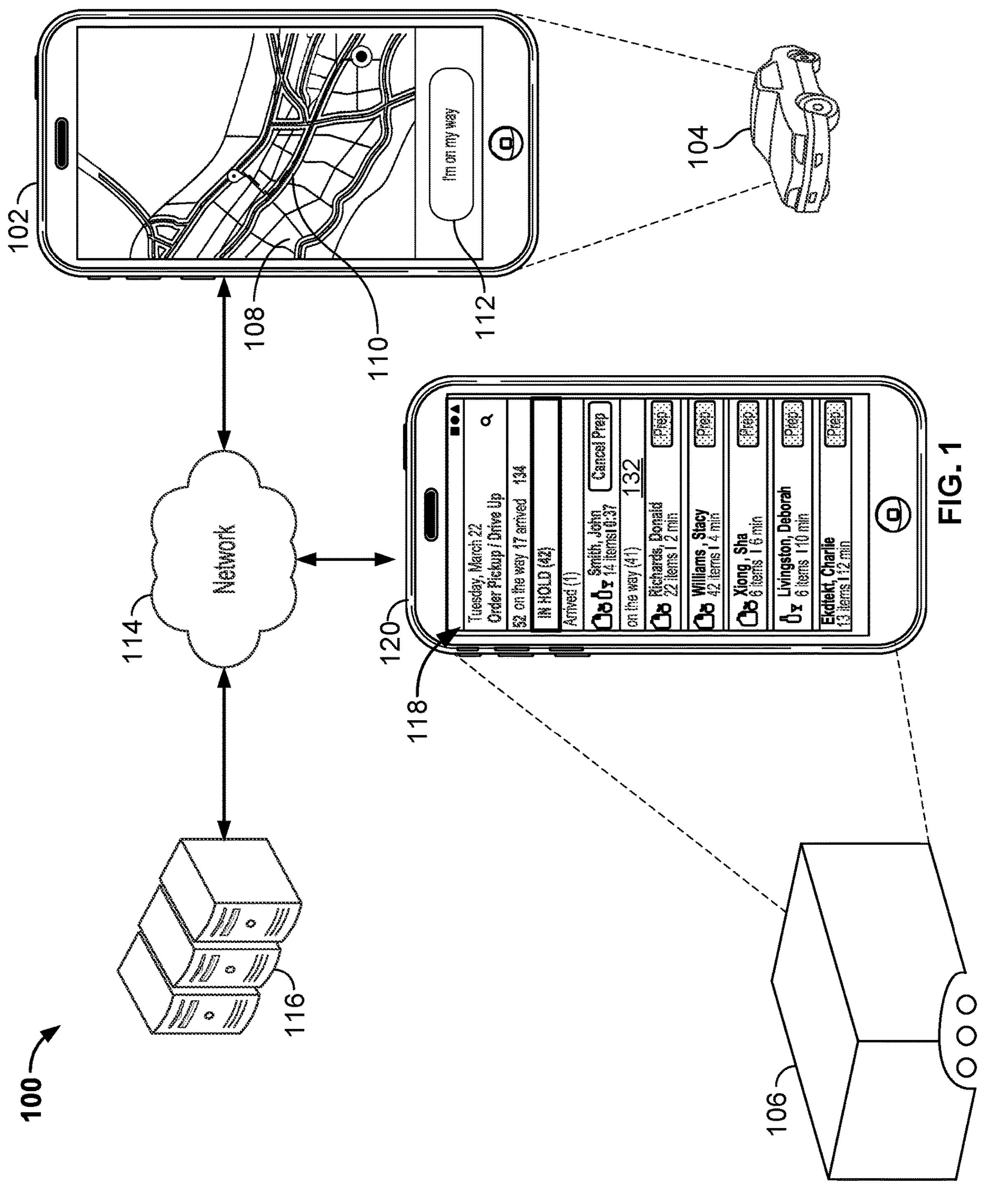
FIG. 1 is diagram of an example system for facilitating drive-up order return and fulfillment.

Referring to the figures, FIG. 1 is a diagram of an example system 100 for facilitating order return and fulfillment for drive-up by customers. In the system 100, a customer who wishes to complete a return for items by returning the items using a drive-up service at a retail environment can access a dedicated application executing on a mobile user device 102. The user device 102 can be, for example, a mobile phone, a tablet device, a touch screen computer, a laptop computer, a PDA, a smart watch, or other mobile device. In some implementations, instead of accessing a dedicated application executing on the user device 102, the customer can use a browser of the user device 102 to access a website that provides the below described functionality. Therefore, descriptions related to use of the dedicated application apply equally to a web-based implementation.

The customer can use the dedicated application presented at their user device 102 to select items to return using a drive-up return service at a particular retail environment. For example, the dedicated application can be a grocery shopping application that allows the customer to place orders as well as return items in previously-made orders. As an illustrative example, the dedicated application can permit the customer to search and/or browse for grocery items, add desired items to a virtual shopping cart, place an order for the selected items by entering payment information. The customer can select an option to have the items delivered to an address of their choosing or pick up the items at the retail environment (e.g., using the drive-up services). The customer can also use the dedicated application to access one or more previously entered orders and return one or more items associated with those orders.

The user device 102 can communicate with other computing devices through a network 114, such as, for example, the Internet. For example, the user device 102 can communicate with a network access point such as a WiFi router or a cellular communication tower to access the network 114 and communicate with other computing devices. For example, the user device 102 can communicate with a server system 116 consisting of one or more servers to place an order and/or initiate a return of one or more items from a previously-made order. Alternatively, or additionally, the customer can use a different computing device to place the order and the different computing device can communicate through the network 114 with the server system 116. The server system 116 can be affiliated with a retailer and process returns from the user device 102 or another computing device. The server system 116 can facilitate completion of a drive-up return by providing details about the item(s) to be returned, such as the items, identity of the customer, an order number, time that the order was placed, etc. to one or more user computing devices located at the retail environment, such as a store 106.

As an illustrative example, the store 106 can be part of a chain of affiliated stores associated with a retailer and the server system 116 can be a server system associated with the retailer. Upon receiving a drive-up return request from the customer, the server system 116 can identify the store 106 as an appropriate location for the drive-up return based on information such as, an indication of a preferred location for fulfillment indicated by the customer at the user device 102 or another computing device, a current location of the user device 102, another location associated with the customer (e.g., home or work address information entered by the user into a customer profile), or based on a combination of these and one or more other factors.

Accordingly, the server system 116 can transmit information about the drive-up return to a user device 120 in the possession of, or being used by, a user such as an employee of the store 106. The user device 120 can be a mobile computing device, such as, for example, a mobile phone, a tablet device, a touch screen computer, a laptop computer, a PDA, a smart watch, or other mobile device. In some implementations, the user device 120 can be a non-mobile or semi-mobile device such as a server, a desktop computer, a cash register, a smart TV, or other computing device. The server system 116 can provide appropriate information for the drive-up return to the user device 120, such as items expected to be returned, identifying information for the customer who initiated the drive-up return, information associated with a drive-up order placed by the customer at the user device 102, and other relevant information.

As described herein, the customer can specify that they would like to return the items using drive-up return services offered at the store 106. A drive-up return allows the customer to drive to the store 106 where the employee at the user device 120 can meet the customer at the customer's vehicle 104, verify that the customer is returning the proper/expected items, and complete the return process by issuing a refund to the customer's original form of payment without the customer being required to exit their vehicle 104 or enter the store 106. For example, the customer can travel to the store 106, park in a designated area of the parking lot of the store 106, notify an employee that they have arrived using the dedicated application presented at their user device 102, and then return the items to the employee when the employee approaches the vehicle 104.

When pursuing drive-up return services, the customer can begin to travel to the store 104. Information collected or generated by the user device 102 can be used to determine that the customer has begun to travel to the store 106. For example, location information determined by the user device 102, as described above, can be used to determine that the user device 102 has begun to travel along a route 110. The dedicated application can receive location information for the user device 102 over sequential periods of time (e.g., every 2 seconds) and compare movement of the user device 102 based on the changing location information to the route 110 to determine that the customer has begun to travel along the route 110. Alternatively or additionally, the customer can select a user interface control 112 provided by the dedicated application at their user device 102 to indicate that they have begun traveling to the store 106. For example, the customer may have selected a permissions setting to not allow the dedicated application to access location information for the user device 102. In some implementations, the dedicated application will only display the user interface control 112 in situations in which the customer has not permitted the dedicated application to access location information for the user device 102. As another example, the user device 102 may be unable to accurately determine its location, for example, due to tall buildings interfering with GPS signals or due to lack of wireless communications access points in the area around the user device 102. The dedicated application can provide the user interface control 112 when the user device 102 is unable to accurately determine the location of the user device 102 so that the customer can indicate that they have begun to travel toward the store 106.

Upon determining that the customer has begun to travel toward the store 106 (e.g., based on location information collected by the user device 102 or based on user interaction with the user interface control 112), the user device 102 can communicate with one or more computing devices located at and affiliated with the store 106, either directly through the network 114 or by communicating with the server system 116, which in turn communicates appropriate information and instructions to the one or more computing devices located at the store 106. For example, an employee of the store 106 can use their respective user device 120, which can receive information relevant to the order from the server system 116. The user device 102 can communicate with the server system 116 over the network 114 to indicate to the server system 116 that the customer has begun to travel toward the store 106. The server system 116 can then provide a communication to the user device 120 of the employee to update information presented at the user device 120 indicating that the customer of the user device 102 is on the way. This information can be useful when the customer also has a drive-up order that can be fulfilled at the same time as the drive-up return.

The server system 116 may communicate directly with the user device 120 through the network 114 or may communicate with a computing device/system located at the store 106, which then communicates with the user device 120, e.g., through a wireless or wired local area network (LAN). In some implementations, the server system 116 or a central computing device located at the store 106 can communicate with the user device 120 and one or more other computing devices in possession of other employees of the store 106 to allow multiple employees to receive information on on-line orders placed by customers and coordinate efforts to fulfill such orders.

The server system 116 can provide additional information along with this notification or prior to sending the notification that the user is on the way. For example, the server system 116 can provide vehicle identification information to the user device 120 to allow the employee to more easily identify the customer's vehicle 104 when the customer has arrived at a designating drive-up location at the store 106. The server system 116 can also provide information on an estimated time of arrival and/or an estimated time until arrival for the customer. Such timing information can be used by employees at the store 106 to prioritize which orders to prepare and/or which drive-up returns should be performed.

Figure 2A:
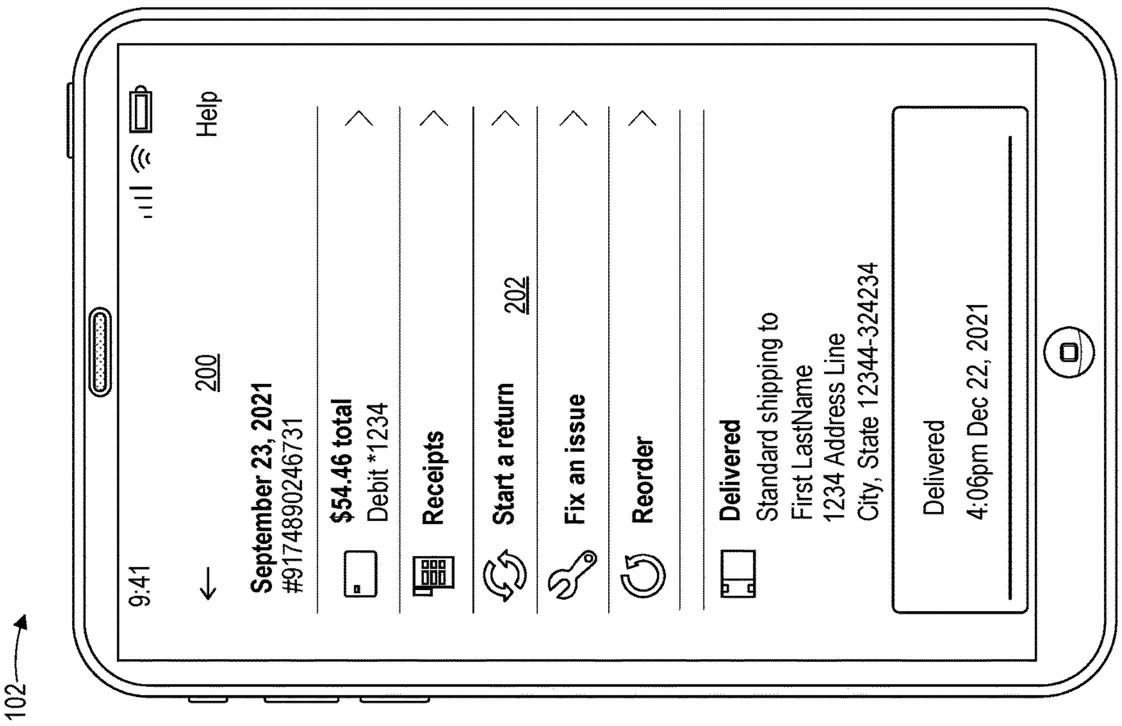
Figure 2U:
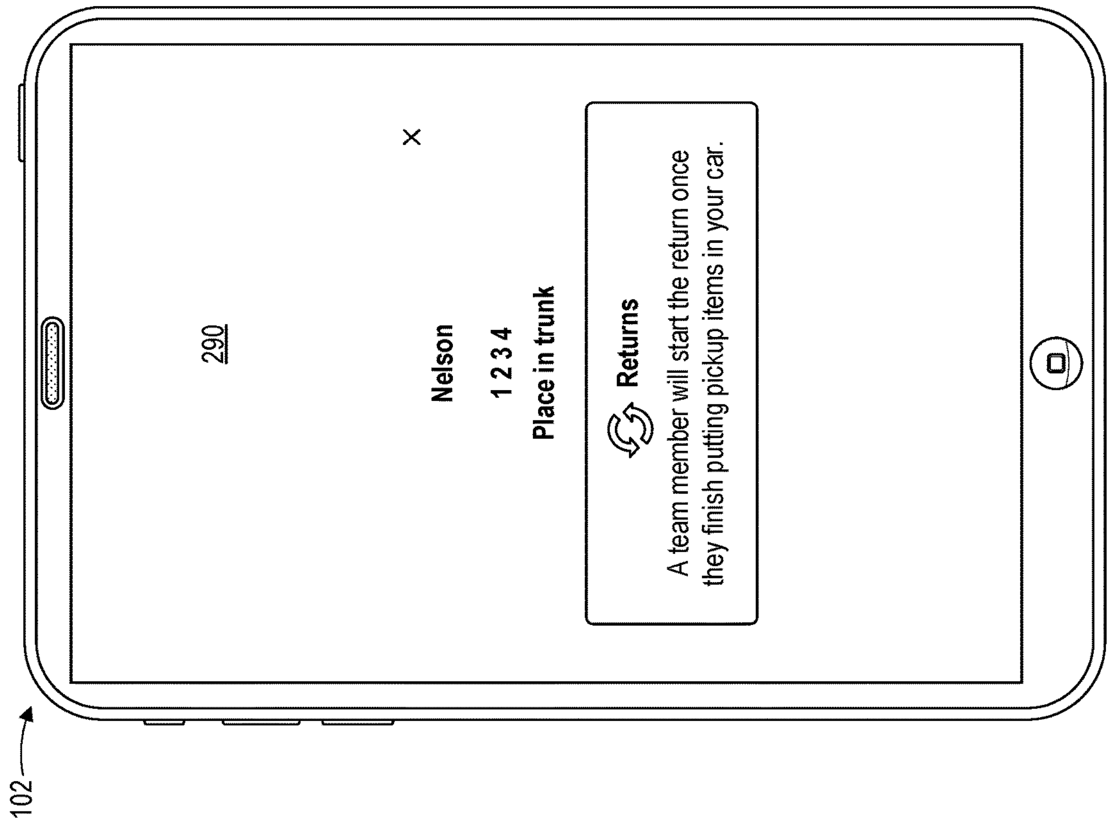
Figures 3A, 3B:
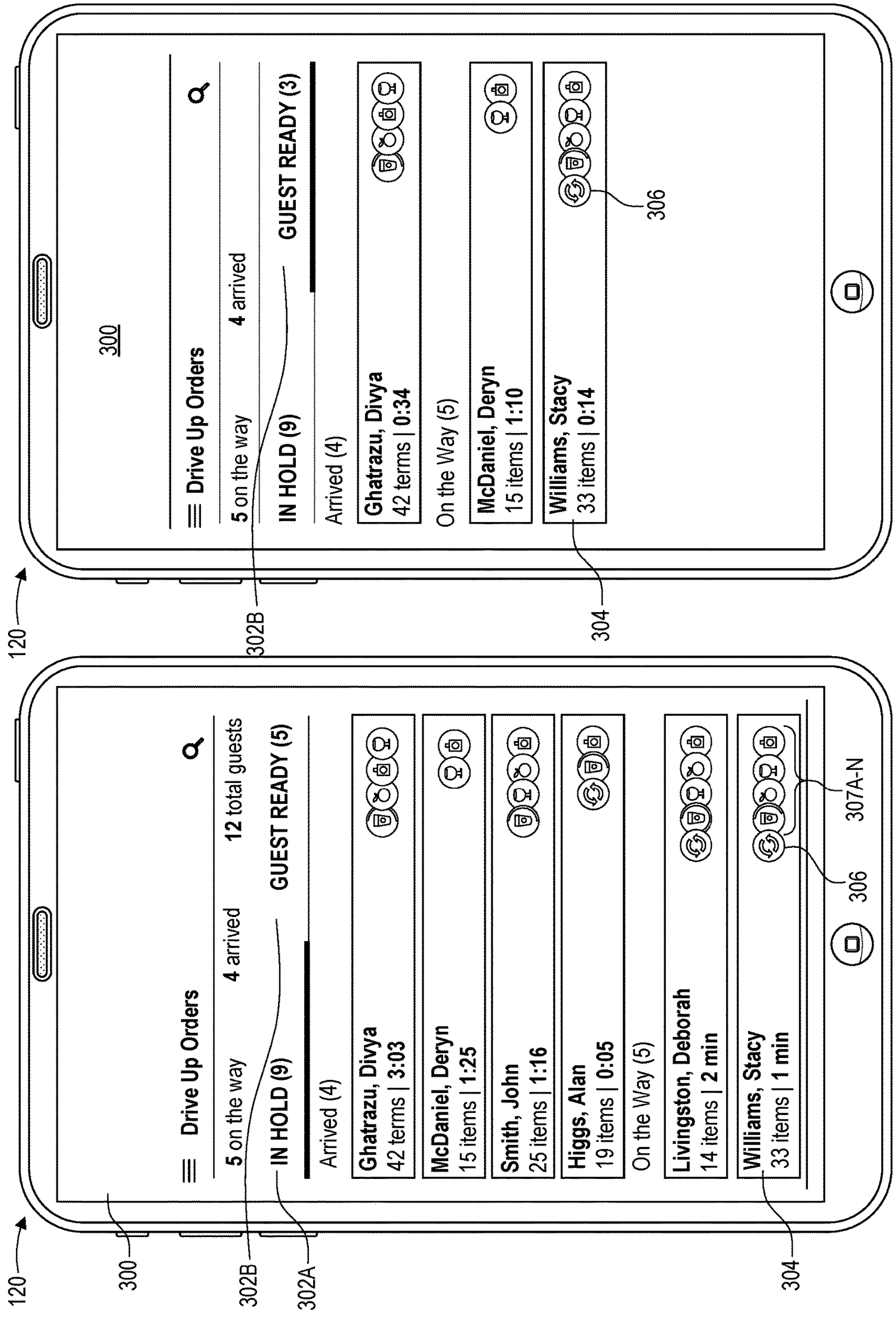
FIGS. 3A-Q show example GUI displays presented at an employee user device for drive-up return services.

The user device 120 includes a GUI 118, or user interface. The GUI 118 can, for example, be a user interface for another dedicated application executing on the user device 120 or another instance of the same dedicated application that is executing on the user device 102. The GUI 118 can include a list of drive-up returns to be completed at the store 106. The GUI 118 can also include, in a same list or a different list, drive-up orders to be prepared and delivered (e.g., fulfilled). Sometimes, as described further below, a drive-up return and a drive-up order for a particular customer can be consolidated in the list presented at the GUI 118. As a result, both services can be handled by the employee at the user device 120 to ensure that the customer experiences a streamlined and efficient drive-up service upon their arrival at the store 106. Refer to FIGS. 3A-Q for further discussion about embodiments of the GUI 118 that can be presented at the user device 120 of the employee at the store 106. Refer to FIGS. 2A-U for further discussion about GUIs that can be presented at the user device 102 of the customer.

In some implementations, the user device 120 can receive a notification, from the server system 116, that the customer is on their way to the store 106. The notification can include an order number for the customer's drive-up return and an indicator of the estimated time until the customer arrives at the store 106. In some implementations, the employee can select the notification or a control displayed as part of the notification to cause the user device 120 to display a page of the mobile application described herein that includes additional details about the item(s) to be returned, the customer, a drive-up order that may be associated with the customer, or related info. Upon the customer's arrival at the store 106, the employee can retrieve the item(s) to be returned, scan an identifier associated with the item, confirm that the item is the expected item for return, and complete the drive-up return process by issuing a refund to the customer's payment method while the customer is still in their vehicle 104 in the designated drive-up location at the store 106. As described further below, the employee may also complete a drive-up order pickup for the customer while the customer is in their vehicle 104 in the designated drive-up location at the store 106.

FIGS. 2A-U show example GUI displays presented at a customer user device 102 for drive-up return services. FIG. 2A shows a GUI 200 that presents order details for a particular order that was previously made by the user. For example, the order could have been made online, using the dedicated application described herein or on a web browser of the user device 102 or another computing device. The order could also have been made in-person at a retail environment, such as the store 106 in FIG. 1. When the order is made at the retail environment (e.g., the customer shops in the retail environment then pays for their shopped items at a cash register and/or self-checkout station, the customer picks up an order in the retail environment, the customer performs a drive-up order at the retail environment), the order can be linked to an online account or other user account associated with the customer. As a result, the customer can access information about their orders, for both online and in-store orders, from their user device 102.

Still referring to FIG. 2A, the GUI 200 can include, for the customer-selected order, a return option 202 (e.g., control, button). The customer can select the option 202 to begin or otherwise initiate a return of one or more items in the customer-selected order. The GUI 200 can also present other information about the customer-selected order, including but not limited to a date that the order was made, an order number, a total cost of the order, an order receipt, an option to fix an issue with the order or items in the order, an option to reorder one or more items in the order, and delivery or other status information about the order.

Figure 2B:
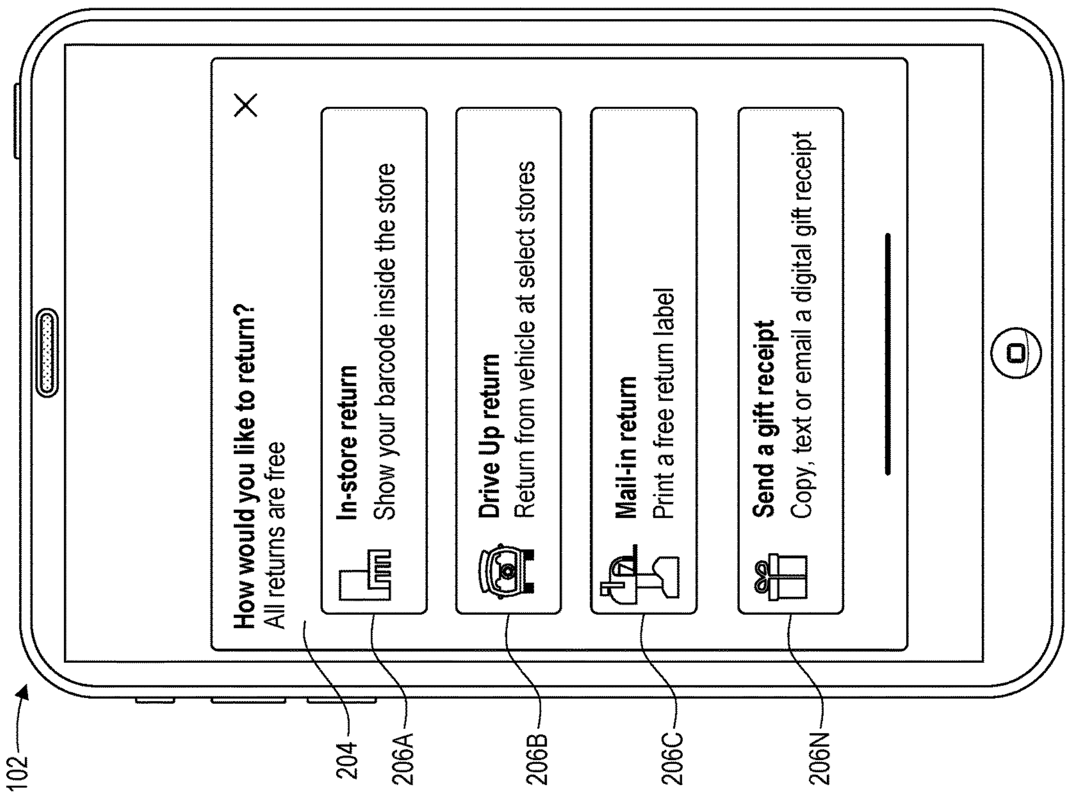
FIGS. 2A-U show example GUI displays presented at a customer user device for drive-up return services.

Selection of the return option 202 in the GUI 200 can cause the user device 102 to present GUI 204, which is depicted in FIG. 2B. The GUI 204 can present options 206A-N for the customer to choose how they would like to perform their return. The option 206A can be selected by the customer to begin an in-store return. The option 206B can be selected to begin a drive-up return, as described herein. The option 206C can be selected to begin a mail-in return. The option 206N can be selected to send a gift receipt for at least one item in the customer-selected order to another user.

Figure 2D:
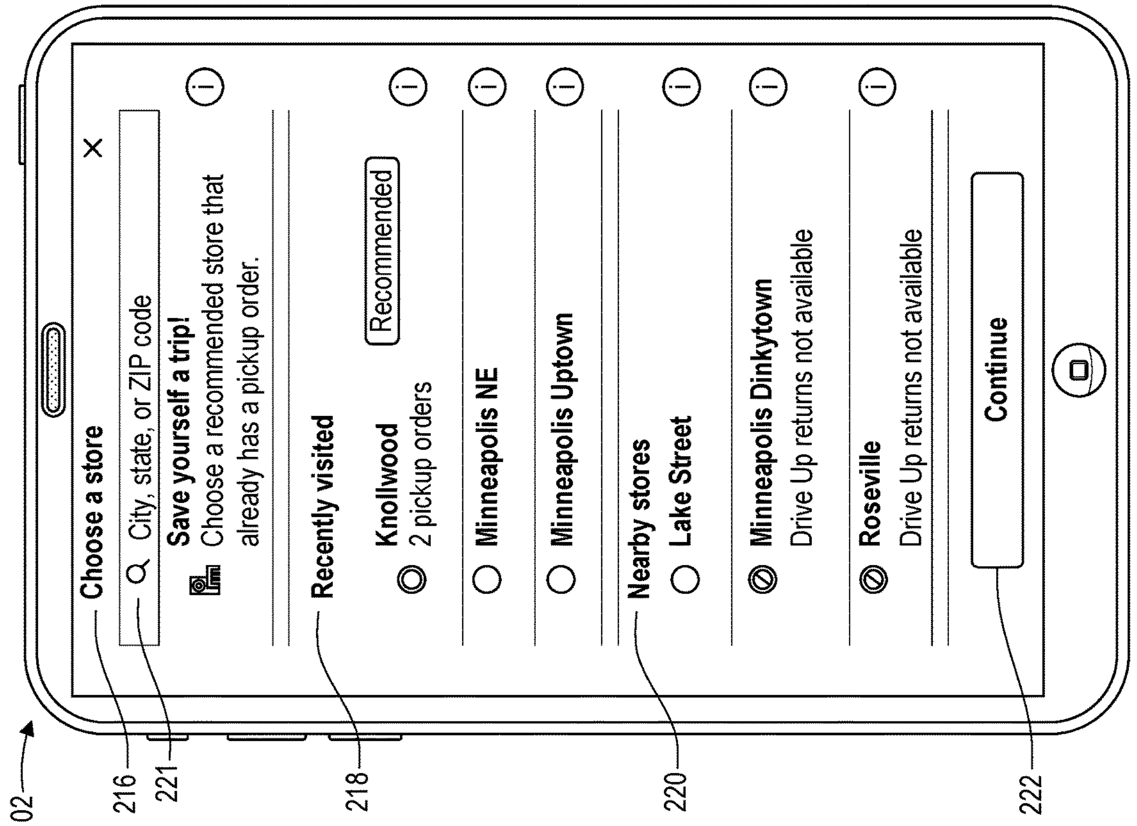
Figure 2C:
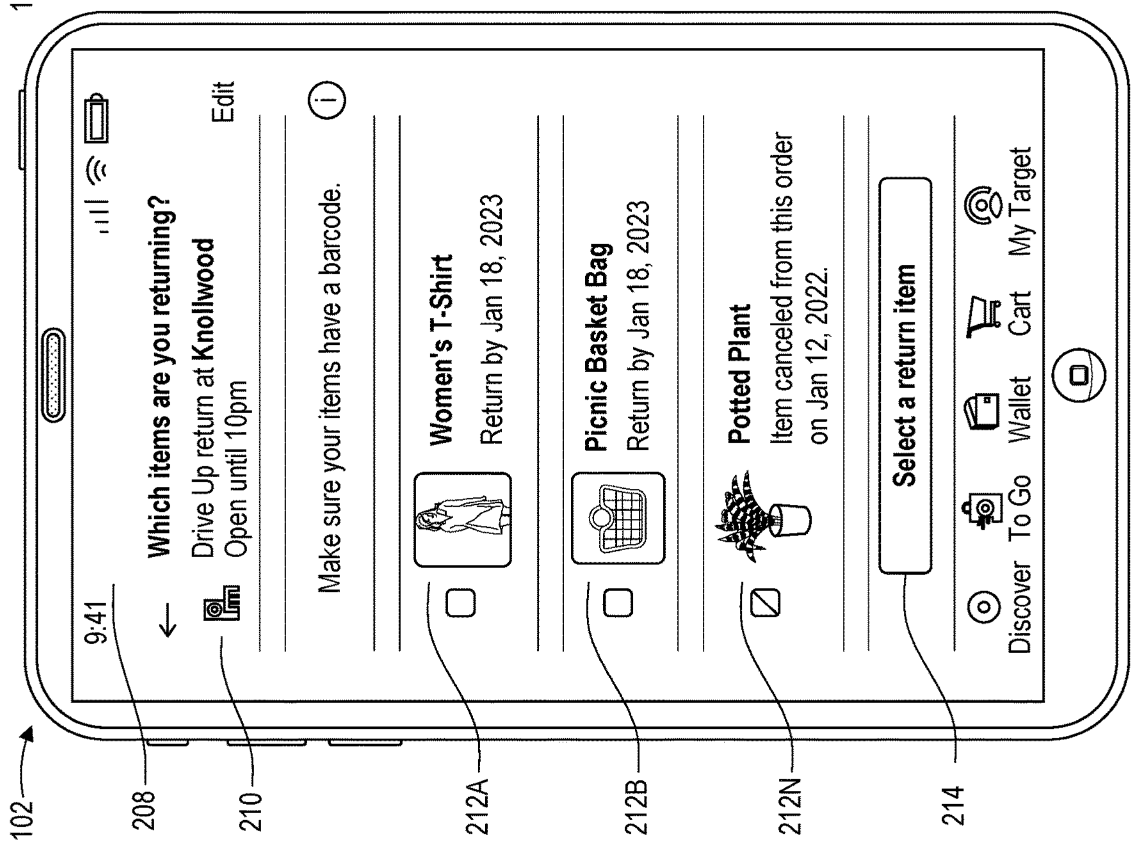

Selecting the drive-up return option 206B in the GUI 204 can cause the user device 102 to present GUI 208, which is depicted in FIG. 2C. The GUI 208 can present options for the user to select which retail environment they would like to go to for the drive-up return and what items in the customer-selected order they would like to return. For example, the GUI 208 includes a data field 210, which indicates which retail environment the drive-up return is to be performed at. The customer can select the data field 210, or a control (e.g., option, button) presented with or in the data field 210, to view another GUI for selecting the retail environment of the customer's choice. Refer to FIG. 2D for further discussion about selecting the retail environment for performing the drive-up return. In some implementations, the information presented in the data field 210 can also be presented in a separate GUI, notification, and/or pop-out window. In some implementations, the information presented in the data field 210 is presented in a separate GUI displayed prior to or subsequent to the GUI 208.

The GUI 208 also presents items 212A-N in the customer-selected order, including items that can be returned (e.g., the items are returnable under the retail environment's return policy, the items can still be returned within a return window that has not yet expired) and items that may not be returned (e.g., items that are excluded from the retail environment's return policy, items whose return window has expired). For example, the items 212A and 212B are customer-selectable and can still be returned while the item 212N is not returnable. In the example of FIG. 2C, the item 212N is not returnable because the item was cancelled from the order. In other examples, perishable items may have a shortened return window or may be unavailable to be included in a return.

The items 212A-N are presented with respective item information in the GUI 208, such as an item name/title, item identifier, an image of the item, an indication of how long the customer has to return the item, and/or a reason why the item cannot be returned or no longer can be returned. The items 212A-N can also be presented with other relative item information. In some implementations, the customer can select any of the items 212A-N in order to view an item page in a GUI presented at the user device 102. The customer can therefore view more information about the selected item at their user device 102. Each of the items 212A-N can also be presented with an option for selecting the item to be returned. The option can be a checkbox, radio button, or other type of control or button. By selecting the option associated with at least one of the items 212A-N, the customer is indicating their intent to return the associated item(s) via drive-up return. As shown in FIG. 2C, the option can also be greyed out, have an 'x' overlaying it, or otherwise un-selectable if the associated item cannot be returned. Therefore, the option presented with the item 212N is crossed out and the customer cannot select the option to try and return the item 212N.

Figures 2E, 2F:
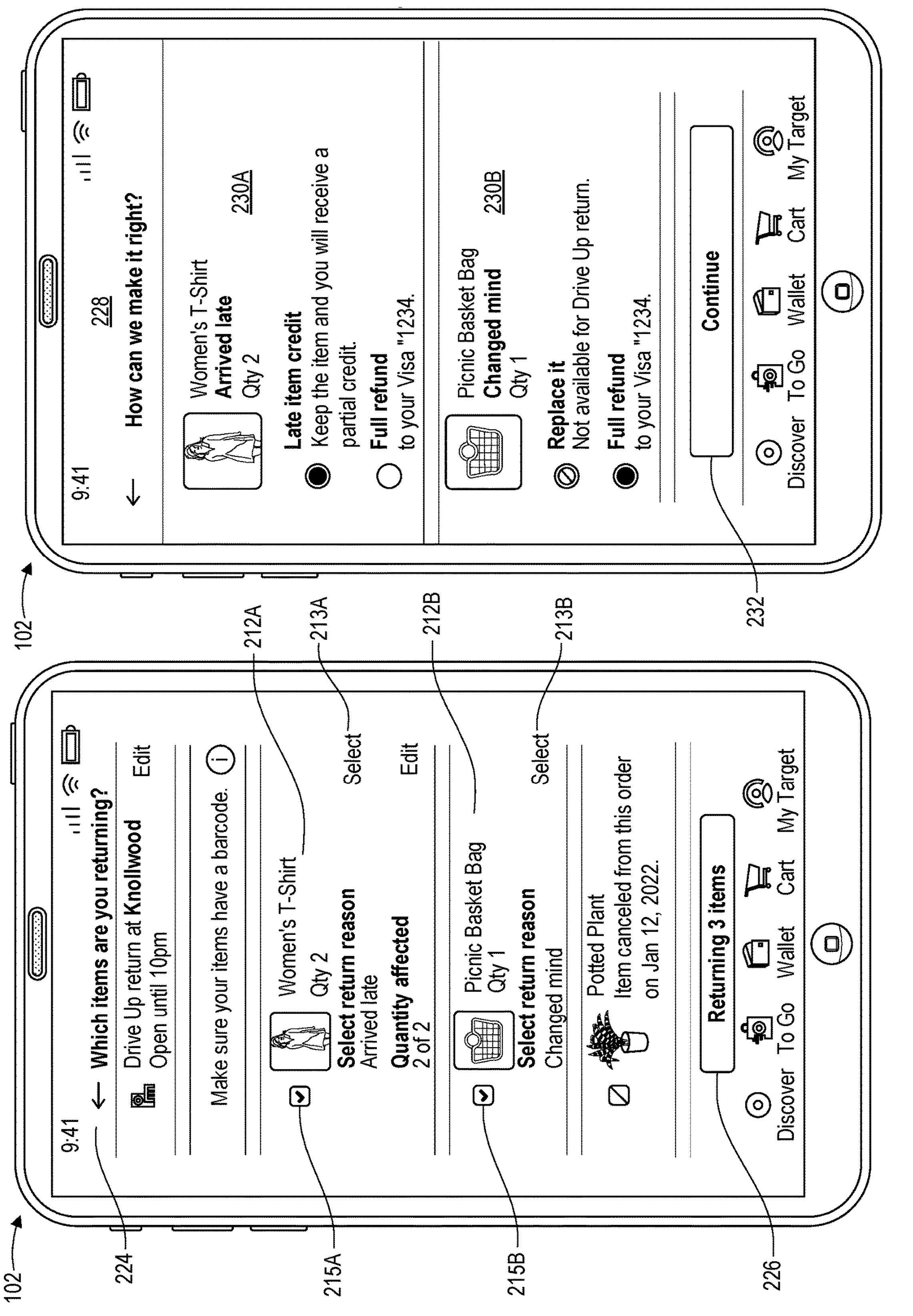
Figure 2H:
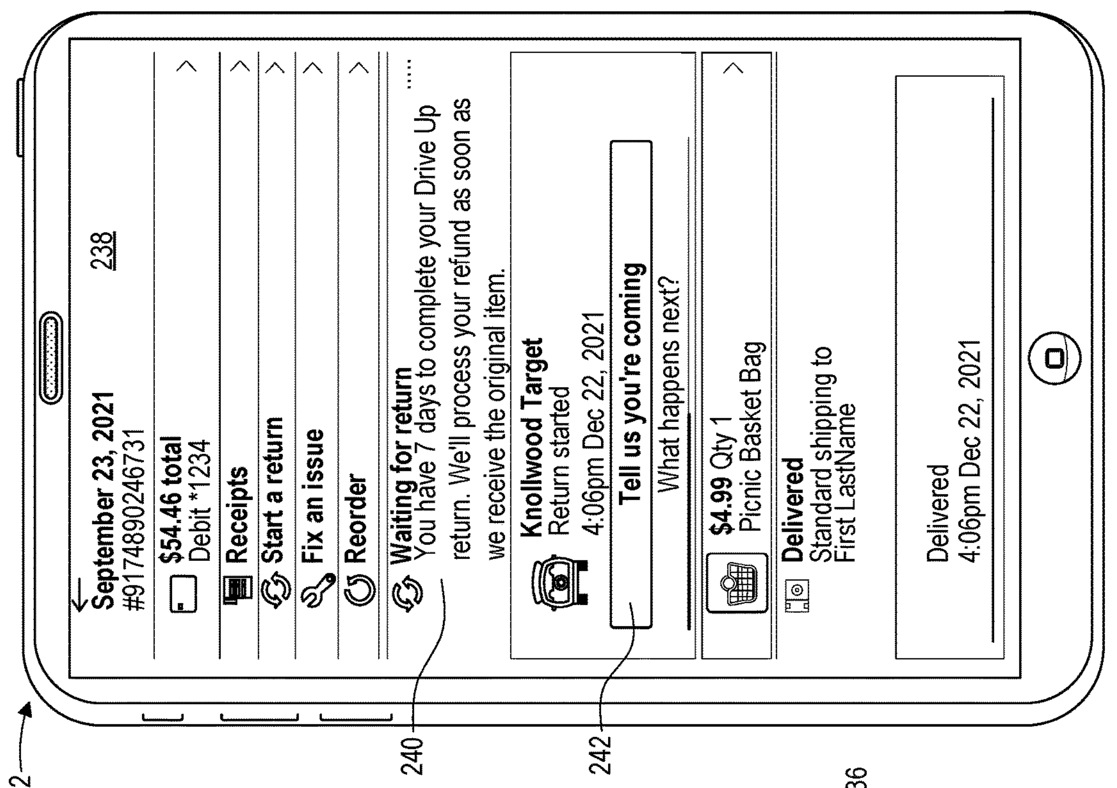

The GUI 208 can also present an option 214 indicating that the customer should "select a return item." The customer can accordingly select the option next to one or more of the items 212A-B presented in the GUI 208. Once the customer selects the option for at least one of the items 212A-B, the option 214 can be updated to indicate "Returning [X] items," where X can indicate a total quantity of items to be returned. Refer to FIG. 2E for further discussion about the option 214 dynamically updating based on the customer selection of the items 212A and/or 212B in the GUI 208.

Selection of the data field 210 to change the retail environment at which the customer desires to perform the drive-up return can cause the user device 102 to present GUI 216, which is depicted in FIG. FIG. 2D. The GUI 216 presents options and data fields for the customer to identify their desired retail environment for the drive-up return. For example, the GUI 216 can present a list 218 of recently visited retail environments. The list 218 can include a selectable option (e.g., radio button, check box, control, other type of button) with each of the recently visited retail environments. The customer can select the option for one of the recently visited retail environments to provide an indication that the customer desires to perform the drive-up return at that retail environment. In some implementations, one or more of the retail environments in the list 218 (or list 220 described below) can be presented with an indication that the retail environment is recommended for the drive-up return.

The list 218 of recently visited retail environments can be generated by the server system 116 described in reference to FIG. 1. For example, the server system 116 can identify previously-made orders of the customer and retail environments where at least a threshold quantity of those orders had been made. As another example, the server system 116 can identify at least one retail environment where most of the customer's orders had been made. In some implementations, the server system 116 can identify the recently visited retail environments by the customer (or a threshold quantity of the recently visited retail environments by the customer) based on GPS or other location information provided by the user device 102 and/or other computing devices at each of the respective retail environments. Refer to FIG. 1 for further discussion about receiving and using location information to perform the disclosed techniques. The server system 116 can implement machine learning techniques and models to learn patterns of behavior of the customer and therefore identify which retail environments are most commonly frequented by the particular customer.

The GUI 216 can also present a list 220 of nearby retail environments. Like the list 218, the list 220 can also include selectable options with the nearby retail environments, thereby allowing the customer to select one of the retail environments in the list 220 for the drive-up return. In some implementations, one or more of the retail environments in the list 220 (or the list 218) can be presented with an indication that the retail environment does not provide drive-up return services. As a result, the option presented with those retail environments may not be user-selectable.

The list 220 of nearby retail environments can be generated by the server system 116 described in reference to FIG. 1. For example, the server system 116 can receive current location information or last-known location information from the user device 102. The server system 116 can then identify at least one retail environment that is within a threshold distance from the received location information and present that retail environment in the list 220. The server system 116 can also prompt the customer at the user device 102 to provide information about their current location (such as if the customer turns off location-sharing services at their user device 102) or another location where the customer plans on being later in the day, which can then be used by the server system 116 to determine at least one retail environment that is within the threshold distance of the customer.

In some implementations, the customer may also manually input a retail environment of their choice based on providing input to a search bar 221. The input can include a name of the retail environment, a general location of the retail environment, a city of the retail environment, a state, and/or a zip code.

Once the customer selects one of the retail environments presented in the GUI 216, the customer can select option 222 (e.g., button, control) to "continue." Selecting the option 222 can cause the GUI 208 described in FIG. 2C to be presented at the user device 102. In some implementations, if the customer has already selected at least one of the items 212A-N for the drive-up return in the GUI 208, then selecting the option 222 can cause GUI 224 to be presented at the user device 102, which is described in reference to FIG. 2E.

The GUI 224 of FIG. 2E can be presented as a result of the customer selecting at least one of the items 212A-N in the GUI 208 (see FIG. 2C) and/or the customer selecting the continue option 222 in the GUI 216 (see FIG. 2D). The GUI 224 is an updated version of the GUI 208. In other words, the GUI 224 can present similar or same information as the information presented in the GUI 208 along with new information. For each of the items 212A and 212B that the customer selected to return in the GUI 208, respective return reasons 213A and 213B are presented in the GUI 224. The customer can provide input at the user device 102 to select the return reason 213A for the item 212A and the return reason 213B for the item 212B.

Providing the return reasons 213A and 213B at this stage of the drive-up return process flow can advantageously lead to better and more accurate response rates about why the items are being returned in comparison to asking the customer why they are returning the items at the moment that the return is being performed. The customer-provided return reasons 213A and 213B can also be transmitted by the user device 102 to the server system 116 described herein, which can use the return reasons 213A and 213B to automatically determine and keep track of what items are being returned. The server system 116 can also use the return reasons 213A and 213B to proactively and automatically determine how to route the customer's return items throughout a fulfillment system upon receipt of the returned items (e.g., by routing the returned items to a warehouse or other storage facility, a liquidation system, back onto a floor of the retail environment, etc.). In some implementations, the user is not required to provide a return reason for the selected items. In some implementations, the user is required to provide a return reason for each selected item prior to proceeding through the return process.

In some implementations whether the customer purchased multiple quantities of one of the items 212A and 212B, the customer can also provide user input indicating how many of the total quantity of the item 212A and/or the item 212B the customer desires to return.

In the example of FIG. 2E, a checkmark 215A is presented as the option for the item 212A, indicating that the customer selected the item 212A for the drive-up return. The customer has also made a selection of the return reason 212A as "arrived late," and a quantity affected as 2 out of the total of 2 items 212A that the customer had purchased. A checkmark 215B is also presented as the option for the item 212B, indicating that the customer selected the item 212B for the drive-up return. The customer has also made a selection of the return reason 212B as "changed mind." Here, since the customer only purchased 1 of the item 212B, the customer cannot select a total quantity of the item 212B affected for the drive-up return.

Moreover, an option 226 is presented in the GUI 224. The option 226 indicates that the customer is returning 3 items (2 of the item 212A and 1 of the item 212B). Text that is visually displayed in the option 226 can be updated in real-time and/or near real-time as the customer provides user input at the user device 102 to select the items 212A-B for return and/or quantities of the items 212A-B to be returned. The option 226 can be another embodiment of the option 214 depicted and described in the GUI 208 of FIG. 2C, which indicates that the customer must select at least one item for the drive-up return. Therefore, as the customer works through a drive-up return process flow, the option 214 can be updated to reflect the customer's progress, such as reflected by the option 226 in the GUI 224 of FIG. 2E.

The customer can select the option 226 once they complete selecting the return reasons 213A and 218B for the respective items 212A and 212B. Selecting the option 226 can cause GUI 228 to be presented at the user device 102, as depicted in FIG. 2F.

The GUI 228 can present refund information 230A and 230B. Each of the refund information 230A and 230B can correspond to the respective items 212A and 212B displayed in FIG. 2E. For example, the refund information 230A in FIG. 2F corresponds to the item 212A in FIG. 2E and the refund information 230B in FIG. 2F corresponds to the item 212B in FIG. 2E. The refund information 230A and 230B can present a summary of the respective item being returned as well as a selectable options about how the customer would like to be refunded for each item. The customer can, for example, select between options such as keeping the item and receiving a partial credit (e.g., a "late item credit"), receiving a full refund to their original form of payment, replacing the item, and/or receiving a credit on their account. One or more other refund options can be provided to the customer. The refund options can vary per item type and/or based on the return reasons 213A and 213B provided by the customer in the GUI 224 of FIG. 2E.

As an illustrative example, if the customer selects the option to replace the item, a notification can be transmitted by the user device 102 to the server system 116 described herein indicating that the customer desires a replacement item. The server system 116 can accordingly generate a notification and transmit the notification to one or more user devices of employees at the retail environment. The notification to the user devices of the employees can indicate a task to be completed in retrieving the replacement item from a storage location in the retail environment, preparing the replacement item for delivery to the customer upon arrival at the retail environment, and delivering the replacement item to the customer during completion of the drive-up return. The replacement item for the drive-up return can be treated similarly as an item for a drive-up order pickup.

The GUI 228 can also include an option 232 (e.g., button, control) for the customer to "continue" through the drive-up return process flow. The customer can select the option 232 once the select their desired refund methods for each of the items in the refund information 230A and 230B. Selecting the option 232 can cause GUI 234 to be presented at the user device 102, which is depicted in FIG. 2G.

The GUI 234 provides information indicating that the customer has completed a process for initiating the drive-up return and now the customer has to begin their trip to the retail environment they selected in order to perform and complete the drive-up return. The GUI 234 can present information such as instructions about what steps the customer can complete next. For example, the GUI 234 can instruct the customer to put their drive-up return items in their vehicle, such as in a trunk of a car. The GUI 234 can also instruct the customer to use the disclosed application to inform the retail environment (and more specifically, employees at the retail environment) that the customer is beginning their trip to the retail environment. The GUI 234 can additionally or alternatively provide driving instructions to the customer to help navigate the customer to the retail environment and/or a particular drive-up return location, such as parking spots in a parking lot, at the retail environment. Sometimes, for example, the GUI 234 can present a map with navigation, instructions, and/or directions to assist the customer in driving to the retail environment.

Figure 2G:
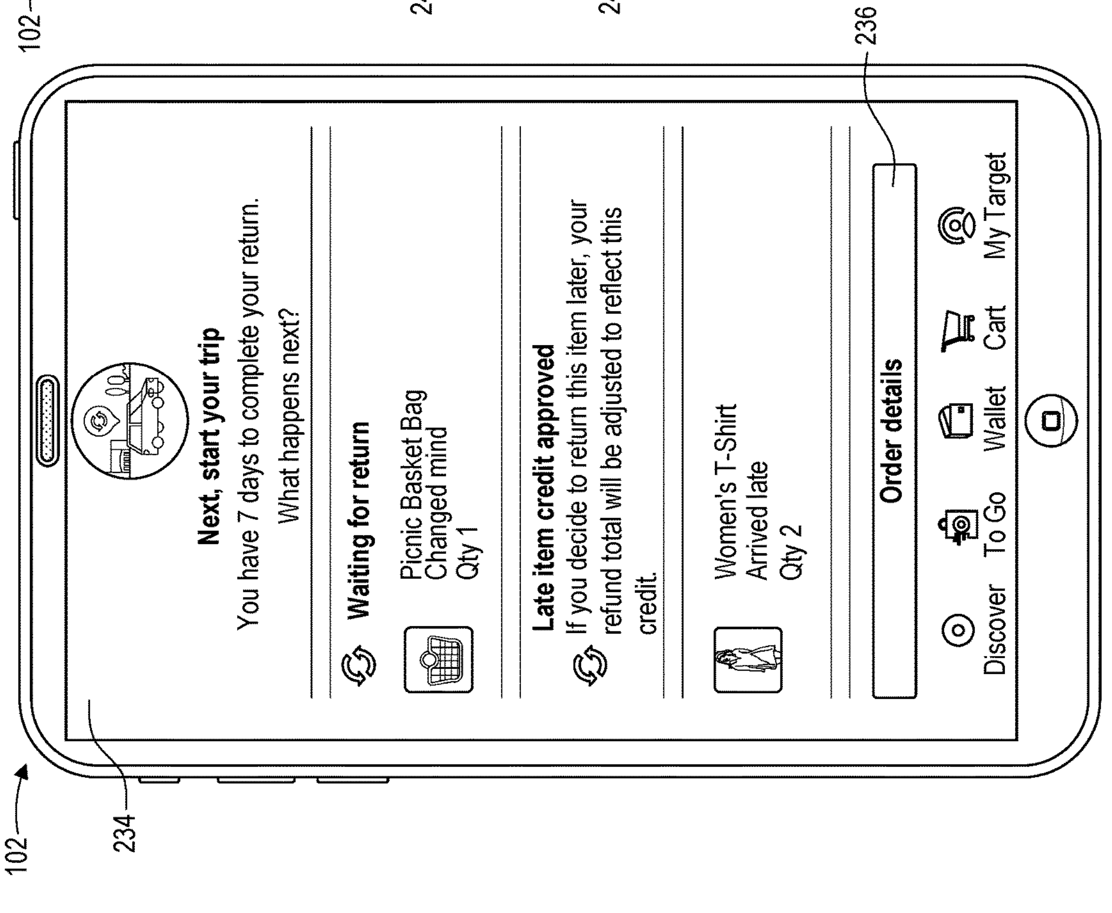

In the example GUI 234 of FIG. 2G, information presented indicates that the customer has 7 days to complete their return. The return window can vary based on the type of items being returned, how much time passed between the purchase of the items and the time at which the customer initiated the drive-up return of the items, or other factors. Information presented in the GUI 234 can also identify what item or items are expected to be returned and a status of return for each of the items to be returned.

The GUI 234 can also include an option 236, which can be selected by the customer to view "order details." Selecting the option 236 can cause GUI 238 to be presented at the user device 102, which is depicted in FIG. 2H.

The GUI 238 is similar to the GUI 200 depicted and described in FIG. 2A. In some implementations, the GUI 238 is an embodiment of the GUI 200 after the customer has initiated a drive-up return for at least one item in the order that is presented in the GUI 200. In the GUI 238 depicted in FIG. 2H, return status information 240 can be presented and displayed. The return status information 240 can indicate similar information that may be presented in the GUI 234 of FIG. 2G. For example, the return status information 240 can indicate that the customer has not yet begun their trip to the retail environment and that the retail environment is waiting for their drive-up return. The return status information 240 can also indicate how long the customer has to complete the drive-up return. As another example, the return status information 240 can indicate that the drive-up return has been completed and/or a refund or other customer-selected refund option has been issued.

The return status information 240 may also include a name or location of the retail environment that the customer selected for the drive-up return. In addition, the return status information 240 can include an option 242, which can be selected by the customer to indicate to the customer-selected retail environment that the customer is on their way (e.g., "tell us you're coming"). Various other information can also be presented in the GUI 238, as depicted in FIG. 2H and described herein. In some implementations, the GUI 238 can include user selectable options that allow the customer to edit the return order by, for example, adding or removing items from the list of items to be returned or by changing the return location.

Figure 2I:
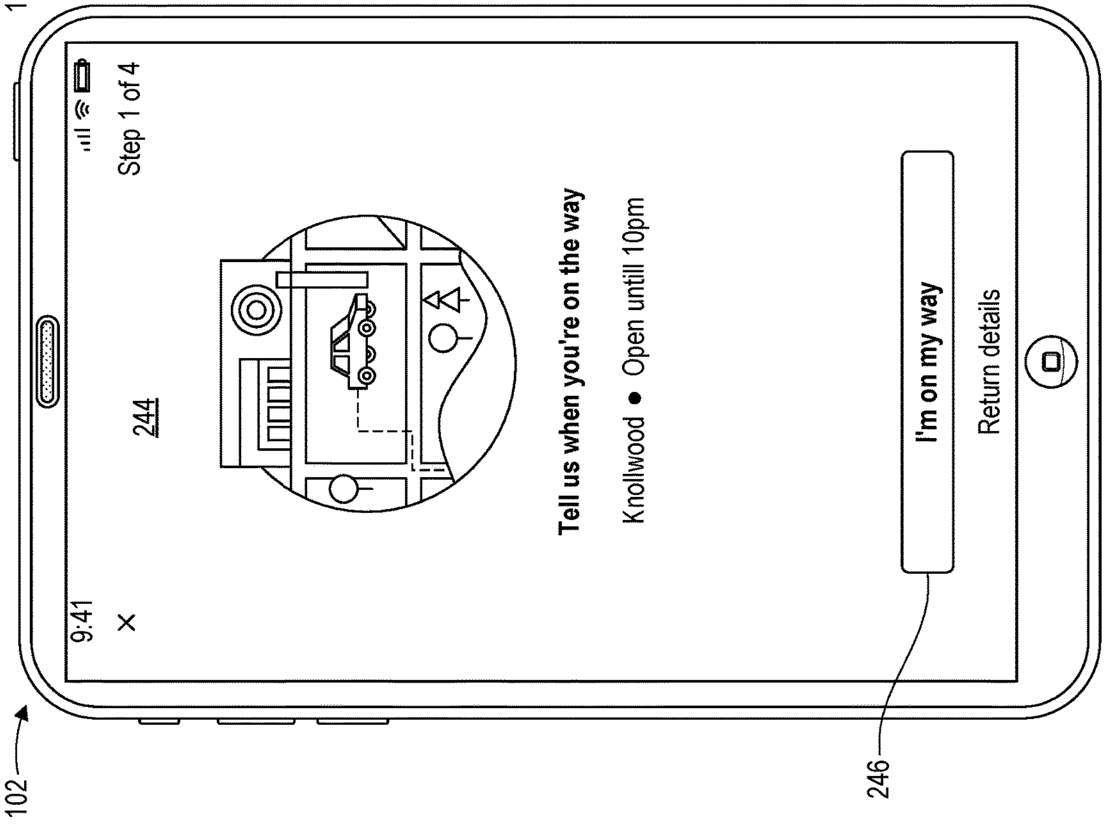

Selecting the option 242 can cause the user device 102 to present GUI 244, which is depicted in FIG. 2I. The GUI 244 can provide information to the customer about beginning their journey to the retail environment for the drive-up return. The information can include a map, instructions, and/or directions to assist the customer in navigating from their current location to a location of the retail environment. The information can include a name, location, and/or address of the retail environment that was selected for the drive-up return. In some implementations, the information can include hours of operation for the retail environment.

The GUI 244 can also include an option 246, which can be selected by the customer to indicate to the retail environment that they are on their way. Once the customer selects the option 246, geographic location information of the customer (e.g., as provided by their user device 102) can be transmitted to the server system 116 described in FIG. 1 and used by the server system 116 to determine an ETA for the customer. The ETA can, for example, be used by employees at the retail environment determine and priorities an order at which they complete tasks, which may include meeting the customer at a particular drive-up return location at the retail environment to complete the drive-up return. Refer to FIGS. 1 and 3A-Q for further discussion.

Figure 2J:
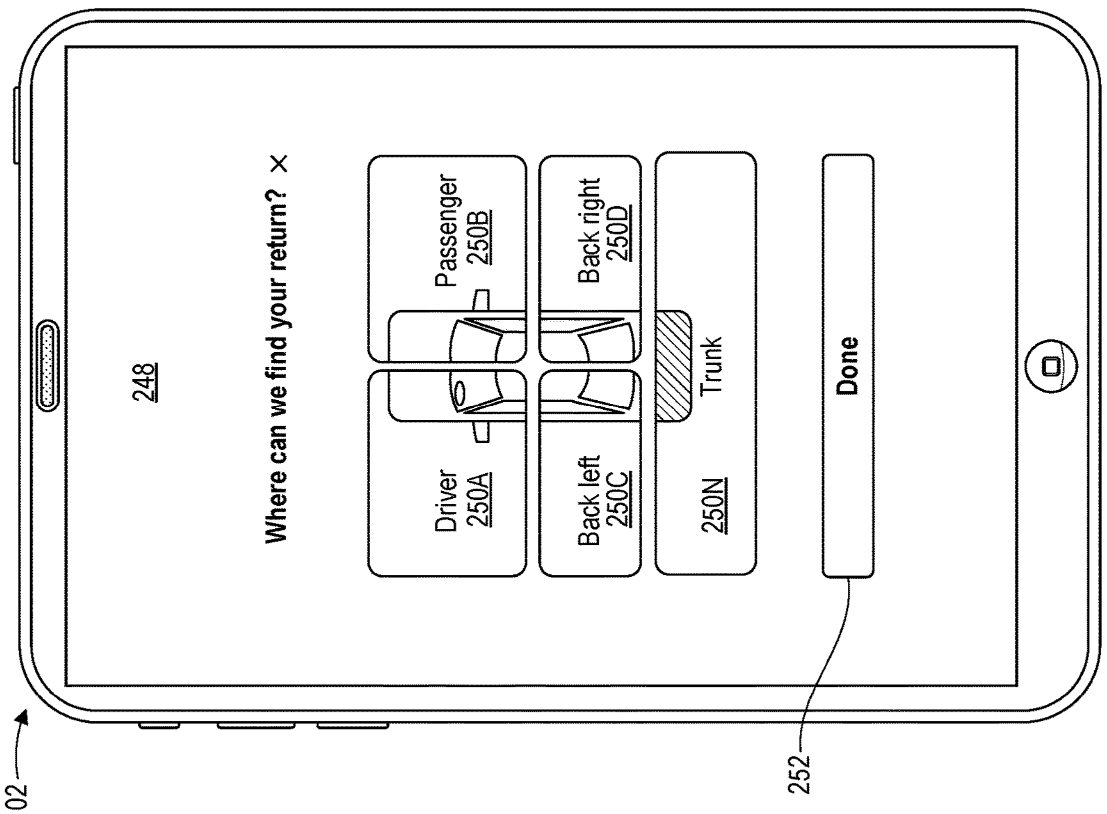

The GUI 248 shown in FIG. 2J can also be presented at the user device 102. The GUI 248 can be presented in response to the user selecting the option 246 in the GUI 244 of FIG. 2I. Sometimes, the GUI 248 can be presented in response to the user selecting one or more other options in one or more of the GUIs described in reference to FIGS. 2G-H.

The GUI 248 allows the customer to indicate a preferred location within the customer's vehicle where an employee at the retail environment is expected to retrieve the item(s) during the drive-up return. By pre-specifying a location for item retrieval in the customer's vehicle using the GUI 248, physical proximity of the customer and the employee can be reduced or eliminated.

As mentioned above, the GUI 248 can be displayed by the user device 102 at one or more times along a drive-up return process flow. For example, the GUI 248 can be displayed as part of a profile creation process when the customer first installs the dedicated application or as part of a profile updating process (e.g., in response to selection of one or more controls to change settings). The item location preference information is then stored in association with the customer's profile. In some implementations, such as situations in which the customer has not pre-stored preferred item location information in association with the customer's profile, the GUI 248 can be displayed when the customer is initiating a drive-up return, when the customer has indicated that they are heading to the retail environment, when it is determined (e.g., based on GPS signals received at the user device 102) that the customer is heading to the retail environment, or at the time of arrival of the customer at or near the retail environment. For example, the user device 102 can display the GUI 248 in response to the customer indicating that they are parked in a designated drive-up parking spot at or near the retail environment. As another example, the user device 102 can display the GUI 248 in response to the customer selecting the "I'm on my way" option 246 of FIG. 2I. In some implementations, the user device 102 displays the GUI 248 in response to instructions received from the server system 116 described in reference to FIG. 1. Moreover, although the GUI 248 is described in reference to the customer selecting a location in their vehicle where the item(s) to be returned will be placed, a similar GUI can also be used for the customer to designate a location in their vehicle where they desire drive-up order items/bags to be placed.

Still referring to FIG. 2J, the GUI 248 includes a plurality of customer-selectable icons that allow the customer to indicate one or more locations that the customer will be placing the item(s) to be returned in their vehicle. In the example shown, an image depicting an overhead view drawing of a vehicle is displayed across the selectable controls, with a portion of the vehicle depicted on each control. In some implementations, the customer may wish to select multiple locations, such as in the case of returning several items (or larger items that may fit across multiple sections of the vehicle). In some implementations, the GUI 248 can automatically prompt the customer to identify multiple locations for item location based on one or more factors, such as the size of the customer's return (e.g., how many items are to be returned), the size of one or more items to be returned, or information about the customer's vehicle such as make and model or size.

In the example shown in FIG. 2J, the GUI 248 includes a selectable control 250A that the customer can select to indicate that items for the return should be picked up from the front driver's side seat. In the example shown, the selectable control 250A includes text indicating the driver's seat and shows a portion of an image of a vehicle on the selectable control 250A to indicate the front driver's side of the car. The image depicting the front driver's side of the car includes an indication of a steering wheel.

The GUI 248 further includes a selectable control 250B that, when selected by the customer, indicates that the customer's items to be returned are located in the front passenger's side seat. The user selectable control 250B includes text indicating the passenger seat and shows a portion of the image of the vehicle on the selectable control 250B to indicate the front passenger's side of the car.

The GUI 248 further includes a selectable control 250C that, when selected by the customer, indicates that the items to be returned are located in the rear, driver's side of the vehicle. The selectable control 250C includes text indicating the back seat and shows a portion of the image of the vehicle on the selectable control 250C to indicate the rear driver's side of the car.

The GUI 248 further includes a selectable control 250D that, when selected by the customer, indicates that the item to be returned is located in the rear, passenger's side of the vehicle. The selectable control 250D includes text indicating the back seat and shows a portion of the image of the vehicle on the selectable control 250D to indicate the rear passenger's side of the car.

The GUI 248 further includes a selectable control 250N that, when selected by the customer, indicates that the item to be returned is located in the trunk of the vehicle. The selectable control 250N includes text indicating the trunk and shows a trunk portion of the image of the vehicle on the selectable control 250N.

The GUI 248 also includes an option 252 (e.g., control, button) that the customer can select to enter/save their selection for location of the item to be returned in the vehicle. Although not depicted, the GUI 248 can include a selectable option to allow the customer to skip this step and not select a location of the item to be returned in the vehicle. In some implementations, the GUI 248 can include one or more text fields for the customer to provide additional or alternative instructions. For example, the customer can type in "back seat on the floor on passenger side" or "pick up items in trailer." In some implementations, the GUI 248 can include additional selectable controls to further delineate where items are located in the vehicle (e.g., on the floor, on a seat) to assist the employee efficiently complete the drive-up return.

Still referring to FIG. 2J, here the customer has selected the control 250N, thereby indicating that the item(s) to be returned is located in the trunk of the customer's vehicle. After selection of the control 250N, the visual display of the control 250N is changed. For example, a color or shade of the selected control can be changed, a fill pattern of part or all of the selected control 250N can be changed, part or all of the selected control 250N can be highlighted, the selected control 250N can be surrounded by a selection box, one or more icons can be displayed on the selected control 250N indicating selection of that control, or another aspect of the appearance of the control 250N may be changed. For example, selection of the control 250N can cause the GUI 248 to change an appearance of the control 250N from greyed out to green, thereby indicating selection of that control. Such descriptions given with respect to the selectable control 250N apply equally to selectable controls 250A-D.

In some implementations, in response to selection of the option 252 once the customer has completed selection of the location in their vehicle where the item to be returned is located, the user device 102 transmits a communication to the server system 116 indicating the item location for the user's vehicle. The server system 116 can provide information about the item location to a user device of an employee who selected or is assigned a task of completing the customer's drive-up return. In some implementations, the communication indicating the item location can be transmitted from the user device 102 to the server system 116 in response to selection of any of the controls 250A-N, rather than or in addition to selection of the option 252.

In some implementations, the GUI 248 can be customized based on information about the customer's vehicle. For example, prior to displaying the GUI 248, the user device 102 may display one or more additional GUIs to elicit input from the customer regarding information about one or more vehicles owned or used by the customer. For example, the one or more additional GUIs can prompt the customer to enter vehicle identification information such as color, vehicle type, vehicle make, vehicle model, or a full or partial license plate number. The dedicated application can display a dropdown menu of automobile manufacturers to allow the customer to select the manufacturer of the vehicle. Selection of the manufacturer can cause the dedicated application to display a list of vehicle models made by the manufacturer to indicate the specific vehicle model for the customer's vehicle. In some implementations, the dedicated application also allows the customer to indicate a model year for the vehicle (e.g., by providing a dropdown menu).

As another example, the dedicated application can display a number of icons, each displaying a different vehicle type (e.g., SUV, four-door sedan, two-door sedan, four-door convertible, two-door convertible, mini-van, conversion van, station wagon, hatchback, motorcycle, bicycle, etc.), to allow the customer to easily indicate their vehicle type. In some implementations, customer-selectable icons for vehicle color and vehicle type are displayed simultaneously by the dedicated application. In some implementations, the dedicated application is triggered to display the above-described GUIs for prompting the customer to enter vehicle information in response to customer selection of the "I'm on my way" option 246 in the GUI 244 of FIG. 2I. The information about the customer's vehicle can be elicited from the customer during a profile creation or editing process and stored in association with the customer's profile by the server system 116. In some implementations, information on the customer's vehicle is elicited from the customer at the time the customer is initiating the drive-up return or upon the customer arriving at or near the retail environment.

The GUI 248 can display a vehicle according to the customer-provided information. As an illustrative example, in response to determining that the customer has arrived at or near the retail environment, the server system 116 will retrieve information indicating a make and model for the customer's vehicle or a vehicle type and send information to the user device 102 to cause the user device 102 to display a version of the GUI 248 that is customized based on the vehicle information. The pre-stored vehicle information may be vehicle information stored in association with a customer profile for the customer or vehicle information stored in association with the present order.

Figure 2K:
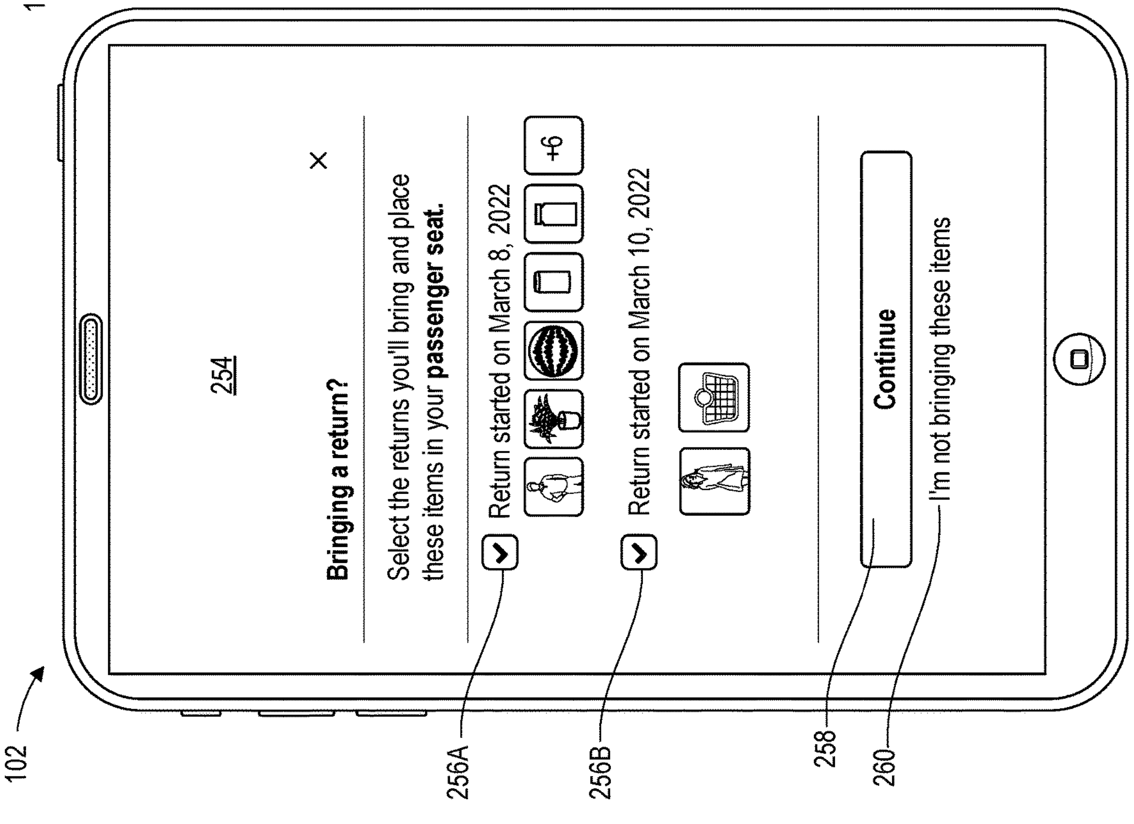

FIG. 2K shows another GUI 254 that can be presented at the user device 102. The GUI 254 can be presented in response to the customer selecting the "I'm on my way" option 246 in the GUI 244 of FIG. 2I. Additionally or alternatively, the GUI 254 can be presented in response to the customer selecting the option 252 in the GUI 248 of FIG. 2J, in which the customer saves location information for the item to be returned in their vehicle. The GUI 254 can also be presented at the user device 102 in response to receiving user selection of one or more other options, controls, buttons, or selectable elements in the GUIs described in reference to FIGS. 2A-U.

The GUI 254 can present information about returns 256A and 256B that the customer is bringing with them to the retail environment for the drive-up return. In the example of FIG. 2K, the customer is bringing 2 returns with them, returns 256A and 256B. The returns 256A and 256B can be started on different days or the same days. The returns 256A and 256B can include items from different orders. As a result, the customer can perform one drive-up return to return items from multiple different orders. In some implementations, the returns 256A and 256B can include items from the same order. When the customer brings the returns 256A and 256B, each of the returns 256A and 256B can be handled separately by the employee. For example, the employee can process the return 256A and issue a refund to the customer's form of payment for the completed return 256A, then process the return 256B and issue a separate refund to the customer's form of payment for the completed return 256B. The customer can receive 2 return confirmation notifications, messages, and/or emails, where each confirmation refers to a different one of the returns 256A and 256B.

Each of the returns 256A and 256B can be presented with an icon that the customer can select to indicate that they are bringing items associated with the respective return 256A and 256B for the drive-up return. When the customer selects the icon next to a return, the icon can be changed to a different indicia. For example, the icon can be changed in color and/or pattern. In the example of FIG. 2K, the icon can be changed to a shade of green with a checkmark presented therein.

The returns 256A and 256B can also indicate items associated with the respective return that the customer will be bringing to the retail environment. Images or other snapshots of each of the items to return can be presented. In some implementations, the returns 256A and 256B can include text information indicating the items that the customer is expected to bring to the retail environment.

The GUI 254 can also include an option 258 (e.g., control, button), which the customer can select to proceed to a next step in a process for completing the drive-up return. For example, selecting the option 258 can cause GUI 266 described in FIG. 2M to be presented at the user device 102.

Figure 2L:
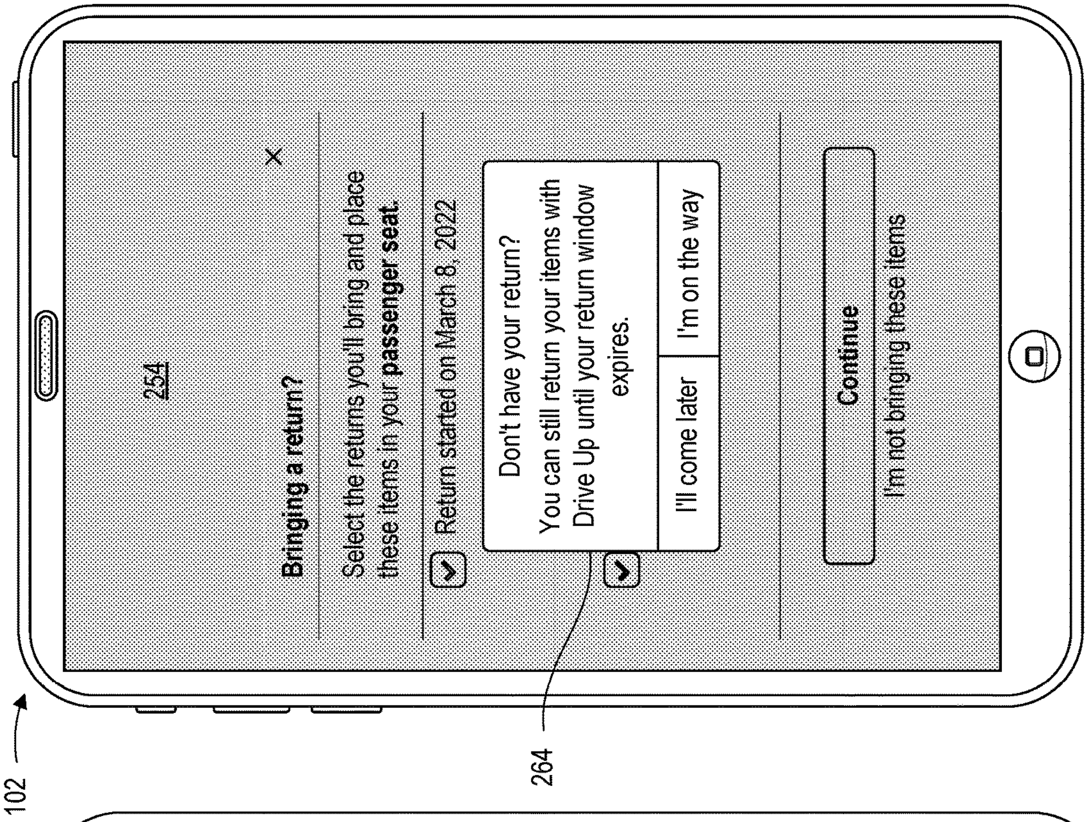

The GUI 254 can also include an option 260 (e.g., text, control, button), which can be selected by the customer to indicate that they are not bringing one or more of the items shown in the returns 256A and/or 256B. Selecting the option 260 can cause a pop-out window 264 to be presented visually overlaying a portion of the GUI 254, as depicted in FIG. 2L.

The pop-out window 264 can provide the customer with instructions about how to handle a drive-up return in which they are not bringing one or more of the items to be returned. The pop-out window 264 can also include options that the customer can select to indicate that they will come to the retail environment another time (and thus complete the drive-up return at a later time) or that they are still on their way with whatever items they are bringing for the drive-up return. If, for example, the customer arrives at the retail environment with only some of the items in either of the returns 256A and 256B depicted in FIG. 2K, the customer can still return the items that they bring. The items that the customer did not bring but that are part of the returns 256A and 256B may be brought to the retail environment (or returned using another return method described herein) at a later time that is still within the designated return window for the respective return 256A and/or 256B.

Customer selection of either options presented in the pop-out window 264 can cause information to be transmitted from the user device 102 to the server system 116 described in reference to FIG. 1. The information can indicate whether the customer is still on their way or whether they are coming to the retail environment at a later time. If the customer is still on their way, the server system 116 can determine an updated ETA for the customer and provide the updated ETA to one or more user devices of employees at the retail environment.

The server system 116 can also provide the one or more user devices of employees at the retail environment with a notification or message indicating that the customer will be arriving with some but not all of the items in either of the returns 256A and 256B. As a result, the employee that selects the task of completing the customer's drive-up return may be aware that they will have to look for some of the items in the returns 256A and/or 256B or otherwise process only some of the items for return during the drive-up return.

If the customer is coming to the retail environment at a later time, then the server system 116 can generate and transmit a notification or message to the one or more user devices of employees indicating that the customer's drive-up return is no longer queued. In other words, the customer's drive-up return can be removed from a list of drive-up tasks (including drive-up returns, drive-up order pickups, or a combination thereof) to be performed at the retail environment, where that list is presented in GUIs at the one or more user devices of the employees. Refer to FIGS. 3A-Q for further discussion about the GUIs presented at the user devices of the employees.

Figure 2M:
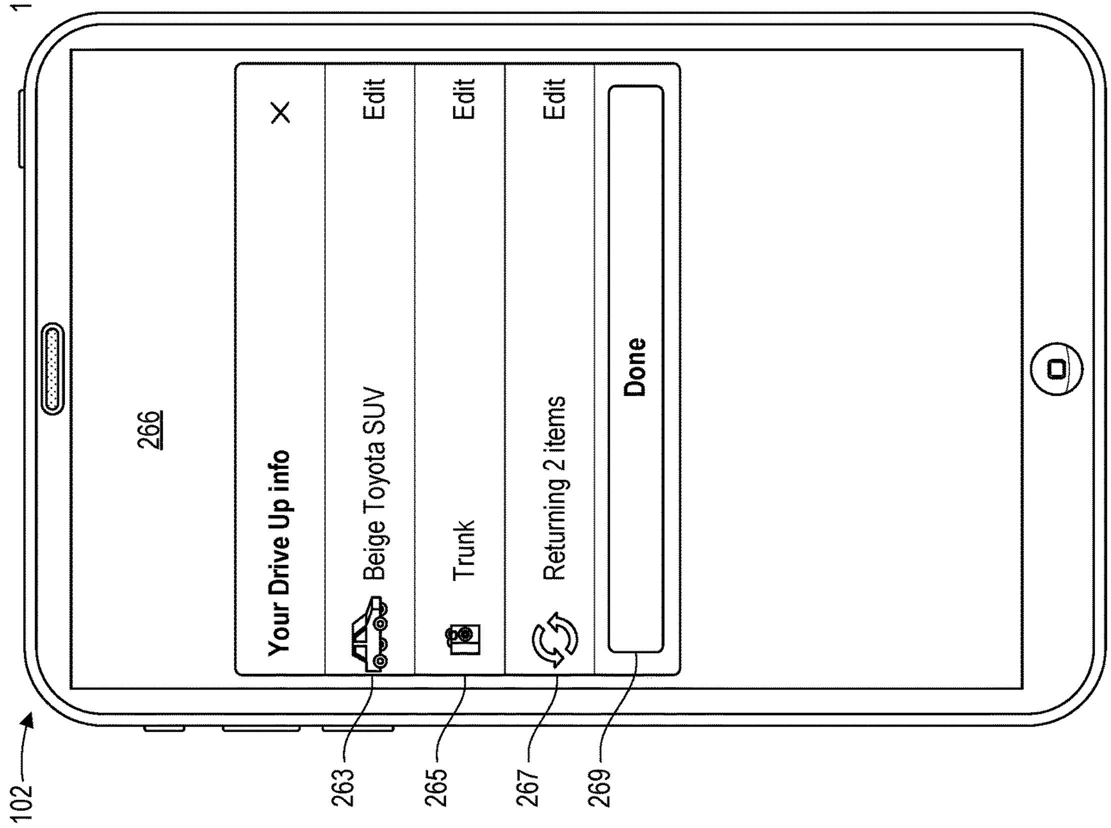

The GUI 266 shown in FIG. 2M can be presented at the user device 102 in response to the customer selecting the "Continue" option 258 in the GUI 254 of FIG. 2K. In some implementations, the GUI 266 can be presented in response to the customer selecting the "I'm on my way" option 246 in the GUI 244 of FIG. 2I and/or in response to the customer selecting the "Done" option 252 presented in the GUI 248 of FIG. 2J. The GUI 266 can also be presented in response to the customer providing one or more other inputs at the user device 102 in one or more of the other GUIs described in reference to FIGS. 2A-L.

The GUI 266 can present information about the customer's drive-up return. In some implementations, the GUI 266 can also present information about a drive-up order that is to be fulfilled for the customer at the same time as the drive-up return is completed. Here, the GUI 266 provide data fields 263, 265, and 267 for which the customer can provide user input to edit information for their drive-up return.

For example, the customer can select the data field 263 in order to input or edit information about the vehicle they will be using during the drive-up return. Refer to FIG. 2J for further discussion about providing and updating vehicle information.

The customer can select the data field 265 in order to input or edit information about a location where one or more of the items to be returned will be located in the customer's vehicle. Refer to FIG. 2J for further discussion about providing and updating item location information in the customer's vehicle.

The customer can select the data field 267 in order to input or edit information about what items they are returning during the drive-up return. For example, selecting the data field 267 can cause the GUI 254 of FIG. 2K to be presented at the user device 102. As another example, selecting the data field 267 can cause the GUI 238 of FIG. 2H to be presented at the user device 102.

Figure 2N:
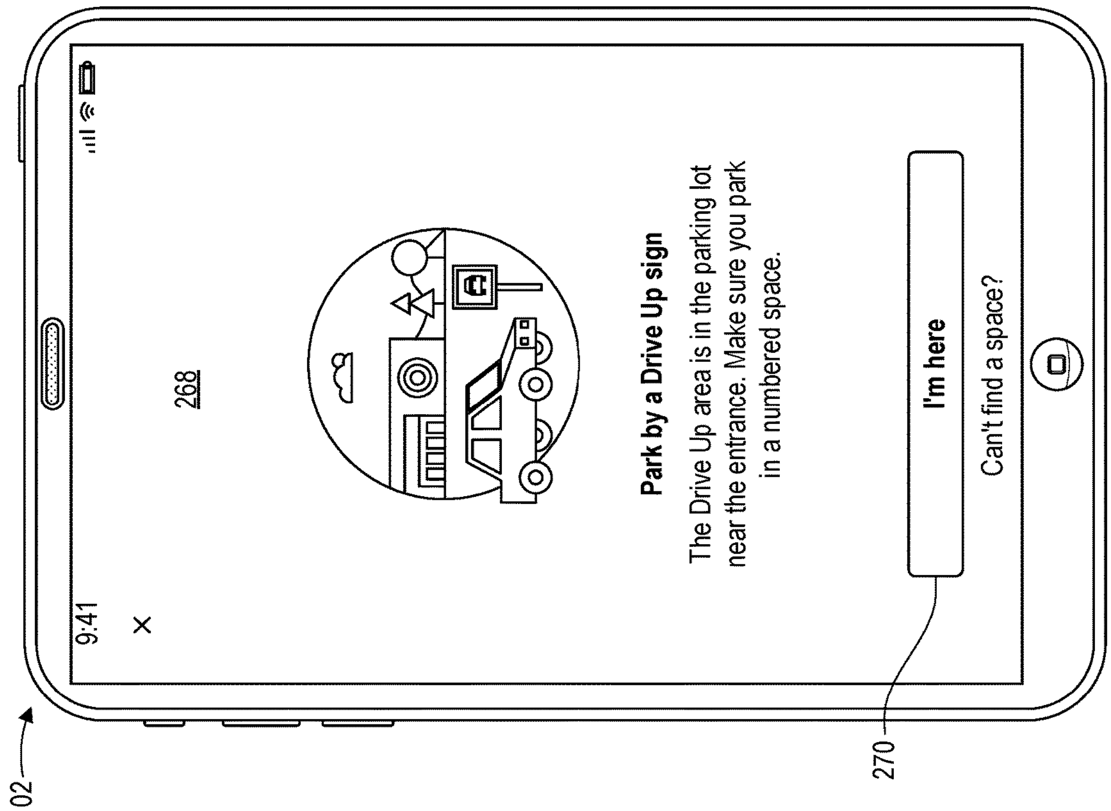

The GUI 266 can present an option 269, which the customer can select to complete their review and/or modification of their drive-up return information. Selecting the option 269 can cause the user device 102 to display GUI 268, which is depicted in FIG. 2N. Selecting the option 269 can additionally or alternatively cause the user device 102 to display any one or more of the GUIs described in reference to FIGS. 2I-M.

The GUI 268 of FIG. 2N can provide instructions to the customer as they are driving to the retail environment, near the retail environment, approaching the retail environment, or arrived at the retail environment. The GUI 268 can, for example, instruct the customer to park in one of a group of parking spots that have been designated for drive-up returns or any drive-up services. The GUI 268 can also present an option 270, which can be selected by the customer to indicate that they arrived at the retail environment and is parked in one of the drive-up designated parking spots.

Selecting the option 270 can cause a notification to be transmitted from the user device 102 to the server system 116 described in FIG. 1. The server system 116 can update an ETA of the customer and provide the updated ETA to one or more of the user devices of employees, as described herein. For example, the server system 116 can transmit a notification to a user device of an employee who has taken ownership of the customer's drive-up return to notify the employee that they should prepare to complete the drive-up return and meet the customer at their vehicle in the parking area of the retail environment.

Figure 2O:
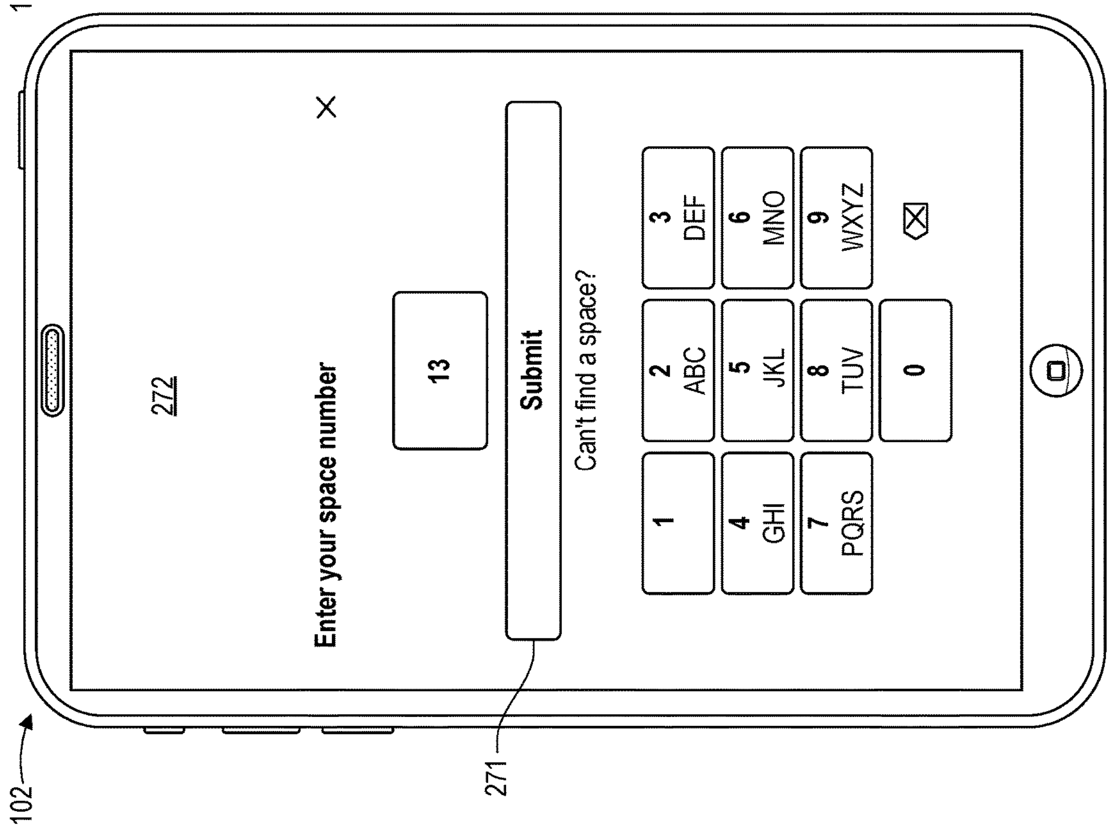

Selecting the option 270 can cause GUI 272 to be presented at the user device 102, which is depicted in FIG. 2O. The GUI 272 can present customer-selectable controls for the customer to input a parking space number that they parked their vehicle in. Once the customer completes entering in their parking space number, they can select an option 271 (e.g., button, control) to "Submit" their parking space number.

Selecting the option 271 can cause the user device 102 to transmit a notification to the server system 116 indicating the parking space that the customer's vehicle is located at. The server system 116 can transmit a notification to the user device of the employee who has taken ownership of the customer's drive-up return to notify the employee of where the customer's vehicle is located in the parking area of the retail environment.

Figure 2P:
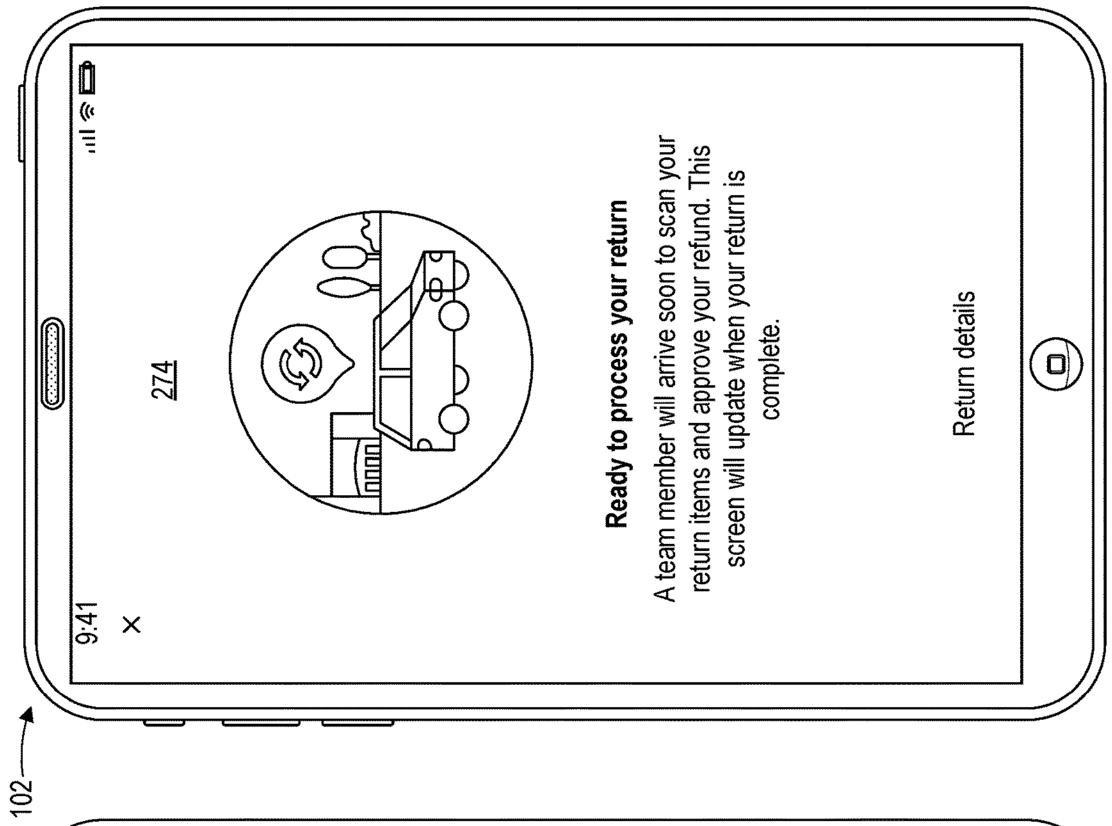

Selecting the option 271 can cause GUI 274 to be presented at the user device 102, as shown in FIG. 2P. The GUI 274 can present information to the customer about the drive-up return process. For example, the GUI 274 can indicate that an employee is on their way to the customer's vehicle to retrieve the item(s) to be returned, verify the item(s) to be returned, process the return, and issue a refund to the customer's form of payment. The GUI 274 can also present information about the item(s) to be returned, the customer's form of payment, and/or other information related to the drive-up return. The GUI 274 can remain presented at the user device 102 or in the dedicated application until the drive-up return is completed (e.g., the employee issues the refund to the customer's form of payment).

The drive-up return can be completed at the user device of the employee who took ownership of the customer's drive-up return. Refer to FIGS. 3A-Q for further discussion about completing the drive-up return at the user device of the employee. Once the drive-up return is completed at the user device of the employee (e.g., the employee selects an option to issue a refund to the customer's form of payment for the returned item(s)), the user device 102 can present GUI 276 of FIG. 2Q and/or GUI 278 of FIG. 2R. Either of the GUIs 276 and 278 can therefore replace the GUI 274 at the user device 102 that is depicted in FIG. 2P.

Figure 2Q:
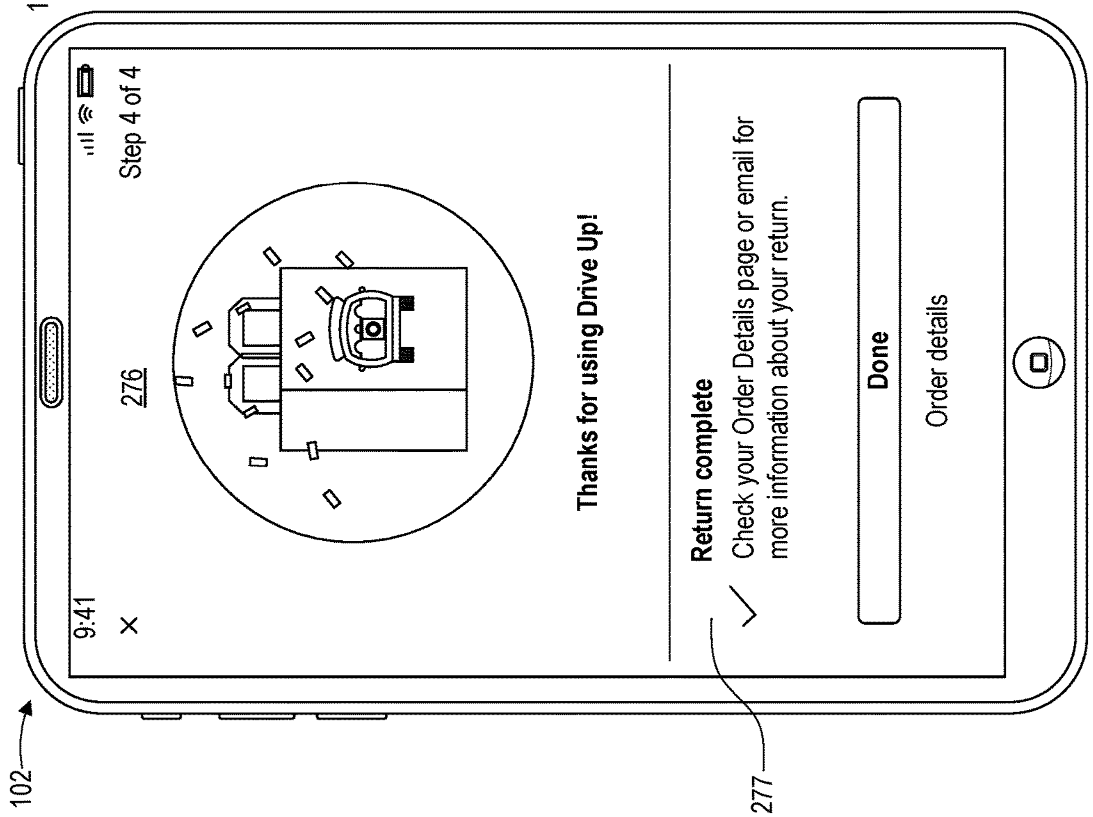

The GUI 276 shown in FIG. 2Q can include data field 277 that indicates the drive-up return has been completed. The data field 277 can also provide instructions for the customer to access details about the completed return, such as viewing the issuance of the refund to the customer's form of payment and/or what items were successfully returned.

Figure 2R:
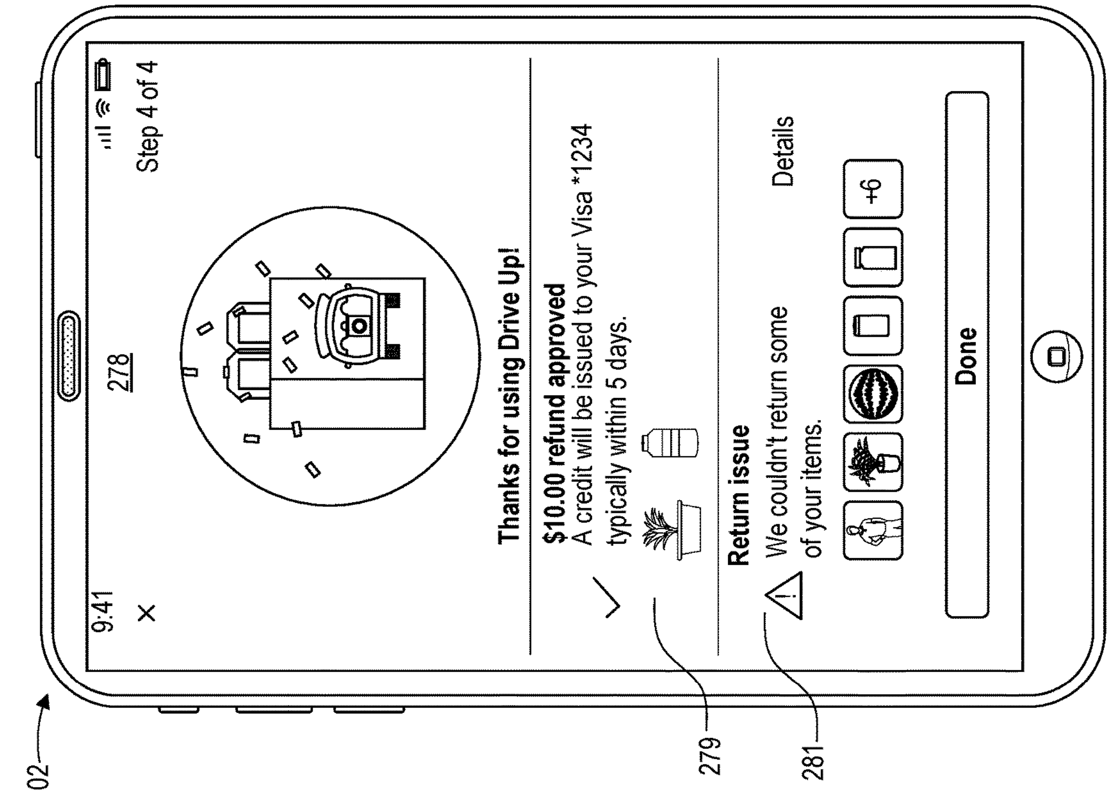
Figure 2T:
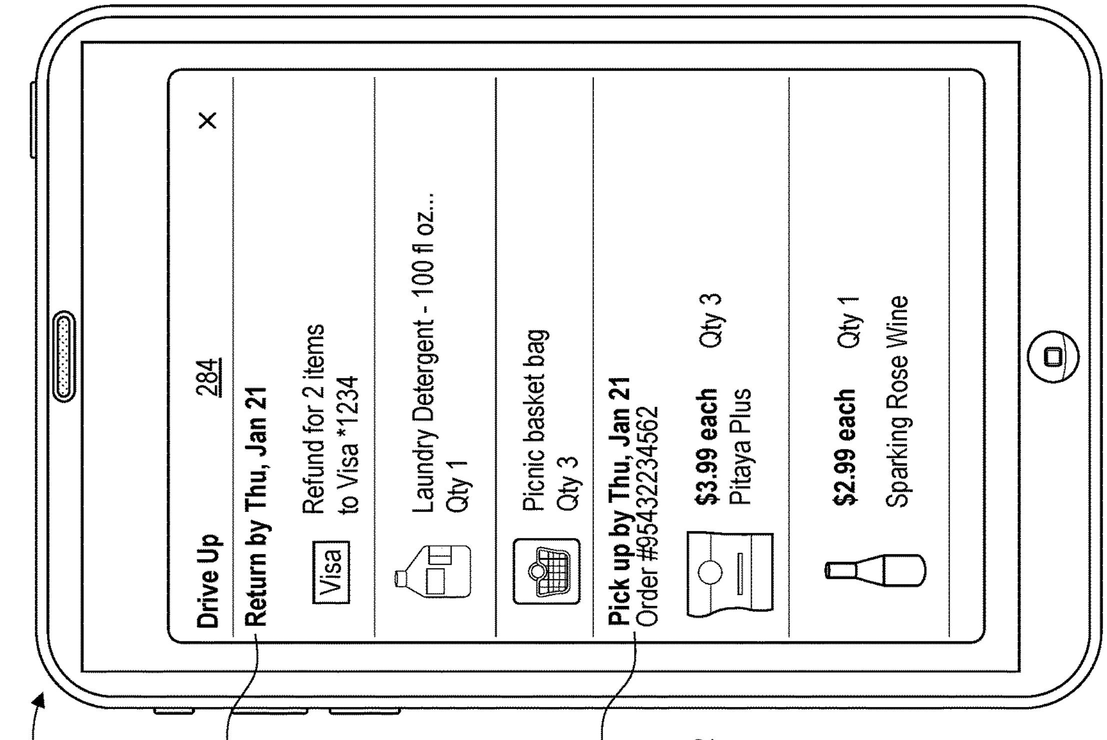

The GUI 278 shown in FIG. 2R can be displayed at the user device 102 when the drive-up return is partially completed. This situation may arise when the customer brings only some items to be returned in a particular return and does not bring the other items in the return to the retail environment. This situation may also arise when the customer brings items that cannot be returned for some reason (e.g., they are not the same items that the employee was expecting as part of the return, the items are not associated with the customer, the items' return windows have expired, etc.). Accordingly, the example GUI 278 includes data fields 279 and 281.

The data field 279 indicates what items have been successfully returned and that a refund to the customer's form of payment has been approved and/or issued. The data field 279 can also indicate which of the items have been successfully returned.

The data field 281 can indicate what items have not been successfully returned and that there is a return issue. The data field 281 can indicate which of the items were not successfully returned. The customer can select the data field 281 in order to view additional information about why the items listed therein were not successfully returned during the drive-up return.

In some implementations, as described herein, the customer can initiate a drive-up return and a drive-up order pickup at the same time. The customer can place an order for one or more items using the dedicated application presented at the user device 102. During a checkout process for the order, the customer can indicate how they would like the order to be fulfilled, such as by delivery in the mail, in-store pickup, or drive-up order pickup. The customer can select an option to fulfill the order via drive-up order pickup. The customer can then wait to receive a notification at their user device 102 indicating when the order is ready for drive-up pickup.

Figure 2S:
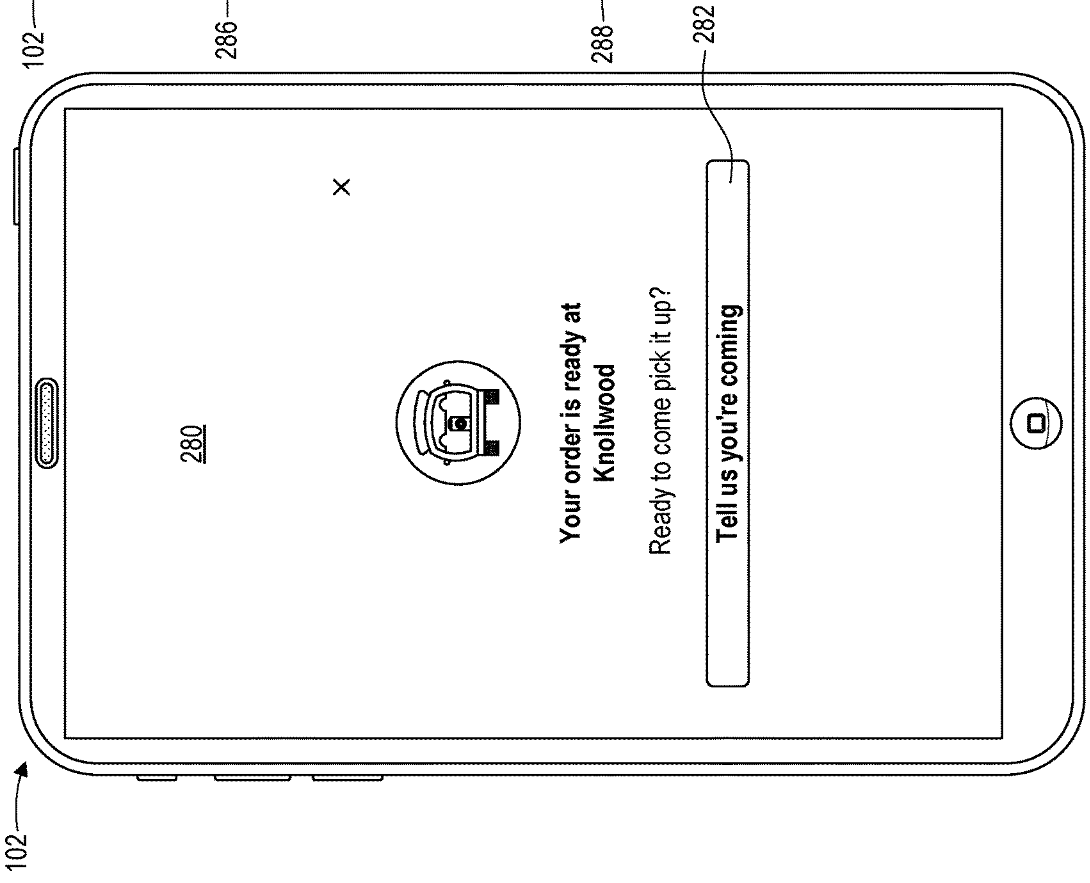

Accordingly, FIG. 2S depicts a GUI 280, which can be presented at the user device 102 when their drive-up order is ready for pickup. The GUI 280 can present information about the order, such as order details. The GUI 280 can also present information about the retail environment where the customer is supposed to go to pick up the order. The GUI 280 includes an option 282 (e.g., control, button), which the customer can select to indicate that they are on their way to pick up the order. Refer to FIGS. 2H and 2I for further discussion.

Selecting the option 282 can cause GUI 284 to be presented at the user device 102, which is depicted in FIG. 2T. The GUI 284 can include drive-up return information 286 and drive-up order pickup information 288 for the customer. At another time (e.g., before or after placing the drive-up order), the customer might have initiated one or more drive-up returns as depicted and described in reference to FIGS. 2A-H. The customer might not have completed the drive-up return(s) yet. Therefore, when the customer receives an indication that their drive-up order pickup is ready, as shown in the GUI 280 in FIG. 2S, the customer can be presented the GUI 284 in FIG. 2T as a reminder that they can also bring items for the drive-up return(s) that they started. If the customer decides to bring the items for the drive-up return(s) at the same time that they pick up their drive-up order, the drive-up return(s) can be simultaneously and seamlessly processed by an employee who prepares and/or delivers the drive-up order to the customer, thereby improving an overall shopping experience for the customer.

As shown in FIG. 2T, the drive-up return information 286 can indicate a date by which the customer must complete the drive-up return, how many items the customer is returning, how the customer will be refunded for the return, and one or more indications for item that the customer is expected to bring for the return.

The drive-up order pickup information 288 can indicate a date by which the customer must complete the pickup, an order number, and one or more indications for one or more items in the order that the customer will be picking up.

In the example of FIG. 2T, the drive-up return information 286 and the drive-up order pickup information 288 include a same date by which these actions must be completed. In other examples, the dates for the drive-up return and the drive-up order pickup may be different.

Once the customer selects the option 282 in the GUI 280 of FIG. 2S, thereby indicating that the customer is on their way to the retail environment, the customer can begin their journey to the retail environment. The user device 102 may present GUIs similar to those described in reference to FIGS. 2G-O so that the customer can provide information to complete the drive-up order pickup. The user device 102 can also transmit any of the customer-provided information and/or location information to the server system 116, as described herein. The server system 116 can generate notifications to be transmitted to user devices of employees at the retail environment so that the employees can efficiently prepare the customer's drive-up order, deliver the drive-up order upon arrival of the customer at the retail environment, and complete the customer's drive-up return.

Accordingly, the GUI 268 described in FIG. 2N can be presented at the user device 102 while the customer is on their way to the retail environment. Upon arrival at the retail environment, the customer can select the option 270, thereby indicating that they arrived and are parked in a designated drive-up parking spot. The GUI 272 of FIG. 2O can then be presented at the user device 102 for the customer to provide a space number that their vehicle is parked in. After submitting the space number by selecting the option 271 in the GUI 272, GUI 290 can be displayed at the user device 102, which is depicted in FIG. 2U.

The GUI 290 includes information for performing and completing the drive-up order pickup for the customer. For example, the GUI 290 can include information about the customer (e.g., a customer name), the space number that the customer's vehicle is parked in, an indication about whether the items for the order pickup should be placed in the customer's vehicle and a status of the customer's drive-up return. The GUI 290 can additionally or alternatively present other information, including but not limited to a barcode that the employee can scan to verify the customer is the person expected to be picking up the drive-up order or otherwise associated with the drive-up order and/or order details.

In some implementations, the GUI 290 can be presented at the user device 102 until the employee completed the drive-up order pickup at the customer's vehicle. The user device 102 can then update by presenting one or more other GUIs described in reference to FIGS. 2P-R for competing the drive-up return immediately after completing the drive-up order pickup at the customer's vehicle.

Although the GUIs of FIGS. 2A-U are described in a particular sequence or order, any one or more of the GUIs of FIGS. 2A-U can also be presented in one or more other orders or sequences at the customer's user device 102. Moreover, although one or more of the GUIs in FIGS. 2A-U are described as being GUIs presented at the user device 102, one or more features or elements in the GUIs described in reference to FIGS. 2A-U can also be presented as visual overlays and/or pop-out windows overlaying one or more of the other GUIs described in reference to FIGS. 2A-U.

Moreover, the GUIs of FIGS. 2A-U provide one or more benefits to consumers. For example, the GUIs 2A-U provide a full end-to-end automated process for transmitting information between user devices of the consumers and user devices of the employees so that the customers can complete drive-up returns and drive-up order pickups at a same time. The disclosed techniques do not require exchange of cash. The customers receive real-time or near real-time confirmation that their returns have been completed before the employee leaves their vehicles. Similarly, the customers receive real-time or near real-time refunds issued to their forms of payment before the employee leaves their vehicles, thereby increasing confidence that the customers' items are actually returned and their refunds are issued. The customers may not loose connection with their items until the respective return processes are completed.

FIGS. 3A-Q show example GUI displays presented at an employee user device 120 for drive-up return services. FIG. 3A shows GUI 300, which can be presented at an employee's user device 120 in the dedicated application described herein. The GUI 300 can include information about one or more customer orders that involve drive-up services at a retail environment where the employee is located. For example, the GUI 300 can present both customer orders involving drive-up returns as well as customer orders involving drive-up order pickup. In some implementations, a first GUI can present customer orders for drive-up returns and a second, separate GUI can present customer orders for drive-up order pickup.

The example GUI 300 in FIG. 3A includes both drive-up returns and drive-up order pickups for customers. The drive-up returns and drive-up order pickups can be presented in 2 employee-selectable tabs 302A and 302B. The tab 302A can be selected to view customer orders that are "in hold." The tab 302B can be selected to view customer orders that are "guest ready." In FIG. 3A, the employee has selected the tab 302A and therefore the GUI 300 presents a list of customers whose orders are "in hold." Orders that are "in hold" may be prepared by the employee or other employees in the retail environment. Orders that are "guest ready" are prepared and ready to be delivered to the respective customers.

In some implementations, the customer orders in either of the tabs 302A and 302B can further be presented and/or ranked based on whether the respective customer has arrived at the retail environment or are on their way to the retail environment. Orders for customers that have arrived at the retail environment can be given priority over orders for customers who are on their way to the retail environment or have not yet begun their journey to the retail environment.

As mentioned above, the GUI 300 can present both orders that are part of drive-up order pickups as well as orders that are part of drive-up returns. The orders can be consolidated in the GUI 300 based on the respective customer. For example, customer 304 includes both items to be picked up in a drive-up order pickup, as shown by icons 307A-N, and at least one item to be returned in a drive-up return, as shown by icon 306. The icons 307A-N can be graphical elements that visually depict a type of item that is part of the customer's drive-up order pickup. The icons 307A-N can include, but are not limited to, retail items such as clothes, furniture, canned goods, or accessories, produce items, alcoholic beverages, and/or beverages that are being made for the customer (such as in a café or restaurant that is part of or otherwise associated with the retail environment). One or more additional or fewer icons 307A-N may also be used to visually represent types of items that are part of the customer's drive-up order pickup.

The icon 306 is a graphical element that visually indicates that the customer also has a drive-up return at the same time that the customer is picking up the drive-up order pickup. The icon 306 can be one or more arrows in a circle. The icon 306 can include one or more other designs or graphical or visual elements to indicate that the customer has a drive-up return.

As mentioned above, the employee at the user device 120 can select any of the customer drive-up orders presented in the GUI 300 to claim an order. Claiming the order can include preparing the order for the customer, such as collecting and scanning items that are part of a drive-up order pickup, bagging the items, putting the bagged items in a hold location until the customer arrives at the retail environment, bringing the bagged items to the customer's vehicle upon arrival at the retail environment, receiving the customer's item(s) to be returned, scanning a unique identifier, such as a barcode or other label, of the item(s) to be returned, verifying the item(s) to be returned, and issuing a refund to the customer's form of payment based on completing the drive-up order return. Any one or more of the abovementioned steps can also be performed by more than one employee at the retail environment.

In the example of FIG. 3A, the employee can claim the drive-up orders for the customer 304 by selecting the customer 304 in the GUI 300. The employee can then walk through one or more GUIs presented at the user device 120 that prompt the employee to prepare the items to be delivered to the customer's vehicle in the customer's drive-up order pickup. Once the employee completes preparation of the customer's drive-up order pickup, the customer 304 can be moved from the "in hold" tab 302A to the "guest ready" tab 302B, as shown and described in FIG. 3B.

In FIG. 3B, the employee can toggle to the "guest ready" tab 302B in the GUI 300. The tab 302B can be populated with customer drive-up orders that have been prepared by the employee (or other employees in the retail environment) and thus are ready to be delivered to respective customers' vehicles upon their arrival at the retail environment. As mentioned above, the customer 304 has been moved from the "in hold" tab 302A to the "guest ready" tab 302B because the customer 304's order has been prepared and is ready to be delivered to the customer's vehicle. The icon 306 is still presented with the customer 304 in the tab 302B to indicate that the customer is on their way with the item(s) to be returned in the drive-up return at the same time that the drive-up order pickup will be performed.

The employee can select any of the customers listed in the tab 302B to take ownership of tasks associated with completing delivery of items to the selected customer as part of their drive-up order pickup. For example, the employee can select the customer 304 in the GIU 300 of FIG. 3B, which can cause GUI 308 to be presented at the user device 120, as described in reference to FIG. 3C.

The GUI 308 can provide information about the selected customer's drive-up order pickup and/or drive-up return(s). The GUI 308, for example, includes an indication 310 that the selected customer is coming to the retail environment with at least one item to be returned in a drive-up return. The GUI 304 can also present order information 311A-N for one or more orders to be delivered to the customer's vehicle upon their arrival at the retail environment. In some implementations, the GUI 308 includes a selectable option for connecting a printer to allow an employee to print a label (such as a return label) for the returned item. In some implementations, the control for connecting to a printer can appear on a different screen or on its own screen.

Figure 3C:
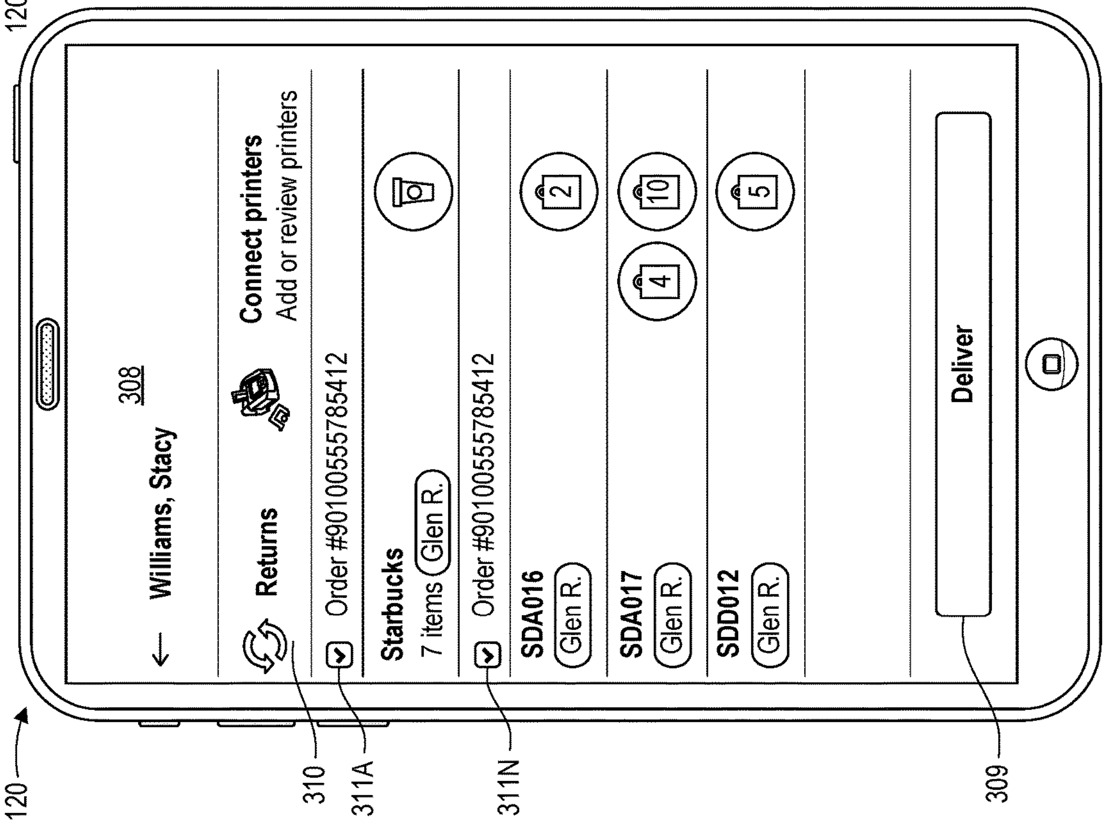

In the example of FIG. 3C, 2 orders, one associated with the order information 311A and another associated with the order information 311N have been prepared and are ready to be delivered to the customer's vehicle when they arrive at the retail environment. In some implementations, one or more of the orders associated with the order information 311A and 311N may not be prepared and ready for delivery. The employee can be prompted to complete preparation of the one or more orders before they can deliver the orders to the customer. Moreover, the employee can select one or more of the order information 311A and 311N to indicate that the associated order is ready to be delivered and will be delivered to the customer upon their arrival. In some implementations, the employee may select only one of the order information 311A and 311N and therefore deliver only one of the associated orders to the customer (e.g., the other order that is associated with the unselected order information may not be ready for pickup by the time the customer arrives at the retail environment).

Figure 3D:
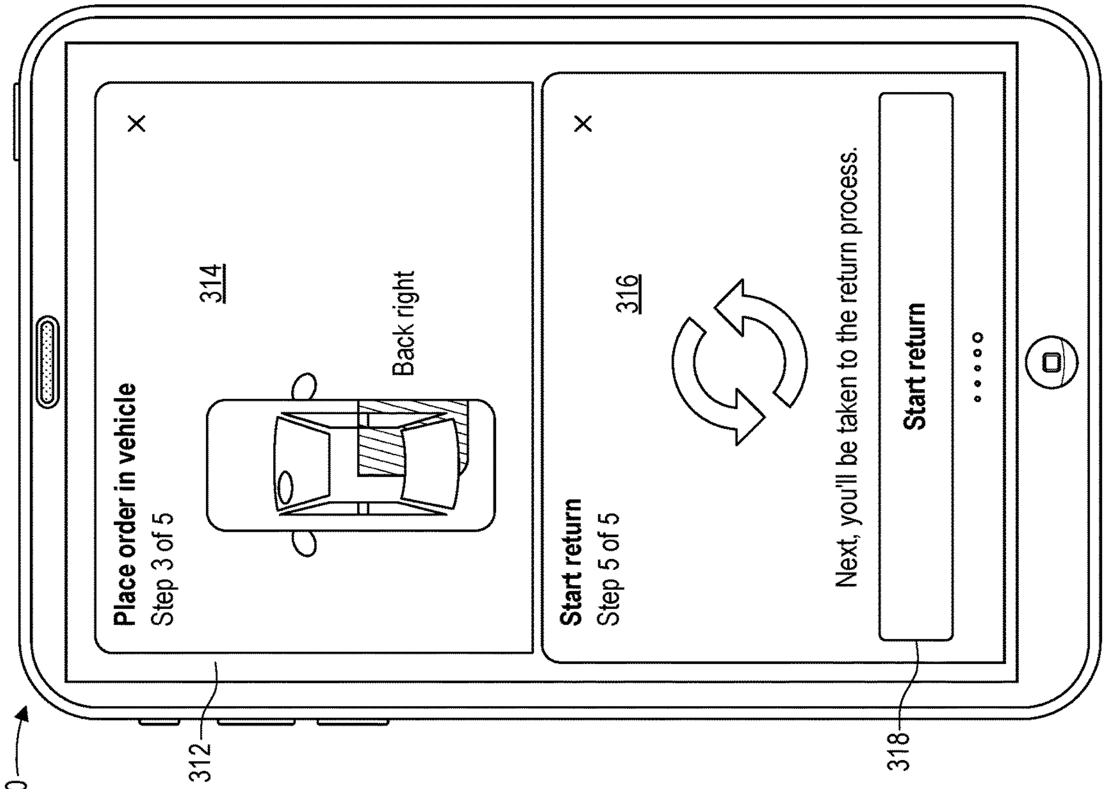

The GUI 308 can also include an option 309 (e.g., button, control), which the employee can select in order to indicate that they are ready to deliver the orders associated with the order information 311A and 311N to the customer. In some implementations, the option 309 may be un-selectable until the user device 120 receives a notification from the server system 116 indicating that the customer has arrived at the retail environment. Selection of the option 309 can cause GUI 312 to be presented at the user device 120, which is depicted in FIG. 3D.

The GUI 312 can include information about one or more locations in the customer's vehicle where the employee should put the items associated with the order pickup. The GUI 312 can also include information about performing a drive-up return process. More particularly, the GUI 312 can include data field 314 to present information about where to place the items for the drive-up order pickup in the customer's vehicle. The customer can indicate a preferred location in their vehicle for placement of the items for the drive-up order pickup similarly as described in reference to the GUI 248 in FIG. 2J. The data field 314 can include, for example, a visual representation of the customer's vehicle. The visual representation of the customer's vehicle can include highlighting, color, shading, pattern, or other indicia over a portion of the customer's vehicle where the employee should place the items for the drive-up order pickup. In the example of FIG. 3D, a back right passenger side of the visual representation of the customer's vehicle is highlighted and/or shown in a green color with text, thereby indicating that the employee should put the items for the drive-up order pickup in the back right passenger side of the customer's vehicle.

The GUI 312 also includes data field 316, which includes instructions for initiating the drive-up return at the customer's vehicle. In some implementations, the data field 316 can be presented in a separate GUI from the data field 314. In some implementations, the data field 316 can replace the data field 314 in the GUI 312 once the employee completes the drive-up order pickup for the customer. In some implementations, the data field 316 can be presented in the GUI 312, in a pop-out window overlaying the GUI 312, and/or in a separate GUI In response to the employee completing the drive-up order pickup at the customer's vehicle.

In yet some implementations, the employee may perform and complete the drive-up order pickup. The customer can then inform the employee that they also have one or more items to be returned and that they would like to return these items using drive-up service. The customer, however, might not have initiated a drive-up return for the item(s) in the dedicated application using their user device 102. The employee, however, can initiate the drive-up return at their user device 120 using the dedicated application. By initiating the drive-up return at the user device 120, the data field 316 can be presented to the employee, such as in a new GUI presented at the user device 120.

The data field 316 can include an option 318 (e.g., button, control), which the employee can select to begin the drive-up return process. Selecting the option 318 can cause GUI 320 to be presented at the user device 120, which is depicted in FIG. 3E.

Figure 3F:
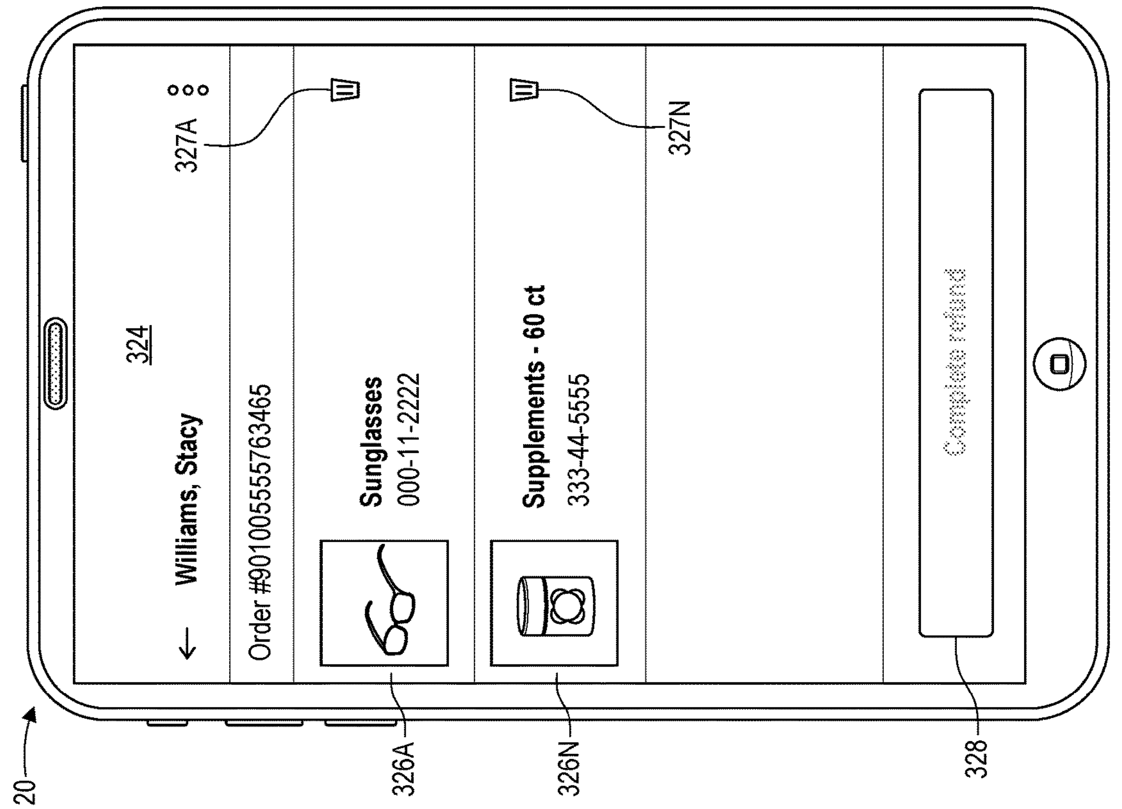
Figure 3E:
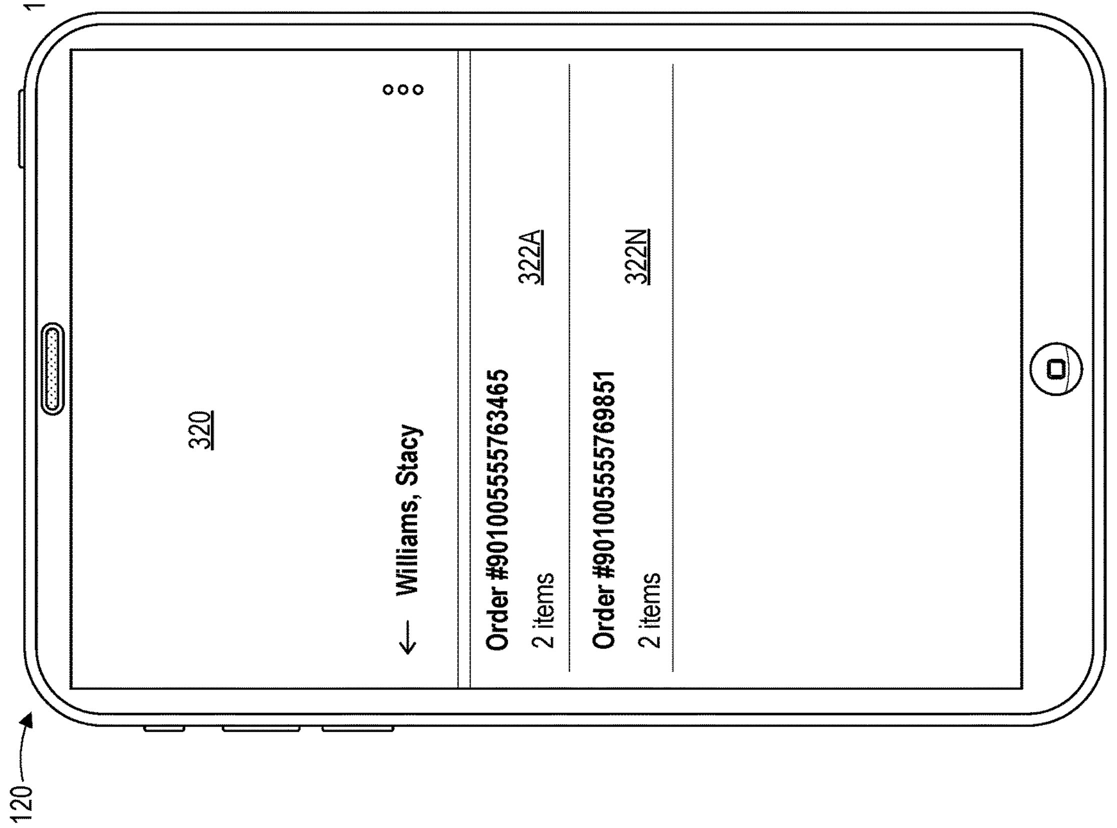

The GUI 320 in FIG. 3E can present information about drive-up returns 322A and 322N. The drive-up returns 322A and 322N can indicate a corresponding order information, such as an order number. The drive-up returns 322A and 322N can also include an indication of how many items for each of those returns 322A and 322N are expected to be returned. As described above in reference to the GUIs in FIGS. 2A-U, the customer can perform multiple drive-up returns, one right after the other, even though each of the drive-up returns corresponds to a different order. Each of the drive-up returns can be processed separately by the employee (e.g., the employee completes one return and issues a refund for that return of items before moving on to the next return of items). The drive-up returns 322A and 322N can also be selected by the employee to begin a corresponding drive-up return process. Selecting one of the drive-up returns 322A and 322N can cause GUI 324 to be presented at the user device, as depicted and described in FIG. 3F. In some implementations, all drive-up returns for the same customer are automatically consolidated into a single drive-up return. In such cases, the system may proceed directly to the GUI 324 of FIG. 3F upon selection of the option 318 shown in FIG. 3D.

In the example of FIGS. 3E-F, the employee has selected the drive-up return 322A in the GUI 320. Selecting the drive-up return 322A causes the GUI 324 to be presented at the user device 120. The GUI 324 can indicate items 326A-N that are expected to be returned for the selected drive-up return 322A. Here, the customer is expected to bring 2 items for return, items 326A and 326N. The items 326A and 326N can include information, such as a name of each item, a label or other unique identifier that is associated with and expected for each item, and/or a UPC or DPCI that is associated with and expected for each item. The GUI 324 can also present icons 327A and 327N with each respective item 326A and 326N. In the example of FIG. 3F, the icons 327A and 327N are garbage cans. The icons 327A and 327N can be one or more other graphical or visual elements. The employee can select one or more of the icons 327A and 327N in order to remove the respective item 326A and 326N from the drive-up return. For example, if the customer arrives at the retail environment with only the item 326A and not the item 326N, then the employee can select the icon 327N to remove the item 326N from the drive-up return. Assuming the employee verifies the item 326A during the drive-up return process, the customer may only be issued a refund for the item 326A and not the item 326N (since the item 326N was cancelled from the drive-up return).

The GUI 324 also includes an option 328 (e.g., button, control), which can be selected by the employee to "complete refund" for the particular return that was selected from the GUI 320 in FIG. 3E. As shown in FIG. 3F, the option 328 can be un-selectable (e.g., greyed out) until the employee completes one or more actions. The one or more actions can include scanning a unique identifier, label, barcode, or other type of tag for each of the items 326A and 326N at the customer's vehicle. The employee can scan the unique identifier for each of the items 326A and 326N using a scanning device, such as a barcode scanner, UPC reader, camera, or other type of scanning device. In some implementations, the scanning device can be part of the user device 120 (e.g., a camera integrated into the user device 120, which can be a smartphone). In some implementations, the scanning device can be separate from the user device 120 and may community over one or more networks with the user device 120 (e.g., a barcode scanner/reader that communicates with the user device 120 via a BLUETOOTH connection).

Once the employee scans the unique identifier for an item, such as the item 326A, using the scanning device, the scanning device can transmit scan information to the user device 120 and/or the server system 116. The user device 120 and/or the server system 116 can process the scan information to determine whether the scan information matches an expected unique identifier for the particular item. As an illustrative example, the server system 116 can access item information in a data store and compare the accessed item information with the scan information to determine whether the scan information matches the accessed item information. If the information matches, then the server system 116 determines that the customer provided the correct item to be returned to the employee and the drive-up return process continue. The server system 116 can then transmit a notification to the user device 120 that causes the user device 120 to present a pop-out window 332 overlaying at least a portion of the GUI 324, which is depicted in FIG. 3G.

Figure 3H:
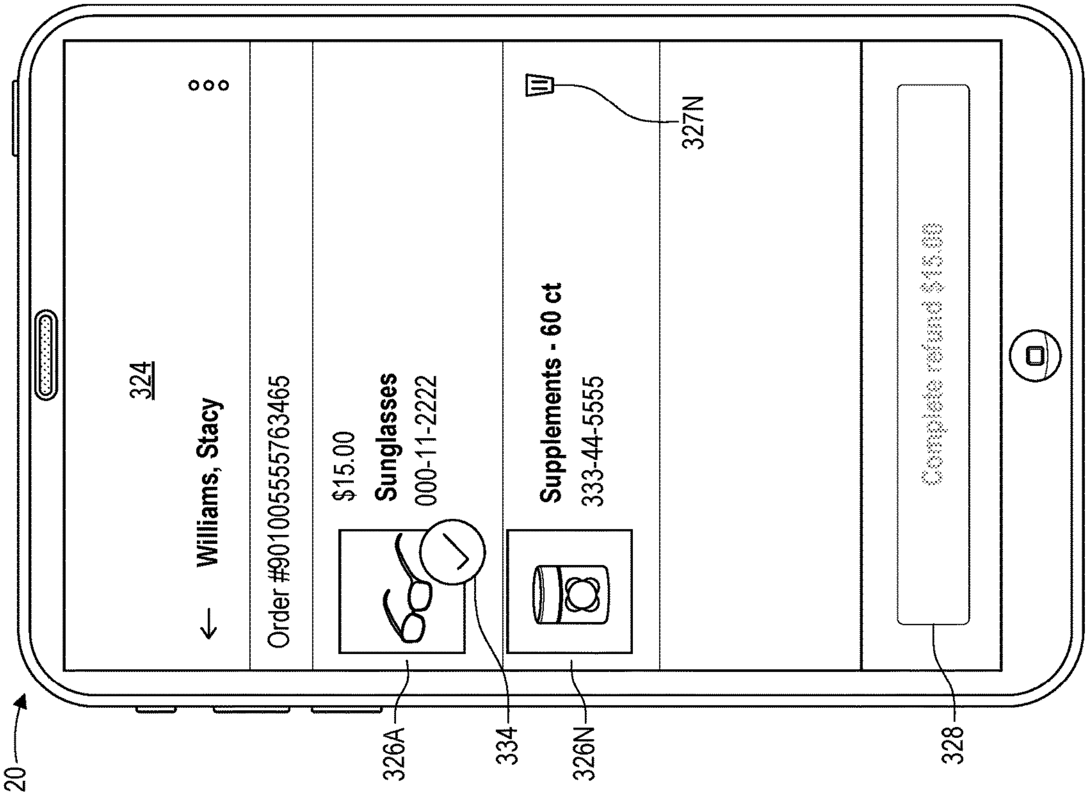
Figure 3G:
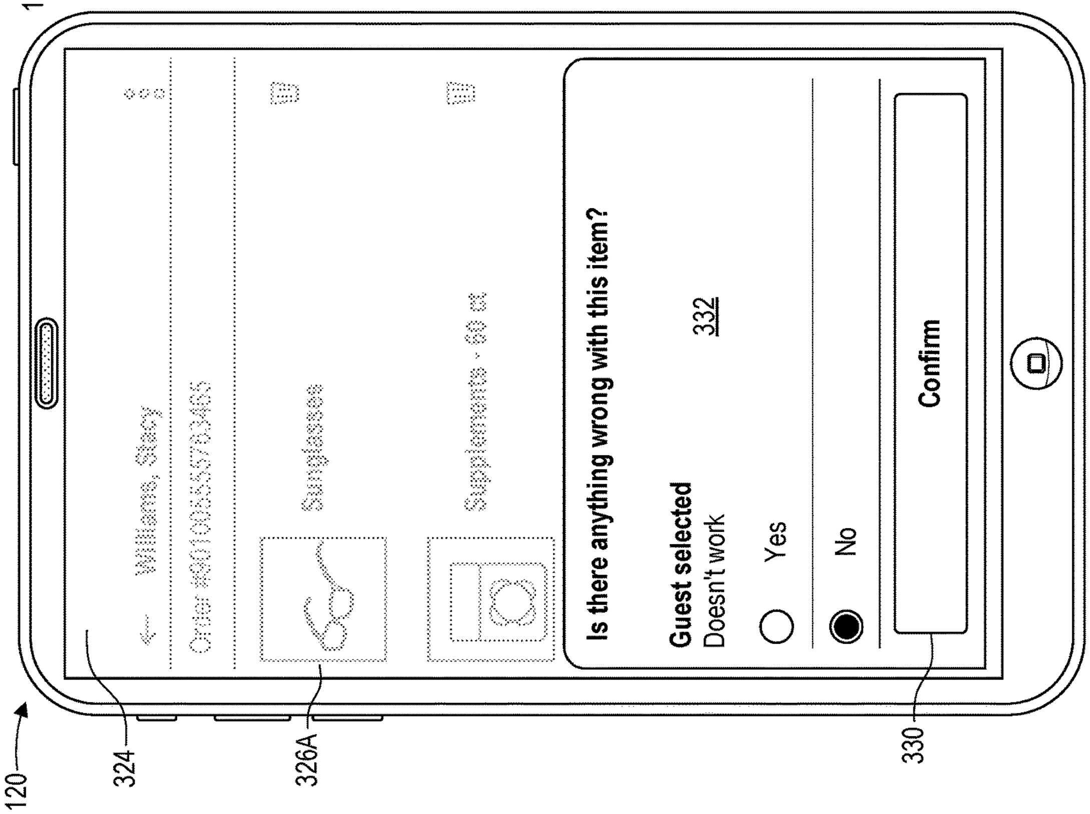

As shown in FIG. 3G, once the employee scans the unique identifier for the item 326A and the unique identifier is verified for the item as described above, the pop-out window 332 can be automatically presented over a portion of the GUI 324. The pop-out window 332 can present the employee with a prompt to verify whether the customer's reason for returning the item 326A. In the illustrative example of FIG. 3G, the customer selected a return reason of "doesn't work" for the item 326A, a pair of sunglasses. The employee can inspect the item 326A after scanning the unique identifier and/or ask the customer why they are returning the item 326A. Based on the employee's inspection and/or the customer's response, the employee can select between options that indicate the customer's selected return reason is accurate, the customer's return reason is inaccurate, something is wrong with the returned item, and/or nothing is wrong with the returned item. The employee can then select an option 330 (e.g., button, control) to "confirm" their selection in the pop-out window 332. Selecting the option 330 can cause the pop-out window 332 to be removed from overlaying the GUI 324 and the GUI 324 can be presented at the user device 120, as depicted in FIG. 3H.

The employee selection in the pop-out window 332 can be transmitted to the server system 116 and used to determine how to route the returned item back into a fulfillment system for the retail environment. For example, if the employee's selection in the window 332 indicates that something is wrong with the returned item, the server system 116 can determine that the item should be routed to a warehouse, storage facility, and/or liquidation system, rather than putting the item on a shelf for sale in the retail environment. As another example, if the employee's selection in the window 332 indicates that nothing is wrong with the returned item, the server system 116 can determine that the item should be put on the shelf for sale in the retail environment. As yet another example, if the employee's selection in the window 332 confirms the customer's reason for returning the item 326A, then the server system 116 can use the customer's reason for return as a factor or other data point used in assessing returns in the fulfillment system and ways by which to optimize or otherwise improve the fulfillment system and/or customer experiences/expectations.

The GUI 324 in FIG. 3H still presents the items 326A and 326N. In comparison to the GUI 324 that was initially presented to the employee and described in FIG. 3F, the GUI 324 in FIG. 3H now includes an icon 334 with the item 326A. The icon 334 is a green circle with a checkmark. The icon 334 may also be represented by one or more other graphical or visual elements. The icon 334 indicates that the item 326A has been successfully scanned and verified for return, as described in reference to FIG. 3G. Now that the item 326A has been successfully scanned and verified for return, the icon 327A (e.g., the garbage can) of FIG. 3F is no longer presented with the item 326A. Thus, the item 326A cannot be cancelled from the return.

The item 326N is still presented with the icon 327N because the employee has not yet scanned a unique identifier associated with the item 326N or performed any other actions with respect to verifying the item 326N for return. The employee can accordingly perform the scanning and verification steps described in reference to the item 326A in FIGS. 3F-G for the item 326N.

Furthermore, the option 328 has been updated automatically in the GUI 324 of FIG. 3H based on the item 326A being successfully scanned and verified for return. More specifically, text inside the option 328 has been updated to reflect "Complete refund $15.00." Thus, the text inside the option 328 can be updated to reflect a total refund that the customer will receive, based on how many of the items and/or which items in the return have been successfully scanned and verified for return. As more items are successfully scanned and verified for return, the text inside the option 328 can be automatically updated to reflect the total refund that the customer will receive.

Figure 3I:
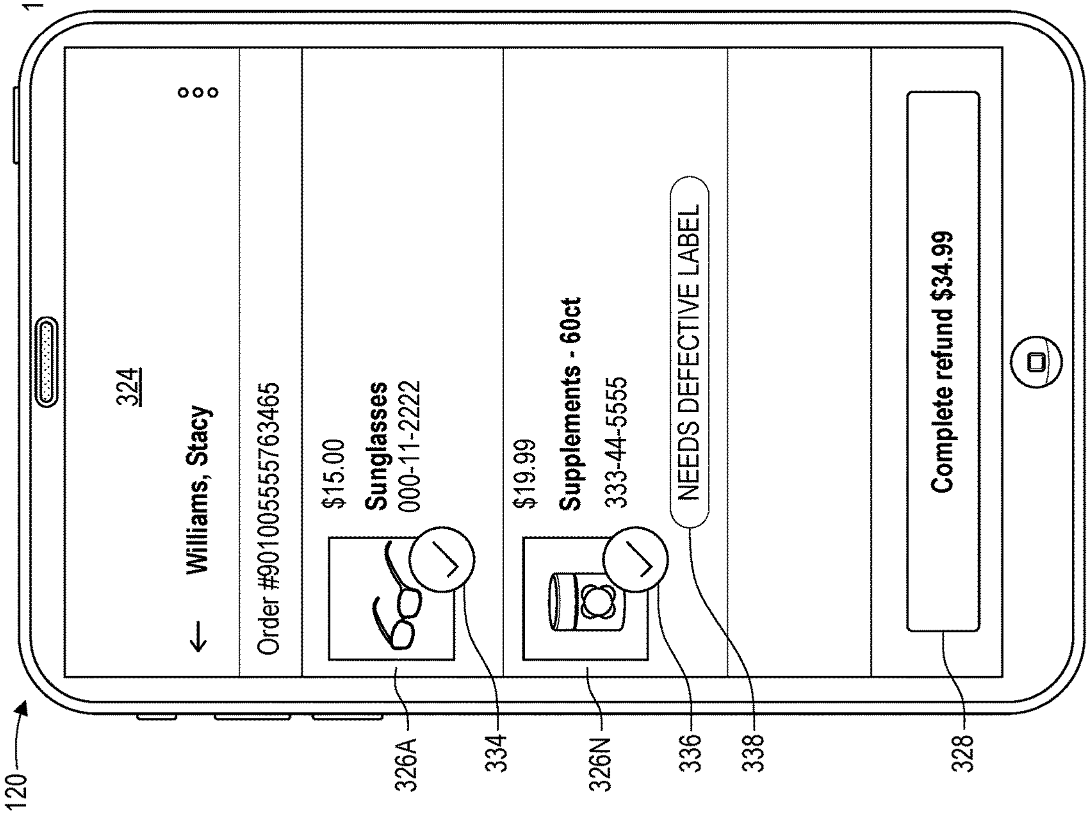

As shown in the GUI 324 of FIG. 3H, the option 328 is still un-selectable. This is because the employee has not scanned and verified all of the items in the return order (e.g., the item 326N) or cancelled one or more of the items in the return order (e.g., the item 326N). In other words, the option 328 becomes automatically selectable by the employee once the employee scans the unique identifier for the item 326N and that unique identifier is verified for the item 326N or the employee selects the icon 327N to cancel the item 326N from the particular drive-up return. Refer to FIG. 3I for further discussion.

FIG. 3I shows the GUI 324, which has been updated automatically in response to the item 326N being successfully scanned and verified for return. As a result, an icon 336 is presented with the item 326N in the GUI 324. The icon 336 can be the same as or similar to the icon 334 described in reference to FIG. 3H. Furthermore, the icon 327N (e.g., the garbage can) is removed from display with the item 326N, thereby indicating that the item 326N cannot be cancelled from this drive-up return.

The GUI 324 also presents a notification 338 with the item 326N. The notification 338 indicates that the item 326N requires a "defective label." The notification 338 can be presented in the GUI 324 in response to input from the employee while scanning and/or verifying the item 326N. For example, the employee can provide input in a pop-out window like the pop-out window 332 in FIG. 3G that indicates the unique identifier is detached from the item 326N, the unique identifier is damaged or otherwise missing, and/or the item 326N is damaged or otherwise defective. When the unique identifier is missing, the employee can still verify the item for return based on manually inputting a UPC or DPCI for the item, as described further in reference to FIG. 3M.

The employee's input can be transmitted by the user device 102 to the server system 116 and used by the server system 116 to determine whether a label should be generated for the item. In some implementations, the employee can provide input based on visual inspection of the item 326N that indicates whether the item is actually defective/damaged. The server system 116 can determine, for example, that a defective label should be generated for the item 326N because the item 326N is damaged or otherwise defective. Despite being damaged or defective, the item 326N can still be put on the floor of the retail environment and sold. However, in some implementations, when the item is damaged or defective and put on the floor to be sold, the defective label can indicate that the item is being sold for a reduced price. As another example, the server system 116 can retrieve from a data store information associated with the item 326N, which can indicate that the item 326N typically cannot be remerchandised after being purchased and therefore many not be returned to the floor of the retail environment to be resold. In other words, the item 326N can be classified as an auto-defective item. Auto-defective items can include but are not limited to food and other type of produce and/or infant or child products. In some implementations, the auto-defective items can include but are not limited to types of products that may be regulated.

As yet another example, the server system 116 can determine that a new label should be printed for the item 326N to replace the unique identifier that was scanned by the employee or missing during the scanning and verification of the item 326N for return. The server system 116 can generate a notification about needing a new label for the item 326N to the user device 120, which can then be presented in the GUI 324 as the notification 338.

Although the notification 338 is presented in the GUI 324 indicating that a defective label is needed for the returned item 326N, the employee may still proceed with completing the drive-up return for the customer. In other words, the notification 338 can serve as an indicator to the employee that at some point before the employee returns the item 326N to the store floor to be sold, they will need to generate, print, and attach a defective label to the item 326N.

In the GUI 324 of FIG. 3I, the option 328 to complete the refund to the customer's form of payment has also been automatically updated to reflect a new total amount that the customer will be refunded. Since the item 326N was successfully scanned and verified for return, the text inside the option 328 has been updated to reflect "complete refund $34.99." The option 328 is also now selectable because all of the items 326A-N for the particular drive-up return have been either successfully scanned and verified for the return or cancelled from the return.

Selecting the option 328 at the user device 120 can cause a refund to be issued to the customer's form of payment in the amount indicated in the text of the option 328. For example, the user device 120 can transmit a notification to the server system 116 indicating that the employee provided input to select the option 328. The server system 116 can accordingly transmit instructions to a banking or other financial system indicating that the amount indicated in the text of the option 328 should be electronically routed to the customer's identified form of payment.

Figure 3J:
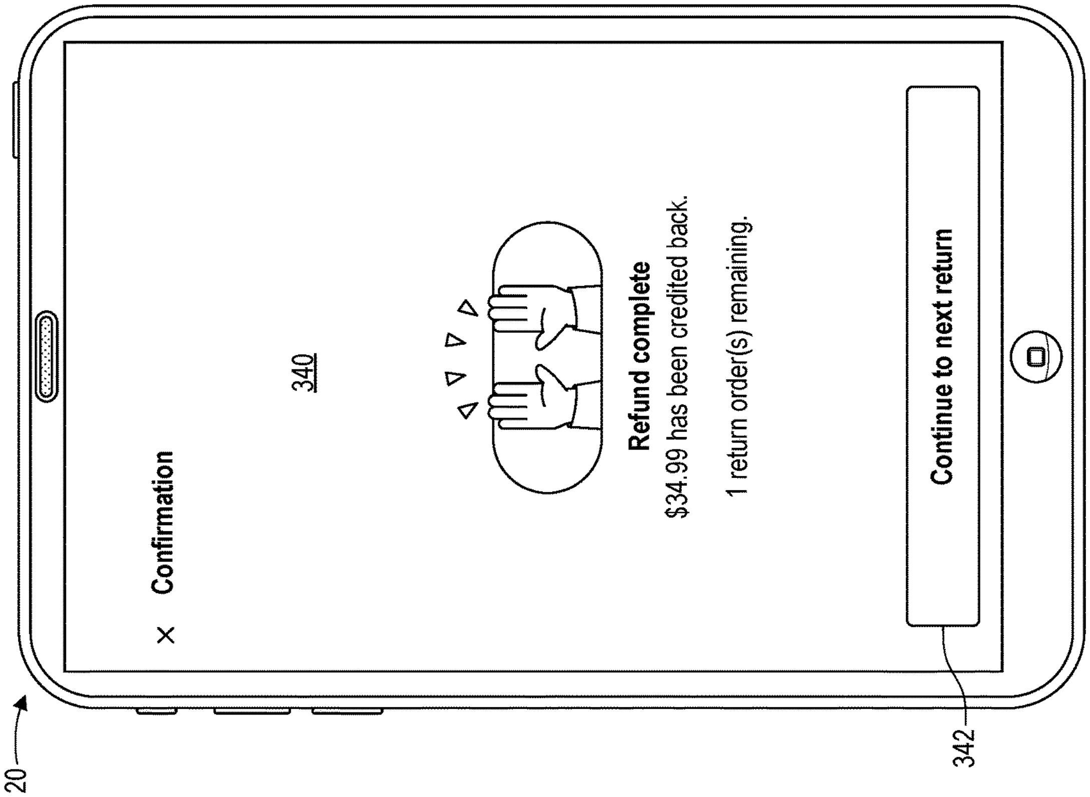
Figure 3L:
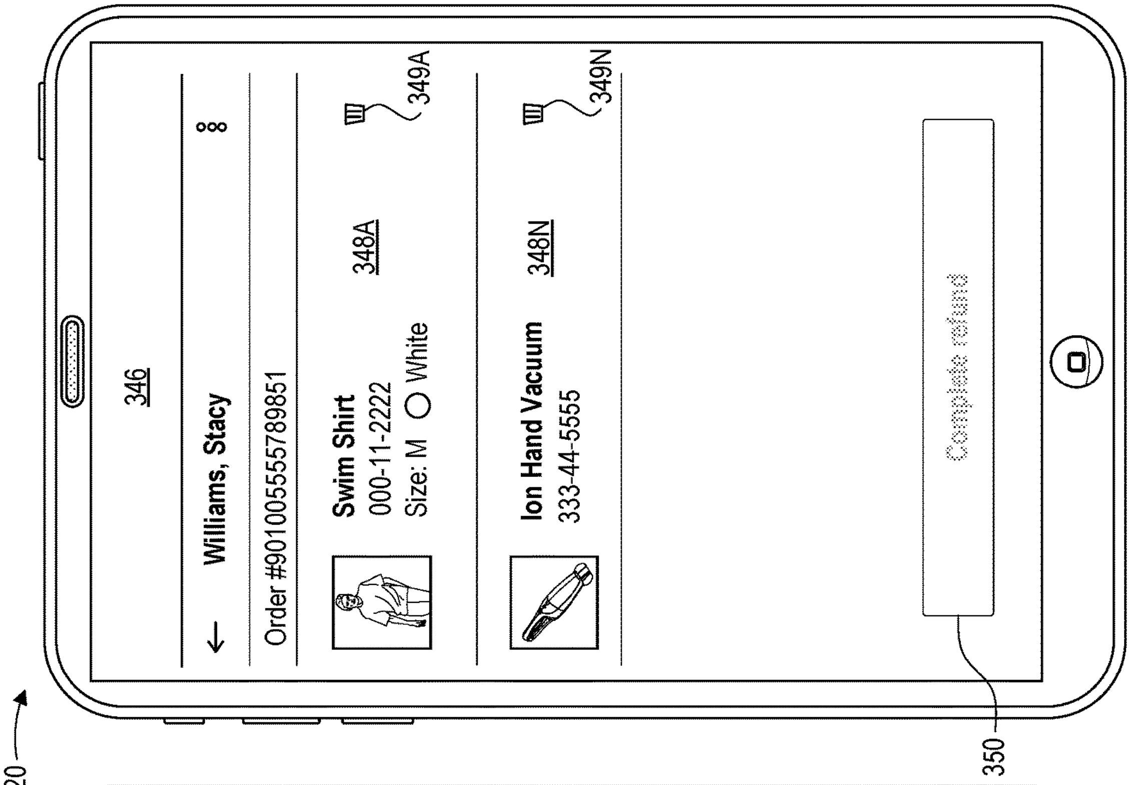

Selecting the option 328 can also cause GUI 340 to be presented at the user device 120, which is depicted in FIG. 3J. The GUI 340 can provide information confirming that the refund was issued to the customer's form of payment. The GUI 340 can also indicate whether any other drive-up returns are remaining to be completed for the particular customer. In the example depicted and described in FIGS. 3A-Q, 1 drive-up return remains for the particular customer. The GUI 340 can include an option 342 (e.g., button, control), which can be selected by the employee to seamlessly transition to the next drive-up return to be completed for the particular customer. In some implementations, if the customer has no more drive-up returns to be completed, the GUI 340 may simply provide information indicating that the refund has been completed and thus the drive-up return has been completed. The user device 120 can then return to presenting the GUI 300 described in reference to FIG. 3A and/or the employee can navigate back to the GUI 300 using one or more controls or options presented in the dedicated application at the user device 120.

Figure 3K:
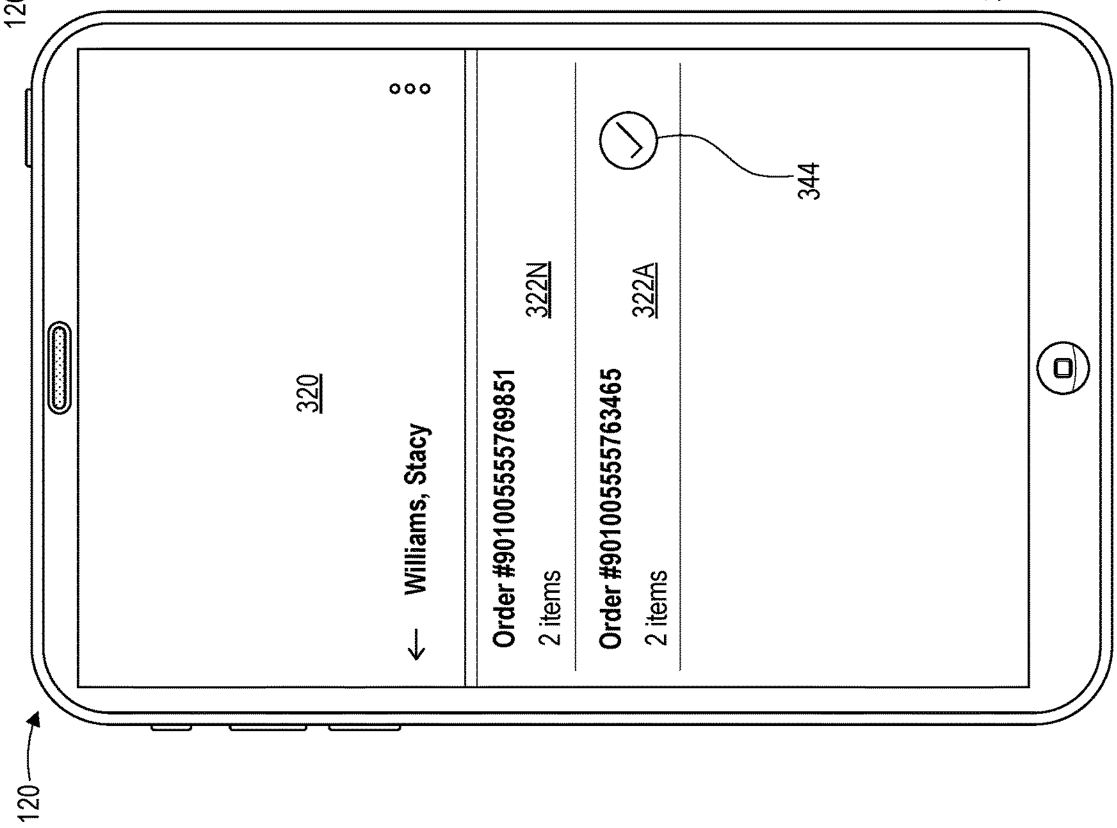
Figure 3N:
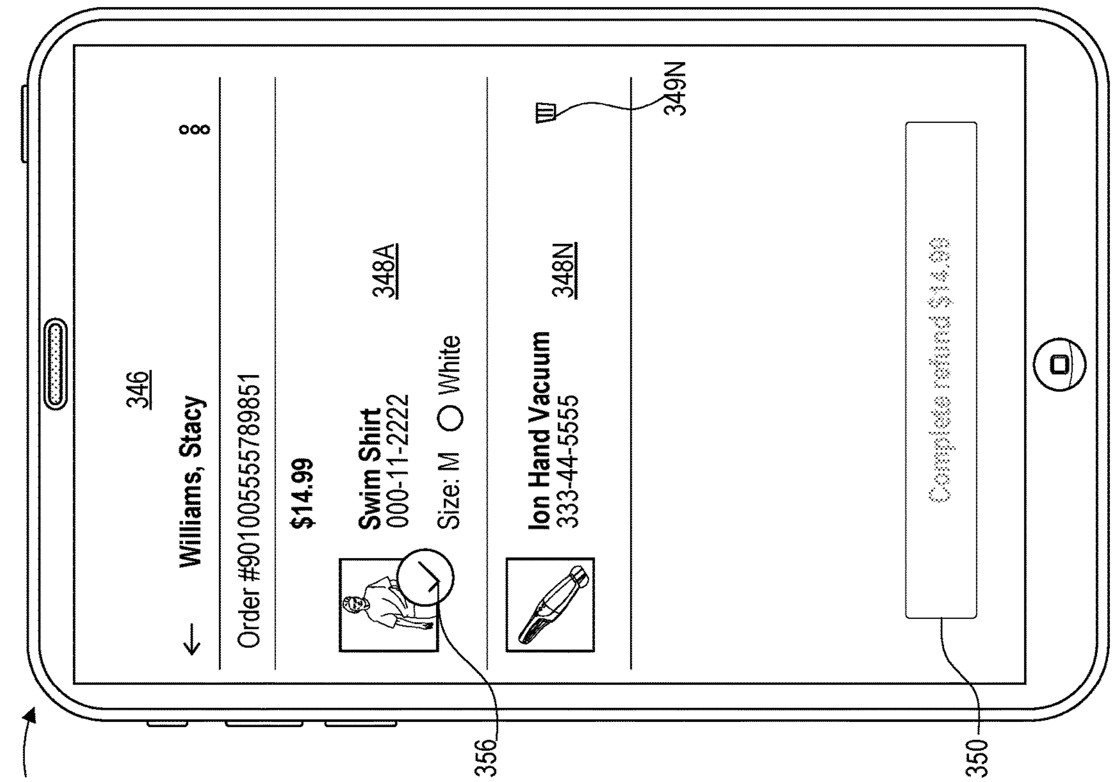

Selecting the option 342 can cause the GUI 320 to be presented at the user device 120, which is depicted in FIG. 3K. The GUI 320 in FIG. 3K has been updated since the GUI 320 depicted and described in reference to FIG. 3E, which is based on completion of the first drive-up return 322A. As shown in FIG. 3K, the completed drive-up return 322A is now presented below the drive-up return 322N, which still remains to be completed by the employee. The completed drive-up return 322A is also presented with an icon 344. The icon can be similar to or the same as the icon 334 described in reference to FIG. 3H. The icon 344 can be presented in the GUI 320 with the drive-up return 322A to visually indicate that the drive-up return 322A has been successfully completed (e.g., the customer has been refunded for the item(s) returned in the drive-up return 322A). In some implementations, the GUI 320 of FIG. 3K may not be necessary, such as when all returns for the same customer are consolidated into a single return.

The employee can select the remaining drive-up return 322N in order to begin the drive-up return process for this return. Selecting the drive-up return 322 can cause the user device 120 to present GUI 346, which is depicted in FIG. 3L.

The GUI 346 in FIG. 3L can include information about the selected drive-up return 322N. For example, the GUI 346 presents items 348A and 348B that are part of the drive-up return 322N and expected to be returned by the customer. The items 348A and 348N are also presented in the GUI 346 with respective icons 349A and 349N. One or more of the icons 349A and 349N can be selected to cancel the respective items 348A and 348N during the drive-up return. Presentation of the items 348A and 348N is similar to or the same as the items 326A and 326N in the GUI 324 described in at least FIG. 3F.

The GUI 346 also includes option 350 (e.g., button, control), which can be selected by the employee to complete refund for the items 348A and/or 348N presented in the GUI 346. The option 350 is un-selectable in the GUI 346 because the employee has not yet scanned and verified either of the items 348A and 348N in the drive-up return. The option 350 is the same as or similar to the option 328 described in at least FIG. 3F. Refer to at least FIG. 3F for further discussion about information that is presented in the GUI 346 in FIG. 3L.

In the example of FIG. 3L, the employee can proceed by attempting to scan a unique identifier associated with the item 348A. However, when the customer hands over the item 348A, the item 348A may not have the unique identifier or the unique identifier can be destroyed, damaged, or otherwise unscannable or unreadable. As a result, a pop-out window 352 can be presented overlaying at least a portion of the GUI 346, as depicted in FIG. 3M.

In some implementations, items from multiple return orders can be presented in a single GUI. As a result, the employee may not be required to select one return order (such as the return 322A) at a time to complete return of items per order. The employee may scan and identify items associated with multiple return orders from the single GUI and then select the option 350 only once, after all items for the multiple return orders have been scanned and identified by the employee for return.

Figure 3M:
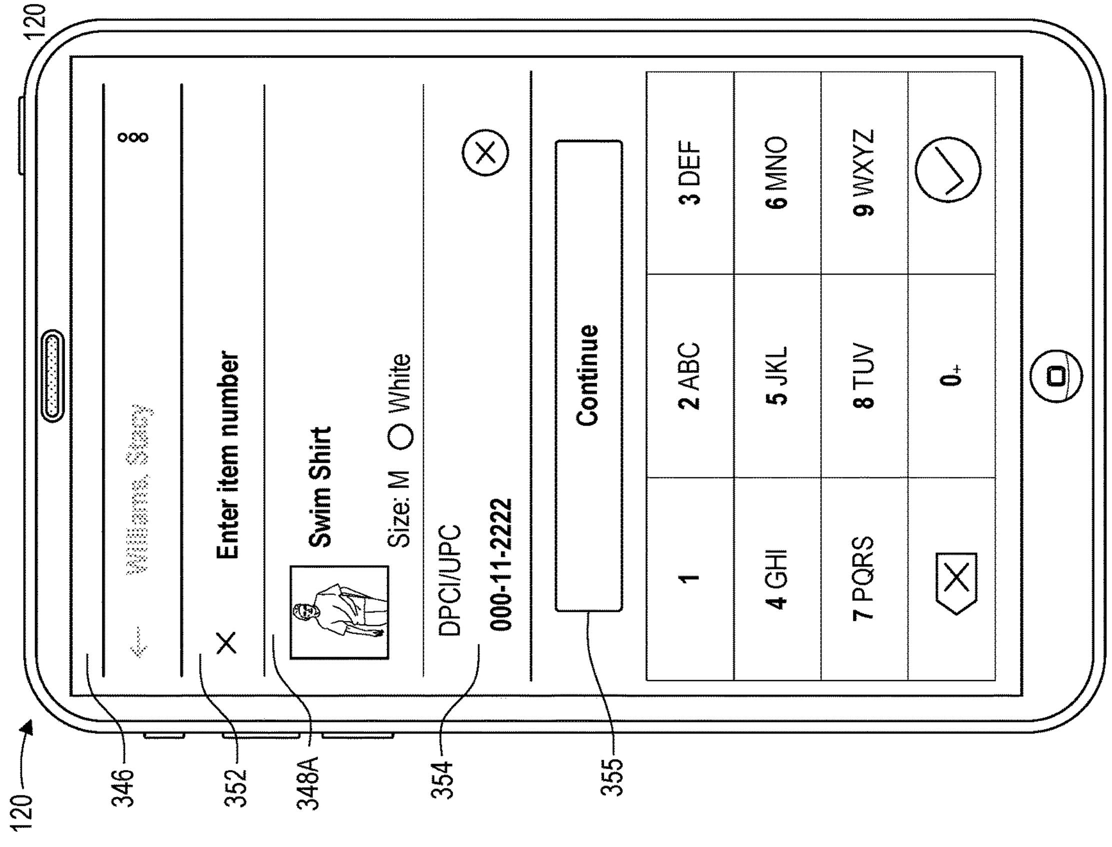

The pop-out window 352 of FIG. 3M can present a data field 354 in which the employee can manually input a UPC, DPCI, or other unique identification number associated with the item 348A. The employee can read the UPC, DPCI, or other unique identification number from the item 348A and then input that value into the data field 354 using one or more selectable controls presented in the pop-out window 352 (e.g., a virtual keyboard of numbers and/or letters). Once the employee provides input indicating that value into the data field 354, the employee can select an option 355 (e.g., button, control) to "continue."

Selecting the option 355 can cause the user device 120 to transmit the value for the item 348A to the server system 116 described herein. The server system 116 can retrieve, from a data store, information associated with the particular item 348A. The retrieved information can include an expected unique identification number that has been assigned to the item 348A. The server system 116 can then compare the value received from the user device 120 with the expected unique identification number to determine whether they match. If they match, the server system 116 generates a notification indicating that the customer is returning the item that is expected to be returned in this drive-up order return. The notification can be transmitted to the user device 120, thereby causing the user device 120 to present the updated GUI 346 as depicted in FIG. 3N. If the values do not match, the server system 116 can generate a notification indicating that the customer is not returning the item that is expected to be returned. This notification can be transmitted to the user device 120, thereby causing the user device 120 to present a GUI indicating that the item 338A cannot be returned.

Selecting the option 355 can cause the user device 120 to present the updated GUI 346, which is depicted in FIG. 3N. In the updated GUI 346 of FIG. 3N, an icon 356 is presented with the item 348A to indicate that the item 348A has been successfully identified and verified for the drive-up return. The icon 356 can be the same as or similar to the icon 344, which is described in at least FIG. 3H. Furthermore, as described in reference to FIG. 3H, the icon 349A (e.g., the garbage can) is no longer presented with the item 348A.

Text inside the option 350 has also been updated to reflect that the item 348A has been successfully identified and verified for the return. For example, the text of the option 350 now indicates "Complete refund $14.99," thereby indicating a total amount thus far to be refunded to the customer's form of payment. The option 350 remains un-selectable, however, because the employee has not yet successfully identified and verified the item 348N or cancelled the item 348N from this particular drive-up return.

In the illustrative example of FIG. 3N, the employee can select the icon 349N (e.g., the trash can) that is presented with the remaining item 348N. The user may select this icon to cancel or otherwise remove the item 348N from the drive-up return. Selection of the icon 349N causes a pop-out window 358 to be presented over at least a portion of the GUI 346, as depicted in FIG. 3O.

The pop-out window 358 can prompt the employee to provide input indicating why they are cancelling the item 348N from the drive-up return. For example, the employee can select amongst the following options: "Guest did not bring this item," "Guest brought wrong item," "Cannot scan/identify item," or the like. One or more other options may be presented and/or the employee can provide input such as text that provides a more detailed response about why the employee is cancelling the item 348N. In the example of FIG. 3O, the employee has selected the option that "Guest did not bring this item." The employee can then select an option 360 (e.g., button, control) to "remove" the item 348N from the current drive-up return. In some implementations, the pop-out window 358 can present any quantity of reasons that the employee can select. For example, the pop-out window 358 can present options for "Guest did not bring this item" and "Cannot scan/identify item." The pop-out window 358 can present additional, fewer, or other options.

Selecting the option 360 can cause the user device 120 to transmit a notification of the reason for cancelling the item 348N to the server system 116. The server system 116 can use the reason for cancelling the item 348N to update information about the particular drive-up return. For example, the server system 116 can remove the item 348N from the information for the particular drive-up return, and transmit instructions to the user device 120 that cause the user device 120 to present the updated GUI 346 depicted in FIG. 3P. The server system 116 can also use the reason for cancelling the item 348N to update options presented at the customer's user device for next steps that can be taken for the item 348N. For example, the next steps may include starting a new return process for the item 348N at another time, instructing the customer to return with the item 348N and it's corresponding unique identifier (e.g., label, tag, barcode), or other actions.

Figure 3P:
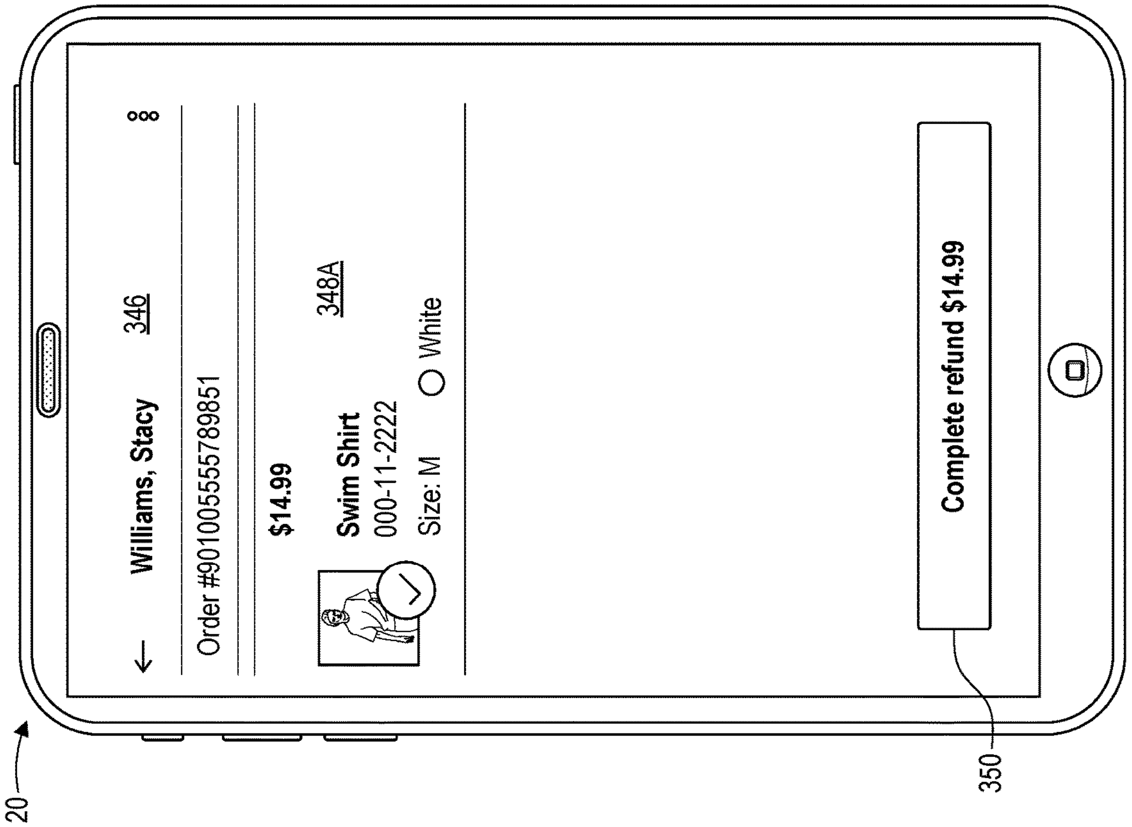
Figure 3O:
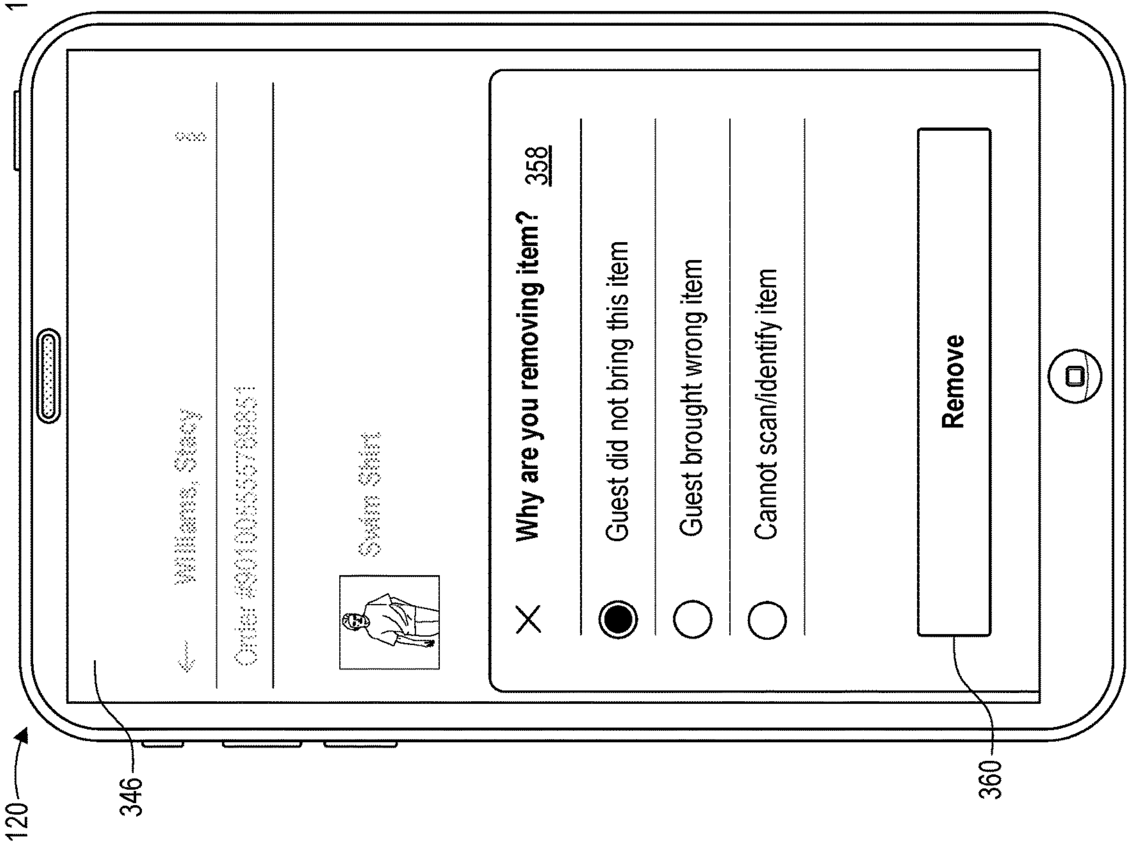
Figure 3Q:
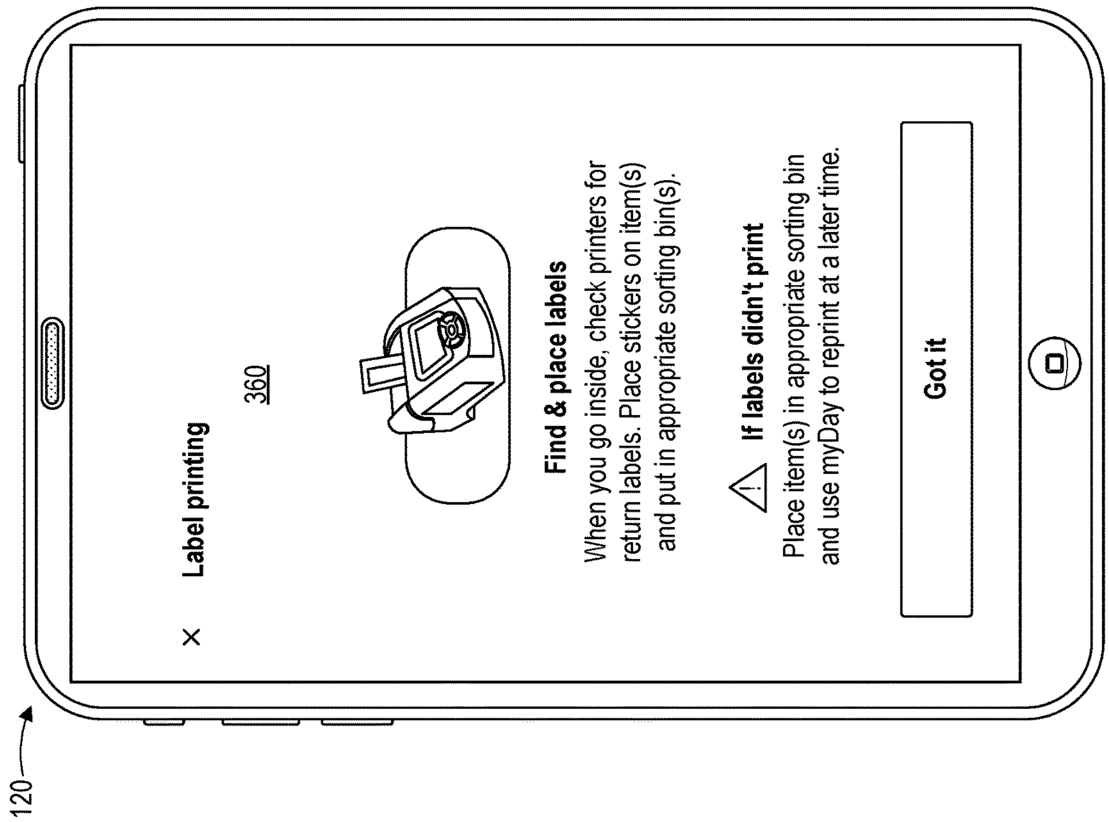

Selecting the option 360 can also cause the user device 120 to present the updated GUI 346 without the pop-out window 358, as shown in FIG. 3P. The updated GUI 346 in FIG. 3P now reflects only one item, the item 348A, as being part of the current drive-up return. Thus, by removing the item 348N as described in reference to FIGS. 3N-O, the GUI 346 is updated to reflect that the item 348N has in fact been removed from the drive-up return. Since the item 348N has been removed from the drive-up return and the item 348A has been successfully identified and verified for the return, the option 350 is now selectable. The text inside the option 350 has not been updated since the update made to the option 350 in FIG. 3N because only the item 348A is being returned in the current drive-up return. Therefore, the customer will only be issued a refund for the item 348A.

Selecting the option 350 can cause the user device 120 to transmit a notification to complete issuance of the refund to the customer's form of payment to the server system 116, as described further in reference to FIG. 3I. Upon selecting the option 350, a similar GUI as the GUI 340 described further in reference to FIG. 3J can be presented at the user device 120, thereby indicating that the refund was issued to the customer's form of payment.

FIG. 3Q shows an example GUI 360 that can be presented at the user device 120 after the drive-up return has been successfully completed. More particularly the GUI 360 can be presented in response to the server system 116 determining that a new label needs to be printed for one of the returned items. Refer to FIG. 3I for further discussion about determining, by the server system 116, when a new label is required for a returned item.

The GUI 360 can include information such as instructions about how the employee can proceed with generating and printing a label for a returned item. In some implementations, once the server system 116 determines that a new label is required for the returned item, the server system 116 can automatically generate a new label and instruct a printer in the retail environment to print the generated label. The employee can then receive a notification at their user device 120 indicating what printer printed the label. The employee can proceed to the printer identified in the notification, pick up the label, and attach the label to the returned item. The employee can then follow one or more instructions presented at their user device 120 about where to route or put the returned item for ingestion into the fulfillment system (e.g., placing the returned item in a bin to be transported to a warehouse or distribution center, a bin to be transported to a liquidation system, a bin to be routed to a spot on the floor of the retail environment for resale, etc.).

In some implementations, if the printer in the retail environment did not automatically print the new label for the returned item, the employee can use the dedicated application presented at their user device 120 to instruct the printer or another printer in the retail environment to print the label. In some implementations, if the printer in the retail environment did not automatically print the new label for the returned item, the GUI 360 can present instructions indicating that the employee should put the returned item in a particular bin, such as a bin for items having labels that will be printed at another time.

In some implementations, the GUI 360 can be presented automatically at the employee's user device 120 in response to a determination that a label needs to be printed/generated for a particular item being returned. The GUI 360 can be presented automatically in response to a determination that a label has been generated for a particular item being returned. In some implementations, the GUI 360 can present a list of returned items that require new labels to be generated and/or printed.

Although the GUIs of FIGS. 3A-Q are described in a particular sequence or order, any one or more of the GUIs of FIGS. 3A-Q can also be presented in one or more other orders or sequences at the employee's user device 120. Moreover, although one or more of the GUIs in FIGS. 3A-Q are described as being GUIs presented at the user device 120, one or more features or elements in the GUIs described in reference to FIGS. 3A-Q can also be presented as visual overlays and/or pop-out windows overlaying one or more of the other GUIs described in reference to FIGS. 3A-Q.

Moreover, the GUIs of FIGS. 3A-Q provide one or more benefits to employees at the retail environment. For example, the GUIs 3A-Q provide a full end-to-end automated process for transmitting information between user devices of the consumers and user devices of the employees so that the drive-up returns and drive-up order pickups can be seamlessly and efficiently completed at a same time.

Figure 4:
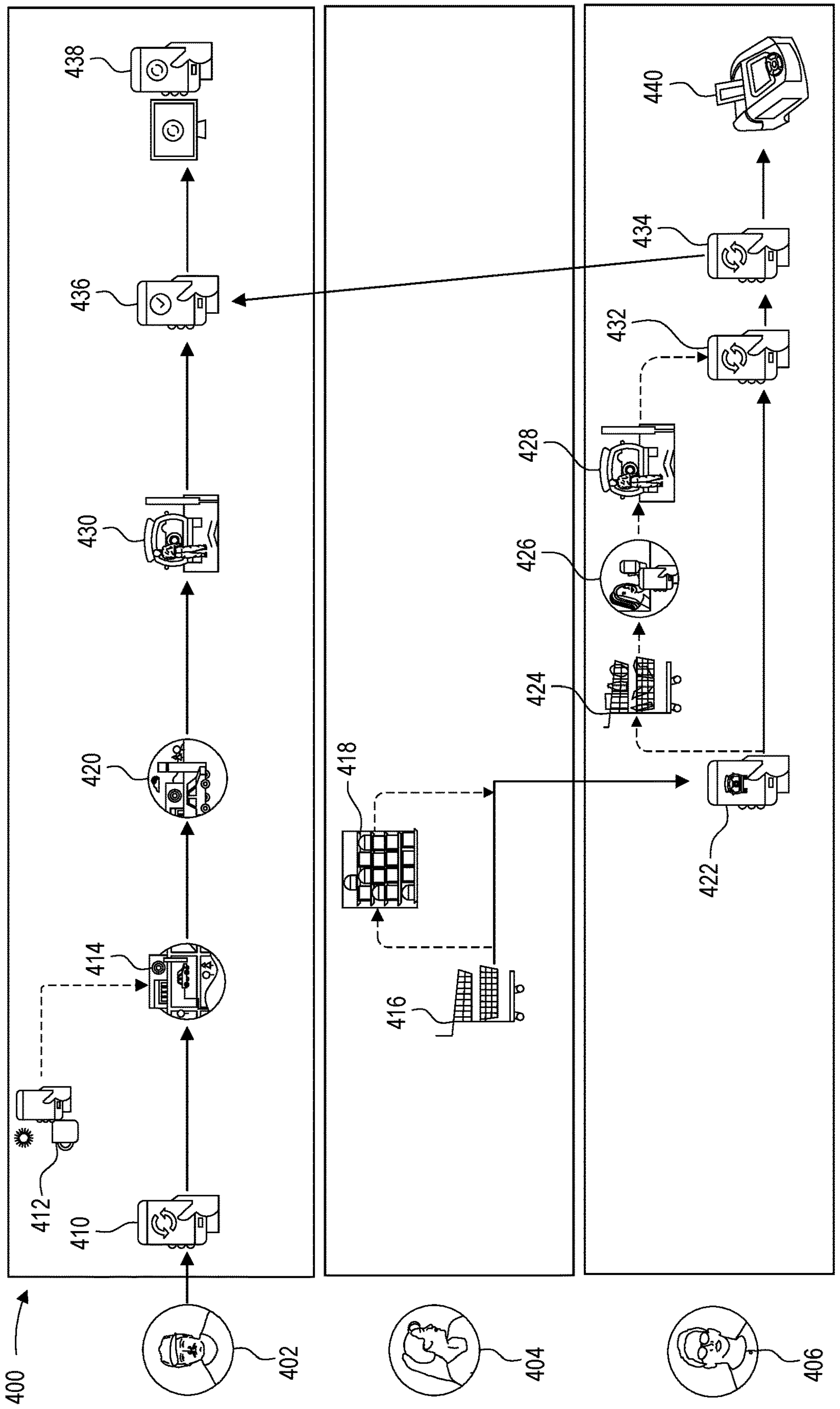
FIG. 4 is a conceptual diagram of an example process for a starting and completing a drive-up return service.

FIG. 4 is a conceptual diagram of an example process 400 for a starting and completing a drive-up return service. As described herein, the process 400 can be performed by multiple actors, including but not limited to a customer 402 and employees 404 and 406. In some implementations, the employees 404 and 406 can be the same person. As shown in the FIG. 4, the employees 404 and 406 can also be different. For example, the employee 404 can take ownership of and/or be assigned at least one task of preparing drive-up orders for pickup and/or drive-up returns. The employee 406 can take ownership of and/or be assigned at least one task for delivering the drive-up orders for pickup and/or completing/retrieving the drive-up returns.

Referring to the process 400 in FIG. 4, the customer 402 can initiate a drive-up return in the dedicated application at their user device, as described herein (block 410).

Optionally, the customer 402 may also place a drive-up order in the dedicated application at their user device (block 412). The customer 402 can place the drive-up order before, during, or after the customer 402 initiates the drive-up return.

The customer 402 can indicate that they are on their way to a retail environment for the drive-up order and/or return at some point after initiating the drive-up return and/or placing the drive-up order (block 414). When the customer 402 indicates that they are on their way to the retail environment, a reminder or notification can be presented at the customer 402's device to bring the item(s) associated with the drive-up return.

Once the customer 402 indicates that they are on their way to the retail environment, the preparation employee 404 can receive an indication at their user device to prepare a return vehicle to be used by the employee 404 or the delivery employee 406 to complete the drive-up return for the customer 402 (block 416). The preparation employee 404 can also prepare one or more bags of items for the drive-up order that the customer 402 placed at their device (block 418). As part of preparing the bags for the drive-up order, the employee 404 can take the bags for the drive-up order out of hold, meaning the bags are ready to be delivered to the customer 402 when the customer 402 arrives at the retail environment.

The customer 402 can arrive at the retail environment and select an option in the dedicated application at their device that indicates "I'm here" (block 420).

Responsive to selecting the option "I'm here" by the customer 402, the delivery employee 406 can receive a notification at their device that the customer 402 has arrived (block 422).

The employee 406 can grab the bags for the customer 402's drive-up order out of the hold location (block 424), which were prepared earlier in the process 400 by the preparation employee 404. The employee 406 can bring the bags for the drive-up order to the customer 402's vehicle in a designated parking spot at the retail environment.

At the customer 402's vehicle, the customer 402 can present a code or other order pickup identifier on their device. The employee 406 can enter in or scan the customer 402's code using their device (block 426). After scanning the code, the employee 406 can place the bags for the customer 402's drive-up order in the customer 402's vehicle (block 428). The customer 402 can let the employee 406 place the bags for the drive-up order in their vehicle and then retrieve the item(s) for the drive-up return from the vehicle (block 430).

The employee 406 can initiate the return of the item(s) at their device by scanning a unique identifier of the item and verifying the item, such as verifying a condition of the item and/or whether the item is returnable (block 432). Once the employee 406 successfully scans and verifies the item for return, the employee 406 can mark the return as complete (block 434). Marking the return as complete causes an order and/or return completed confirmation notification to be presented at the device of the customer 402 (block 436). In some implementations, an order pickup completion confirmation can be presented separately from a return completed confirmation at the device. For example, the customer 402 can receive the order pickup completion confirmation at a first time, then the employee 406 can perform the return process at a second time, confirm that the return is completed, and then the customer 402 can receive the return completed confirmation notification at their device at a third time. The third time can be later than the first time.

The customer 402 can check a status of any of their orders and/or returns using the dedicated application or a web application launched in a web browser at their device or another computing device (block 438).

The employee 406 can also bring the returned item(s) back into the retail environment to be properly labeled and/or sorted (e.g., sent to the floor of the retail environment to be resold, sent to a warehouse or other distribution center, sent to a liquidation system, etc.) (block 440).

Figure 5A:
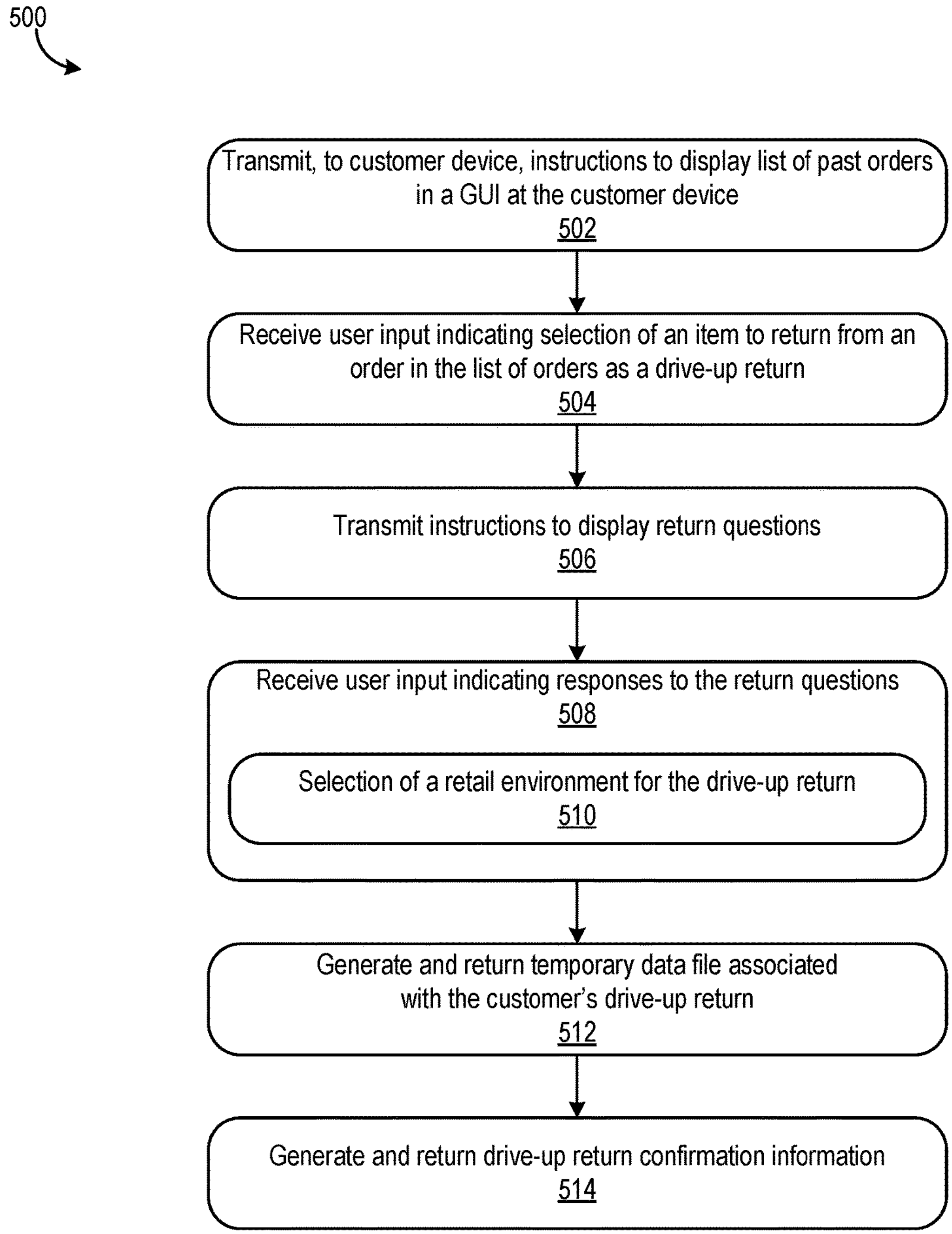
FIG. 5A is a flowchart of a process for initiating a drive-up return at a customer user device.

FIG. 5A is a flowchart of a process 500 for initiating a drive-up return at a customer user device. The process 500 can be performed by the server system 116 described in reference to FIG. 1. The process 500 can also be performed by one or more other servers, computing systems, cloud-based systems, computing devices, and/or network of devices and/or systems. For illustrative purposes, the process 500 is described from the perspective of a server system.

Referring to the process 500 in FIG. 5A, the server system can transmit, to a customer device (e.g., the user device 102), instructions to cause the customer device to display a list of past orders in a GUI display at the customer device (block 502). The instructions can be transmitted to the customer device of a plurality of customer devices.

In block 504, the server system can receive user input from the customer device indicating a selection of at least one item to return from an order presented in the list of past orders. The at least one item can be part of an order that was placed, by the customer, online using the customer device, such as through an electronic platform having a relationship with the retail environment. The at least one item can be part of an order that was placed, by the customer, in a retail environment, such as an in-store order performed at a physical retail environment having a relationship with the retail environment. Refer to at least FIGS. 2A and 2C for further discussion.

The user input in block 504 can include selection of a drive-up return option for the at least one item. For example, the server system can transmit instructions that, when executed by the customer device, cause the customer device to present a list of selectable return options in the GUI display, the list of selectable return options including the drive-up return option, an in-store return option, and/or a mail-in return option. The customer can select the drive-up return option, although the customer can also select any of the other return options presented in the GUI display. Refer to at least FIG. 2B for further discussion.

In some implementations, responsive to the customer device presenting the list of past orders in the GUI display, the server system can receive, from the customer device, user input indicating selection of the order presented in the list of past orders. The server system can then transmit, to the customer device, instructions that, when executed by the customer device, cause the customer device to present a list of items associated with the selected order in the GUI display. Then the server system can receive, from the customer device, user input indicating selection of the at least one item to return from the list of items presented in the GUI display (block 504).

Accordingly, the server system can transmit instructions to the customer device that cause the customer device to display one or more return questions in the GUI display for the at least one item selected by the customer for the drive-up return (block 506). The return questions can include a question prompting the customer at the customer device to verify that they have an item identification label (e.g., barcode, tag) for the at least one item. The return questions can include at least one question prompting the customer at the customer device to provide user input indicating at least one reason for performing the drive-up return for the at least one item. The return questions can additionally or alternatively include a question prompting the customer to select an option to receive a replacement item for the at least one item or a refund to an original electronic payment method of the customer. Refer to at least FIGS. 2E and 2F for further discussion.

As another example, the return questions can include a question prompting the customer at the customer device to provide user input indicating selection of a retail environment location for performing the drive-up return for the at least one item. For example, the server system can transmit, to the customer device, instructions that, when executed by the customer device, cause the customer device to present a list of retail environment locations for performing the drive-up return for the at least one item, the list of retail environment locations including: at least one recently visited retail environment, at least one retail environment that is a threshold distance away from a current or last known location of the customer device, and/or at least one retail environment that is the threshold distance away from the current or last known location of the customer device that does not allow drive-up returns. The instructions can also cause the customer device to present, in the GUI display, a search function where the customer can provide user input indicating a city, state, zip code, and/or retail environment name that the customer would like to perform the drive-up return. Refer to at least FIG. 2D for further discussion.

The server system can receive user input from the customer device indicating at least one response to the return question(s) presented at the customer device (block 508). The user input can include, for example, a selection of a retail environment for the drive-up return (block 510). The selected retail environment location for performing the drive-up return for the at least one item can be different than the retail environment where the at least one item was purchased. The selected retail environment location for performing the drive-up return for the at least one item can also be the same as the retail environment where the at least one item was purchased.

The server system can generate and return a temporary data file associated with the customer's drive-up return (block 512). Returning the temporary data file can include storing the temporary data file in temporary storage and/or a data store. The temporary data file can contain the user input indicating the responses to the return questions. Additionally or alternatively, the temporary data file can include customer information associated with the customer device, such as a customer name, customer location, form of payment, vehicle information, etc.

In some implementations, at any point in time before the customer begins their journey to the retail environment or arrives at the retail environment to perform the drive-up return, the server system can receive, from the customer device, user input indicating cancellation of the drive-up return for the at least one item. Responsive to receiving this user input, the server system can delete the temporary data file, erase the file from memory, or otherwise remove the file from memory or storage, such as a data store. As a result, any information about the particular item to be returned and/or the customer information may not be stored. In some implementations, once the drive-up return is in fact completed, the temporary data file may also be deleted, erased, or otherwise removed, as mentioned above.

Figure 6:
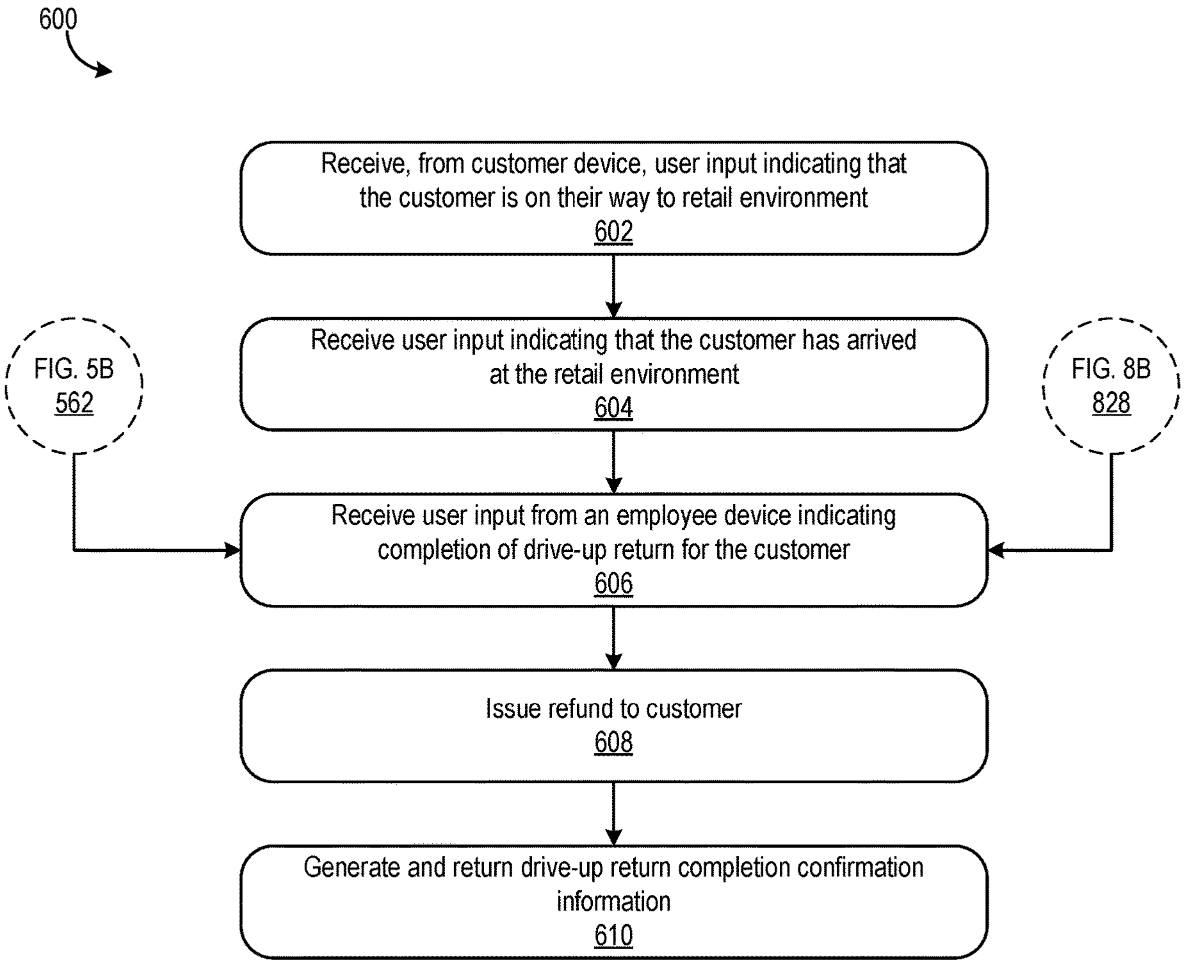
FIG. 6 is a flowchart of a process for performing a drive-up return at a fulfillment location, such as a retail environment.

The server system can generate and return drive-up return confirmation information in block 514. For example, responsive to receiving, from the customer device, user input indicating responses to the return questions, the server system can transmit, to the customer device, the return confirmation information for presentation in the GUI display. The customer can then review and confirm the information presented in the GUI display such that the server system receives, from the customer device, user input indicating confirmation of the presented information. The customer's confirmation can thereby indicate that the drive-up return has been officially initiated and the customer can now bring the at least one item to the retail environment to complete the drive-up return process. Refer to at least FIG. 2G for further discussion. Refer to FIG. 6 for further discussion about completing the drive-up return process.

Figure 5B:
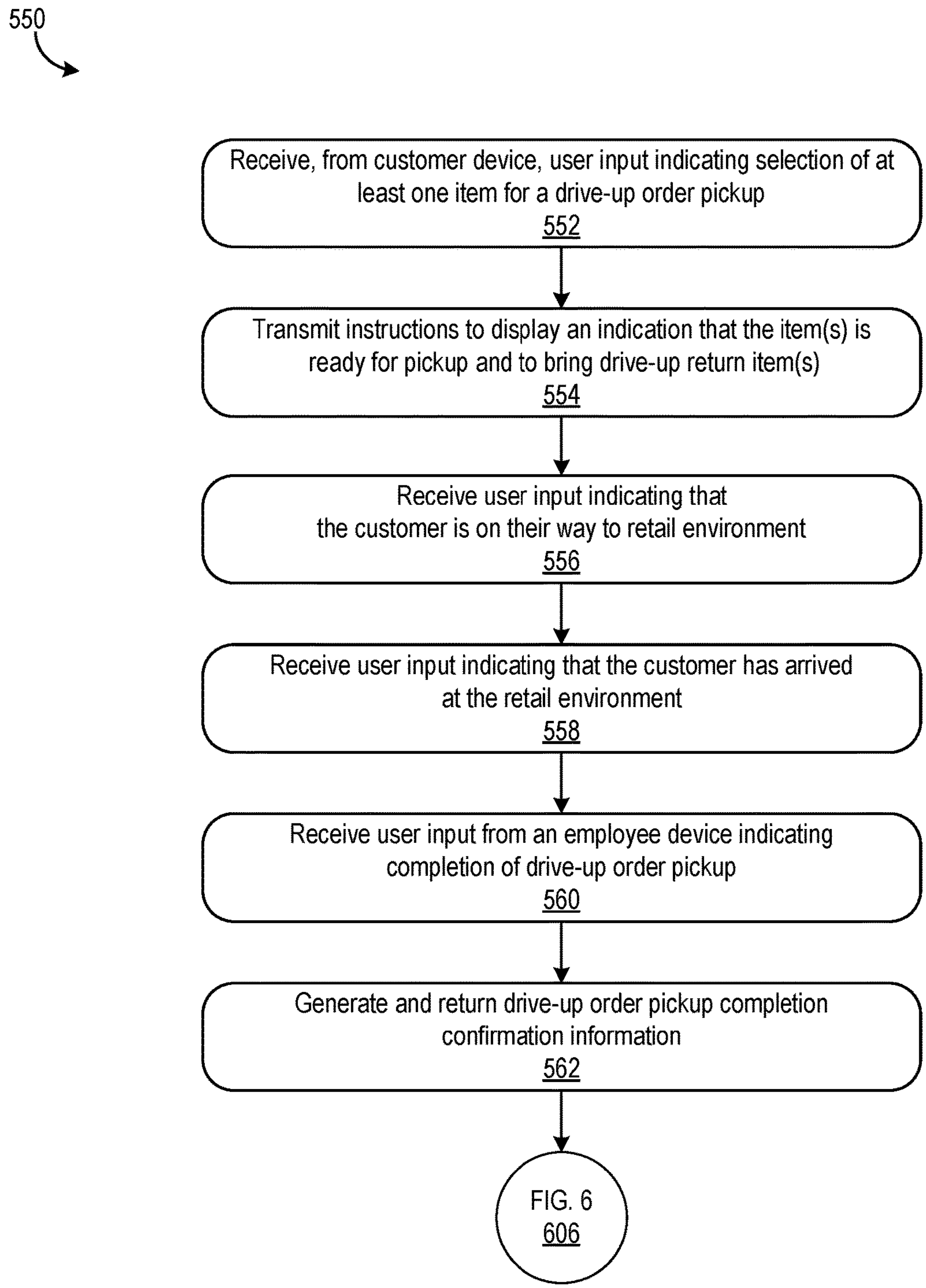
FIG. 5B is a flowchart of a process for performing a drive-up return and a drive-up order pickup at a same time for a customer.

FIG. 5B is a flowchart of a process 550 for performing a drive-up return and a drive-up order pickup at a same time for a customer. One or more blocks in the process 550 can be performed before, during, and/or after one or more blocks in the process 500 of FIG. 5 and/or process 600 described below in FIG. 6. For example, the customer can begin a drive-up return for a previously-made order at a first time (see the process 500 in FIG. 5A) and then begin a drive-up order pickup at a second time. As another example, the customer can first begin the drive-up order pickup and then initiate a drive-up return at some time after initiating the drive-up order pickup. In yet some implementations, the customer can begin the drive-up order pickup, go to the retail environment for the pickup, and while at the retail environment, initiate the drive-up return described in the process 500. In any of these examples, the drive-up return and the drive-up order pickup can be performed at a same time or otherwise in a same trip to the retail environment.

The process 550 can be performed by the server system 116 described in reference to FIG. 1. The process 550 can also be performed by one or more other servers, computing systems, cloud-based systems, computing devices, and/or network of devices and/or systems. For illustrative purposes, the process 550 is described from the perspective of a server system.

Referring to the process 550 in FIG. 5B, the server system can receive, from a customer device, user input indicating selection of at least one item for a drive-up order pickup (block 552).

The server system can transmit instructions to the customer device that, when executed by the customer device, cause the customer device to display an indication that the item(s) is ready for pickup (block 554). If the customer has already initiated a drive-up return as well, as described in reference to the process 500 in FIG. 5A, the instructions can also cause the customer device to present a reminder in the GUI display to bring at least one item for the drive-up return (block 554). Refer to at least FIGS. 2S and 2T for further discussion.

The server system may also receive user input from the customer device indicating that the customer is on their way to a retail environment where the order pickup and drive-up return are to be performed (block 556).

In block 558, the server system can receive user input from the customer device indicating that the customer has arrived at the retail environment. Information can then be presented at the customer device, such as an order confirmation number or other information that can be used by an employee to verify that the customer is the person expected to pick up the drive-up order. Refer to FIG. 2U for further discussion.

The server system can also receive user input from an employee device (e.g., the user device 120) indicating completion of the drive-up order pickup (block 560). The user input from the employee device can be received within some amount of time after the customer arrived at the retail environment.

Accordingly, the server system can generate and return drive-up order pickup completion confirmation information in block 562. This confirmation information can be transmitted to and presented in the GUI display of the customer device. This confirmation information can additionally or alternatively be transmitted to and presented at the employee device.

The server system can then proceed to block 606 in the process 600 of FIG. 6 in scenarios where the customer also has a drive-up return to be performed.

FIG. 6 is a flowchart of a process 600 for performing a drive-up return at a fulfillment location, such as a retail environment. The process 600 can be performed at some point in time after performing the process 500 in FIG. 5A. Sometimes, the process 600 can be performed immediately after the process 500, such as when a customer initiates a drive-up return with their customer device and then decides that they are going to begin their journey to the retail environment right away to complete the drive-up return. Sometimes, the process 600 can be performed some time after the process 500, so long as the process 600 is performed within a return timeframe/window that was determined for the drive-up return item(s) while the customer was initiating the drive-up return in the process 500.

The process 600 can be performed by the server system 116 described in reference to FIG. 1. The process 600 can also be performed by one or more other servers, computing systems, cloud-based systems, computing devices, and/or network of devices and/or systems. For illustrative purposes, the process 600 is described from the perspective of a server system.

Referring to the process 600 in FIG. 6, the server system can receive, from a customer device, user input indicating that a customer associated with the customer device is on their way to a retail environment where the drive-up return is to be completed (block 602). The user input can be received at a later time after the process 500 in FIG. 5A is performed. The later time can be within a threshold return-time-window. The threshold return-time-window can be 7 days since the customer provided the user input at the customer device to return the at least one item from the order. The threshold return-time-window can additionally or alternatively be an amount of days remaining in a return window for the at least one item (e.g., from a date that the item was purchased, from a date that the item was received by/delivered to the customer). The amount of days remaining in the return window can be counted from a time that the customer provided the user input at the customer device to return the at least one item from the order. Refer to at least FIGS. 2H, 2I, 2K, and/or 2L for further discussion.

Moreover, responsive to receiving, from the customer device, user input at the later time indicating that the customer is on their way to the retail environment for the drive-up return, the server system can transmit, to the customer device, instructions that, when executed by the customer device, cause the customer device to present a map with the retail environment in the GUI display of the customer device.

As described herein, the user input indicating that the customer is on their way may include an indication of a make and model of the vehicle of the customer and/or an indication of a location in the vehicle where the at least one item for the drive-up return is located. In some implementations, such vehicle information and/or item location information can be provided by the customer when initiating the drive-up return in the process 500 of FIG. 5A and/or when initiating a drive-up order pickup in the process 550 of FIG. 5B. In some implementations, the vehicle information and/or the item location information can be provided by the customer upon arrival at the retail environment. Refer to at least FIGS. 2J and 2M for further discussion.

The vehicle information and/or the item location information can be added, by the server system, to the temporary data file described in reference to the process 500 in FIG. 5A. The temporary data file can be used by the server system to provide information to an employee device for an employee who takes ownership of performing the drive-up return for the customer. As another example, responsive to receiving the user input in block 602, the server system can populate the temporary data file with information about the at least one item for the drive-up return that may include current location information associated with the customer device. The current location information can be used by the server system to determine an ETA for the customer, which can be provided to the employee device to help the respective employee prepare for the customer's arrival.

In block 604, the server system may receive, from the customer device, user input indicating that the customer has arrived at the retail environment. The user input indicating that the customer has arrived can include user input indicating a parking space or location outside the retail environment where the vehicle of the customer is parked. As described further below, the server system can transmit a notification to an employee device of an employee indicating that the customer has arrived at the retail environment. As a result, the employee can approach the customer's vehicle at the retail environment and perform a drive-up return process. Refer to at least FIGS. 2N, 2O, and 2P for further discussion.

Figure 7:
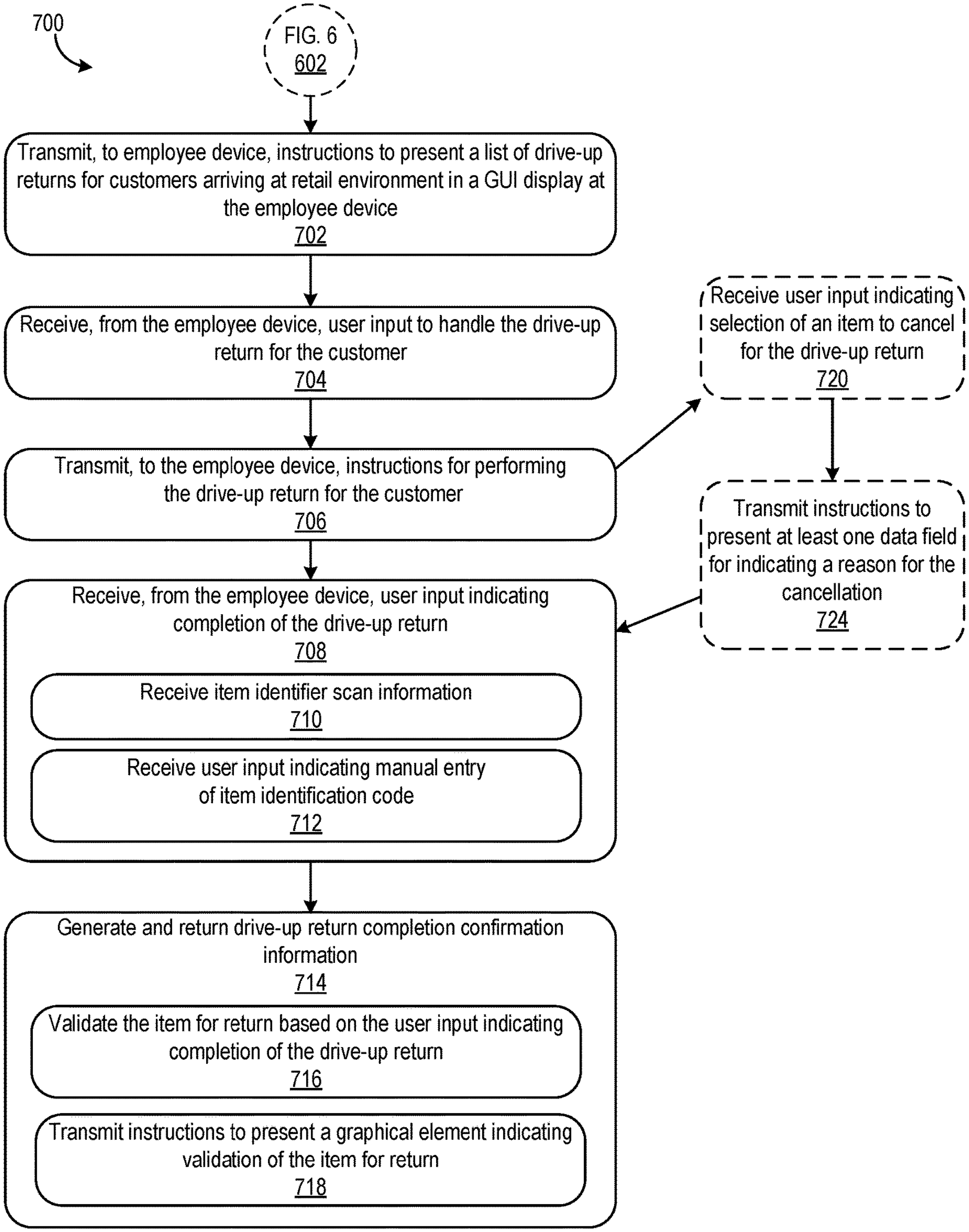
FIG. 7 is a flowchart of a process for performing a drive-up return at an employee user device.

The server system may then receive user input from the employee device indicating completion of the drive-up return of at least one item to be returned for the customer (block 606). This user input from the employee device can be received within some threshold amount of time since the customer arrived at the retail environment and/or the employee approached the customer's vehicle. After all, it can take some time from the employee to physically move from inside the retail environment to a designated parking spot outside the retail environment where the customer has parked their vehicle. Refer to FIG. 7 for further discussion about completing the drive-up return process from the perspective of the employee device.

In some implementations, as described above in reference to the process 550 in FIG. 5B, the server system can optionally generate and return the drive-up order pickup completion confirmation information (block 562), then perform block 606. Therefore, a drive-up order pickup process can first be performed at the customer's vehicle following by the drive-up return process. In some implementations, the drive-up return process can be performed first followed by the drive-up order pickup process.

After block 606, the server system can issue a refund to the customer's form of payment (block 608).

The server system can generate and return drive-up return completion confirmation information in block 610. The server system can return the confirmation information to the customer device. As another example, the server system can return the confirmation information to the employee device. The confirmation information can indicate that (i) the drive-up return for the at least one item is complete and/or (ii) the refund has been issued to a payment method of the customer. Moreover, returning, to the customer device, the return confirmation information can include returning instructions for presenting, in the GUI display at the customer device, a notification that displays at least one of (i) or (ii). The return confirmation information can be generated and returned to the customer device in real-time. Additionally or alternatively, the return confirmation information can be generated and returned to the customer device in near real-time before the customer leaves the retail environment. Refer to at least FIGS. 2Q and 2R for further discussion.

FIG. 7 is a flowchart of a process 700 for performing a drive-up return at an employee user device. The process 700 can be performed by the server system 116 described in reference to FIG. 1. The process 700 can also be performed by one or more other servers, computing systems, cloud-based systems, computing devices, and/or network of devices and/or systems. For illustrative purposes, the process 700 is described from the perspective of a server system.

Referring to the process 700 in FIG. 7, the server system can transmit, to the employee device, instructions to present a list of drive-up returns for customers arriving at the retail environment in a GUI display at the employee device (block 702). For example, the server system can transmit, to the employee device amongst a plurality of employee devices, a populated data file that, when processed by the employee device, causes the employee device to display a first GUI including a list of drive-up returns for customers arriving at the retail environment. The list of drive-up returns can include a drive-up return for at least one item of a particular customer at their customer device, such as the customer described in the processes of FIGS. 5-6. The data file can be the temporary data file that is populated by the server system as described in reference to the processes 500 and 600 in FIGS. 5A and 6. In some implementations, the populated data file can be transmitted to the employee device upon employee selection of a control to take ownership of the particular customer's drive-up return. Refer to at least FIGS. 3A and 3B for further discussion.

Optionally, block 702 can be performed in response to the server system performing block 602 in the process 600 of FIG. 6 (e.g., receiving, from a customer device, user input indicating that the customer is on their way to the retail environment).

The server system can receive, from the employee device, user input indicating the employee's desire to handle (e.g., take ownership of) the drive-up return for the customer (block 704). For example, the server system can receive, from the employee device, user selection of a first control in the first GUI indicating an intention to handle, from the list of drive-up returns, the drive-up return for the at least one item of the customer at the customer device. Refer to at least FIG. 3C for further discussion.

The server system can transmit, to the employee device, instructions for performing the drive-up return for the customer (block 706). These instructions can be transmitted to the employee device before the server system receives an indication from the customer device that the customer has arrived at the retail environment. In some implementations, these instructions can be transmitted after receiving the indication of the customer's arrival (and within some threshold amount of time before or after the customer arrives so that the customer does not wait for an extended period of time for the drive-up return to be completed). Refer to at least FIG. 3D for further discussion.

The instructions provided in block 706 can cause the employee device to display a second GUI, the second GUI including instructions for the employee at the employee device to perform the drive-up return for the at least one item at the vehicle of the customer. Refer to at least FIG. 3D for further discussion.

Optionally, the server system can receive user input indicating selection of an item to cancel for the drive-up return (block 720). The user input can come from the employee device, based on the employee's inspection of the item and determination the the item cannot be returned. The employee may also provide this user input at their device if the customer does not have the item to be returned. As another example, and as described in reference to the process 600 in FIG. 6, the user input can also be received from the customer device when the customer decides that they no longer want to return the item and/or they did not bring the item with them to the retail environment.

For example, the server system can receive, from the employee device, user input indicating selection of a graphical element presented with a visual indication of the at least one item presented in the second GUI indicating a cancellation of the drive-up return of the at least one item. The graphical element can be a trashcan.

Still referring to block 720, the server system can optionally transmit instructions to the employee device to present at least one data field for indicating a reason for the cancellation (block 724). For example, the server system can provide, to the employee device, instructions that, when executed, cause the employee device to present a pop-out window visually overlaying a portion of the second GUI, the pop-out window including at least one data field for user input indicating a reason for the cancellation of the drive-up return of the at least one item. After the employee provides the user input, the server system can then proceed to block 708. Refer to at least FIGS. 3K, 3L, 3M, 3N, 3O, and 3P for further discussion about performing and completing drive-up returns in which at least one item is cancelled or otherwise removed from the drive-up return.

Instead of or in addition to performing blocks 720-724, the server system can perform block 708, in which the server system receives, from the employee device, user input indicating completion of the drive-up return. For example, the server system can receive, from the employee device, item identification scan information (block 710). As another example, the server system can receive, from the employee device, user input indicating manual entry of an item identification code for the item in the drive-up return (block 712). Therefore, performing the drive-up return for the at least one item can include at least one of (i) scanning, using a scanning device of the employee device, an item identifier for the at least one item and/or (ii) receiving, from the employee device, user input indicating manual entry of an item identification code for the at least one item. Refer to at least FIGS. 3E, 3F, 3G, 3H, and 3I for further discussion.

The server system can generate and return drive-up return completion confirmation information in block 714. For example, the server system can validate the item for return based on the user input indicating completion of the drive-up return (block 716). As another example, the server system can transmit instructions to the employee device to present a graphical element indicating validation of the item for return (block 718). More specifically, the server system can provide, to the employee device, instructions that, when executed, cause the employee device to output a graphical element as partially overlaying a visual indication of the at least one item presented in the second GUI indicating that the at least one item is validated. The item can be validated based on the employee scanning the item identifier for the item and/or manually entering the item identification code for the item at the employee device. The graphical element can be a checkmark. Refer to at least FIGS. 3H, 3I, and 3J for further discussion.

The confirmation information can indicate that (i) the drive-up return for the at least one item is complete and/or (ii) a refund has been issued to a payment method of the customer. Returning, for example, the return confirmation information to the customer device can include returning instructions for presenting, in a GUI display at the customer device, a notification that displays at least one of (i) or (ii).

Figure 8A:
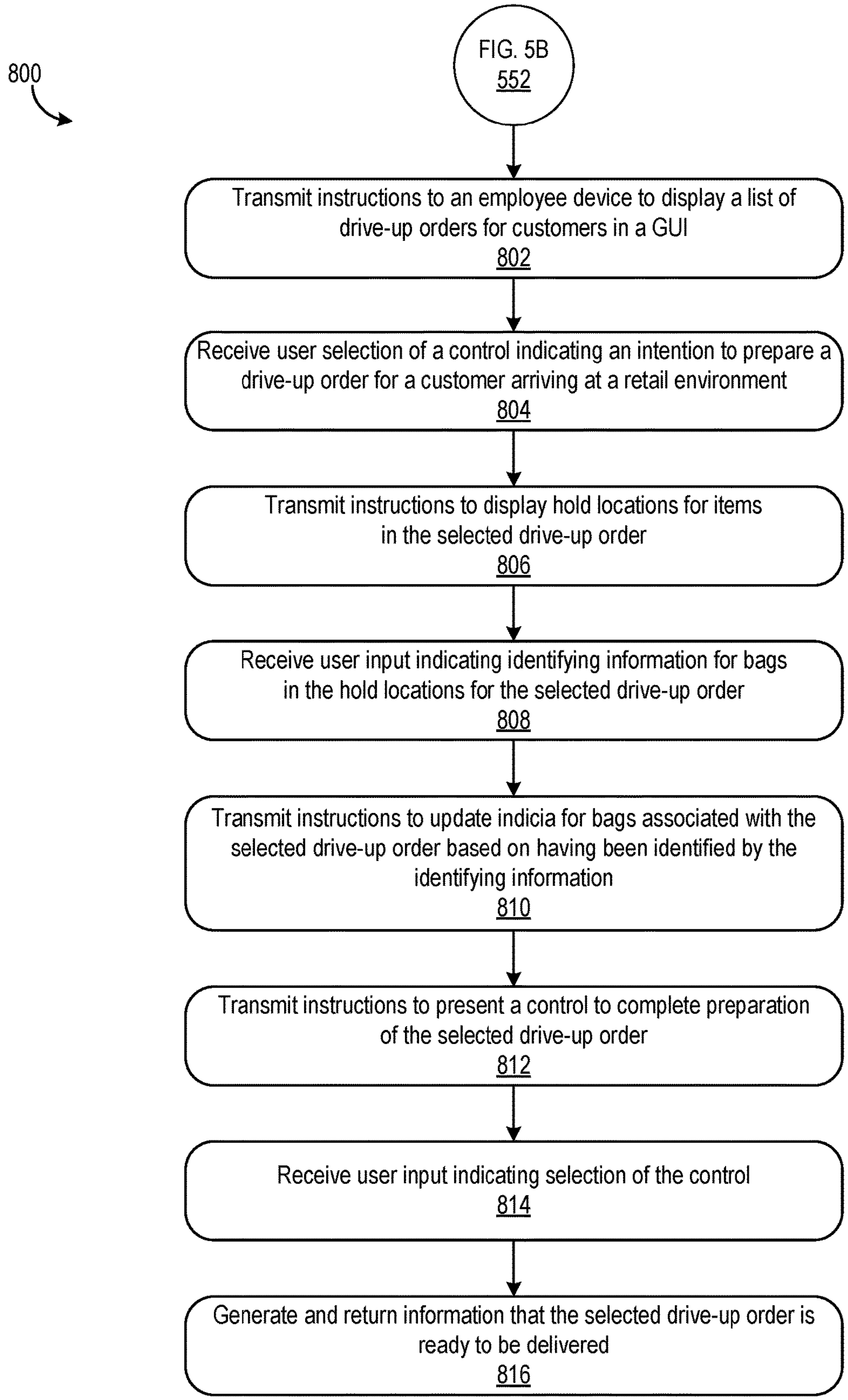
FIG. 8A is a flowchart of a process for preparing a drive-up order at an employee user device.

FIG. 8A is a flowchart of a process 800 for preparing a drive-up order at an employee user device. The process 800 can be performed once the server system 116 described herein receives user input from a customer device indicating that the customer has placed a drive-up order. Refer to the process 550 in FIG. 5B for further discussion.

The process 800 can be performed by the server system 116 described in reference to FIG. 1. The process 800 can also be performed by one or more other servers, computing systems, cloud-based systems, computing devices, and/or network of devices and/or systems. For illustrative purposes, the process 800 is described from the perspective of a server system.

Referring to the process 800 in FIG. 8A, the process 800 can begin in response to block 552 in the process 550 of FIG. 5B, in which the server system receives, from a customer device, user input indicating selection of at least one item for a drive-up order pickup.

The server system can then transmit instructions to at least one employee device amongst a plurality of employee devices to display a list of drive-up orders for customers in a GUI presented at the employee device (block 802). For example, the server system can provide, to the employee device, instructions that, when processed by the employee device, cause the employee device to display a GUI including a list of drive-up orders for customers arriving at the retail environment. The list of drive-up orders can include the drive-up order for the particular customer at the customer device.

The server system can receive, from the employee device, user selection of a control presented in the GUI indicating an intention of the employee to prepare, from the list of drive-up orders, a particular drive-up order for a customer arriving at a retail environment, such as the particular customer at the customer device mentioned above (block 804).

The server system transmits, to the employee device, instructions that, when executed by the employee device, cause the employee device to display in a GUI one or more hold locations for items in the selected drive-up order (block 806). More particularly, the instructions can cause the employee device to display the hold locations in retail information and one or more bags associated with each of the hold locations for the selected drive-up order to be prepared.

The server system then can receive, from the employee device, user input indicating identifying information for the bags in the hold locations for the selected drive-up order (block 808).

Next, the server system can transmit instructions to the employee device to cause the employee device to update indicia presented in the GUI for the bags associated with the selected drive-up order based on having been identified by the identifying information (block 810). For example, the indicia can be updated from a first indicia to a second indicia based on the respective associated bag having been identified by the identifying information.

The server system can transmit, to the employee device, instructions to present a control (e.g., selectable option, button) to complete preparation of the selected drive-up order (block 812). These instructions can be transmitted to the employee device based on determining, by the server system, that the identifying information for each bag associated with the selected drive-up order has been received by the server system.

The server system can also receive, from the employee device, user input indicating selection of the control to complete the preparation in block 814.

Accordingly, the server system can generate and return information that the selected drive-up order is ready to be delivered to the customer upon their arrival at the retail environment (block 816).

Figure 8B:
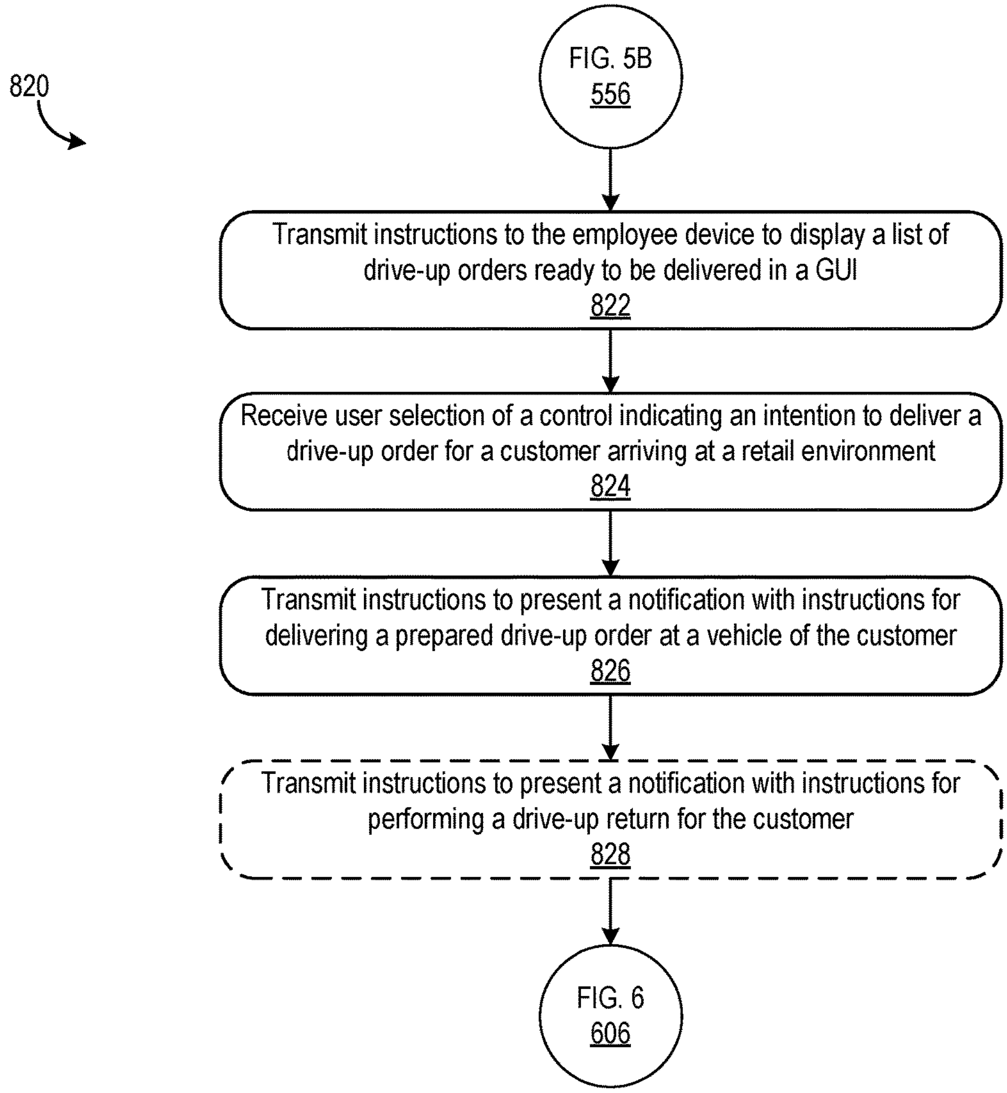
FIG. 8B is a flowchart of a process for delivering a drive-up order.

FIG. 8B is a flowchart of a process 820 for delivering a drive-up order. The process 820 can be performed whenever a customer indicates at their device that they are on their way to a retail environment for a drive-up order pickup. The process 820 can be performed by the server system 116 described in reference to FIG. 1. The process 820 can also be performed by one or more other servers, computing systems, cloud-based systems, computing devices, and/or network of devices and/or systems. For illustrative purposes, the process 820 is described from the perspective of a server system.

Referring to the process 820 in FIG. 8B, the process 820 can begin in response to block 556 in the process 550 of FIG. 5B, in which the server system receives, from a customer device, user input indicating that the customer is on their way to a retail environment.

Then, the server system can transmit instructions to an employee device, such as the employee device described in the process 800 of FIG. 8A, to display a list of drive-up orders ready to be delivered in a GUI display presented at the employee device (block 822). In some implementations, the instructions can be transmitted to another employee device amongst a plurality of employee devices in the retail environment. For example, the server system can provide, to each of at least a subset of the plurality of employee devices, information that, when processed by each of the at least the subset of the plurality of employee devices, causes each of the at least the subset of the plurality of employee devices to display the GUI with a list of drive-up orders ready to be delivered.

The server system can receive, from the employee device, user selection of a control indicating an intention of the employee to deliver a prepared drive-up order for the customer arriving at the retail environment (block 824).

Accordingly, the server system transmits, to the employee device, instructions that cause the employee device to present a notification with instructions for delivering a prepared drive-up order at a vehicle of the customer (block 826). Sometimes, the server system can also provide, to each of the subset of the plurality of employee devices, instructions to update the GUI to include an indication that the prepared drive-up order for the customer is being delivered by the employee at the employee device of the subset of the plurality of employee devices. As a result, no other employees at the plurality of employee devices can try to take ownership of completing the drive-up order for the customer.

Optionally, the server system can transmit, to the employee device, instructions to present a notification with instructions for performing a drive-up return for the customer (block 828). The instructions can, for example, include instructions for (i) delivering the prepared drive-up order at the vehicle of the customer and/or (ii) performing the drive-up return for at least one item at a same time for the customer.

The server system can then proceed to block 606 in the process 600 of FIG. 6, in which the server system receives user input from the employee device indicating completion f the drive-up return for the customer. The server system can then proceed through the remaining blocks in the process 60 of FIG. 6.

Figure 9:
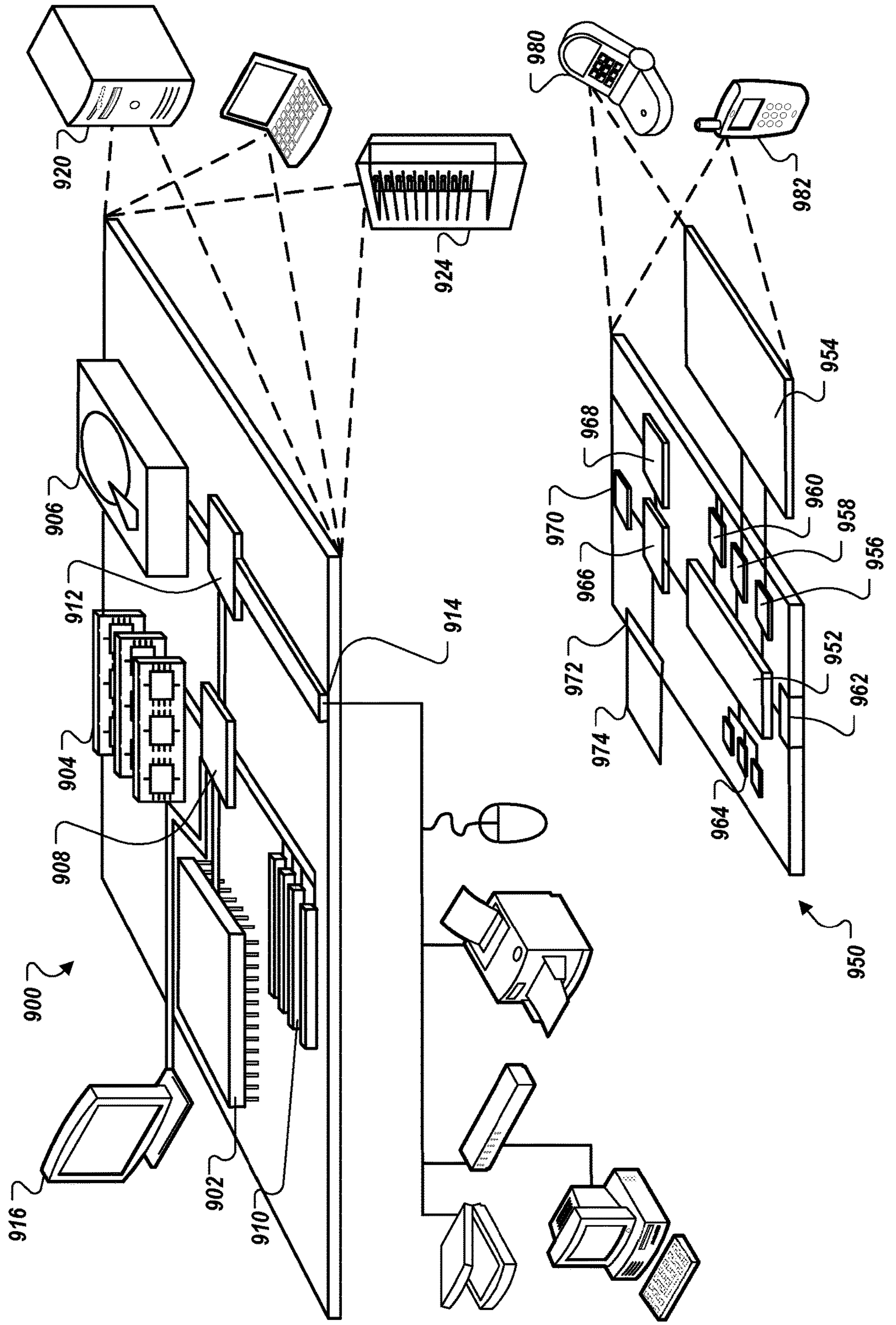
FIG. 9 is a schematic diagram that shows an example of a computing device and a mobile computing device.

FIG. 9 shows an example of a computing device 900 and an example of a mobile computing device that can be used to implement the techniques described here. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the computing device 900. In some implementations, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication in some implementations, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for completing drive-up returns and drive-up orders to customers at a retail environment, the system comprising:

a computing system having processors and memory, wherein the computing system is in communication with a plurality of customer devices and a plurality of employee devices using one or more networks, the computing system being configured to perform operations comprising:

receiving, from a customer device of the plurality of customer devices, user input indicating selection of at least one item to return from an order, wherein the user input includes selection of a drive-up return for the at least one item;

receiving, from the customer device, user input indicating that the same customer placed a drive-up order, wherein the drive-up order includes one or more items that do not include the at least one item of the drive-up return;

generating a temporary data file to contain information that includes (i) the at least one item for the drive-up return, (ii) drive-up order information, and (iii) customer information associated with the customer device;

receiving, from the customer device, user input at a later time indicating that a customer associated with the customer device is on their way to the retail environment for the drive-up return and the drive-up order, wherein the later time is within a threshold return-time-window;

populating the temporary data file with the information, wherein the information includes current location information associated with the customer device;

transmitting, by the computing system over the network, communications to at least one employee device that cause the employee device to provide output including changes to a visual display corresponding to a graphical user interface presented at the employee device;

transmitting, to a first employee device of the plurality of employee devices, the populated data file that, when processed by the first employee device, causes the first employee device to display a first graphical user interface (GUI) including a list of drive-up returns and drive-up orders for customers arriving at the retail environment, wherein the list of drive-up returns and drive-up orders includes the drive-up return for the at least one item and the drive-up order of the same customer at the customer device;

providing, to the plurality of employee devices, information that when processed by the computing system causes the employee devices to present updated information regarding drive-up return activities and drive-up order fulfillment activities;

receiving, from the first employee device, user selection of a first control in the first GUI indicating an intention to handle, from the list of drive-up returns, the drive-up return for the at least one item and intention to prepare the drive-up order of the same customer at the customer device;

receiving, from the customer device, user input indicating that the customer has arrived at the retail environment based on the customer interacting with the customer device by selecting an option indicating that the customer has arrived in a designated parking location;

determining, by the computing system, that the customer device is located within a geofenced arrival region of the retail environment based on (i) location data obtained from the customer device and (ii) sensor data obtained from a scanning device at a fulfillment location;

detecting, by the computing system, a match between the customer device and the temporary data file based on the obtained data;

triggering, responsive to the determining and the detected match, generation of updated GUI instruction sets that the computing system pushes in real time to one or more employee devices without requiring additional user confirmation or manual refresh at the customer device such that information presented at the employee devices is updated in real-time or near real-time to reflect a status of drive-up return activities and drive-up order fulfillment activities, the updated GUI instruction sets causing automatic updates of a second GUI and a third GUI into arrival-ready states for concurrent drive-up return and drive-up order processing;

responsive to receiving the user input indicating that the customer has arrived at the retail environment, providing, to the first employee device, instructions that cause the first employee device to display the second GUI and the third GUI, the second GUI including instructions for the employee at the first employee device to scan identifiers for items to be returned to perform the drive-up return for the at least one item at vehicle of the customer, and the third GUI including instructions for (i) delivering the prepared drive-up order at the vehicle of the customer and (ii) performing the drive-up return for the at least one item at a same time as (i), wherein the providing comprises:

displaying, in the second GUI, a graphical element partially overlaying a visual indication of the at least one item to indicate that the item has been validated;

receiving, from the first employee device, user input indicating completion of the drive-up return for the at least one item and the drive-up order for the same customer; generating return confirmation information indicating that (iii) the drive-up return for the at least one item is complete, (iv) a refund has been issued to a payment method of the customer, and (v) the drive-up order has been fulfilled; and providing, to the customer device, the return confirmation information that includes instructions for presenting, in a GUI display at the customer device, a notification that displays at least one of (iii), (iv), or (v).

2. The system of claim 1, wherein the order is an in-store order performed at a physical retail environment having a relationship with the retail environment.

3. The system of claim 1, wherein the threshold return-time-window is an amount of days remaining in a return window for the at least one item, wherein the amount of days remaining in the return window is counted from a time that the customer provided the user input at the customer device to return the at least one item from the order.

4. The system of claim 1, wherein the operations further comprise: determining an estimated arrival time of the customer based on at least one of (i) the current location information in the temporary data file or (ii) sensor data received from the scanning device at the fulfillment location.

5. The system of claim 1, wherein performing the drive-up return for the at least one item comprises at least one of (i) scanning, using a scanning device of the first employee device, an item identifier for the at least one item or (ii)

receiving, from the first employee device, user input indicating manual entry of an item identification code for the at least one item.

6. The system of claim 5, the operations further comprising:

providing, to the first employee device, instructions that, when executed, cause the first employee device to output a graphical element as partially overlaying a visual indication of the at least one item presented in the second GUI indicating that the at least one item is validated based on at least one of (i) or (ii).

7. The system of claim 1, the operations further comprising:

receiving, from the first employee device, user input indicating selection of a graphical element presented with a visual indication of the at least one item presented in the second GUI indicating a cancellation of the drive-up return of the at least one item; and providing, to the first employee device, instructions that, when executed, cause the first employee device to present a pop-out window visually overlaying a portion of the second GUI, the pop-out window including at least one data field for user input indicating a reason for the cancellation of the drive-up return of the at least one item.

8. The system of claim 1, the operations further comprising:

providing, to the first employee device, instructions that, when processed by the first employee device, causes the first employee device to display the third GUI including a list of drive-up orders for customers arriving at the retail environment, wherein the list of drive-up orders includes the drive-up order for the customer at the customer device;

receiving, from the first employee device, user selection of a control in the third GUI indicating an intention to prepare, from the list of drive-up orders, the drive-up order for the customer at the customer device;

providing, to the first employee device, instructions that, when processed by the first employee device, cause the first employee device to display a fourth GUI, the fourth GUI including indications of one or more order hold locations in retail information and one or more bags associated with each of the one or more order hold locations for the selected drive-up order to be prepared;

receiving, from the first employee device, user input indicating identifying information for one or more of the bags associated with the drive-up order;

providing, to the first employee device, instructions to update the fourth GUI such that, for each bag associated with the drive-up order to be prepared, the indication is updated from a first indicia to a second indicia based on the respective associated bag having been identified by the identifying information; and providing, to the first employee device, instructions to update the fourth GUI to include a selectable option to complete the preparing of the drive-up order based on a determination that the identifying information for each bag associated with the drive-up order has been received by the computing system.

9. The system of claim 8, the operations further comprising:

providing, to each of at least a subset of the plurality of employee devices, information that, when processed by each of the at least the subset of the plurality of employee devices, causes each of the at least the subset of the plurality of employee devices to display the third GUI with a list of drive-up orders ready to be delivered;

receiving, from a first employee device of the subset of the plurality of employee devices, an indication of user selection of a control in the third GUI indicating an intention to deliver the prepared drive-up order for the customer; and providing, to each of the subset of the plurality of employee devices, instructions to update the third GUI to include an indication that the prepared drive-up order for the customer is being delivered by an employee at the first employee device of the subset of the plurality of employee devices.

10. The system of claim 9, wherein the first employee device of the subset of the plurality of employee devices is the same as the first employee device of the plurality of employee devices.

11. The system of claim 1, wherein the current location information includes information provided as user input at the customer device, the information provided as the user input including a make and model of the vehicle of the customer, a location in the vehicle from which to pick up the at least one item for the drive-up return.

12. A system for completing drive-up returns and drive-up orders to customers at a retail environment, the system comprising:

a computing system having processors and memory, wherein the computing system is in communication with a plurality of customer devices and a plurality of employee devices using one or more networks, the computing system being configured to perform operations comprising:

transmitting, to a customer device of the plurality of customer devices, first instructions that, when executed by the customer device, cause the customer device to display a list of past orders in a graphical user interface (GUI) display at the customer device;

receiving, from the customer device, user input indicating selection of at least one item to return from an order presented in the list of past orders, wherein the user input includes selection of a drive-up return option for the at least one item;

receiving, from the customer device, user input indicating that the same customer placed a drive-up order, wherein the drive-up order includes one or more items that do not include the at least one item of the drive-up return;

transmitting, by the computing system over the network, communications to at least one employee device that cause the employee device to provide output including changes to a visual display corresponding to a graphical user interface presented at the employee device;

transmitting, to the customer device, second instructions that, when executed by the customer device, cause the customer device to display return questions in the GUI display for the at least one item selected for the drive-up return;

providing, to the plurality of employee devices, information that when processed by the computing system causes the employee devices to present updated information regarding drive-up return activities and drive-up order fulfillment activities;

receiving, from the customer device, user input indicating responses to the return questions;

generating a temporary data file that contains the user input that includes (i) the responses to the return questions, (ii) drive-up order information, and (iii) customer information associated with the customer device;

receiving, from the customer device, user input at a later time indicating that a customer associated with the customer device is on their way to the retail environment for the drive-up return and the drive-up order, wherein the later time is within a threshold return-time-window;

receiving, from the customer device, user input indicating that the customer has arrived at the retail environment for the drive-up return and the drive-up order based on the customer interacting with the customer device by selecting an option indicating that the customer has arrived in a designated parking location;

determining, by the computing system, that the customer device is located within a geofenced arrival region of the retail environment based on (i) location data obtained from the customer device and (ii) sensor data obtained from a scanning device at a fulfillment location;

detecting, by the computing system, a match between the customer device and the temporary data file based on the obtained data;

triggering, responsive to the determining and the detected match, generation of updated GUI instruction sets that the computing system pushes in real time to one or more employee devices without requiring additional user confirmation or manual refresh at the customer device such that information presented at the employee devices is updated in real-time or near real-time to reflect a status of drive-up return activities and drive-up order fulfillment activities, the updated GUI instruction sets causing automatic updates of a second GUI and a third GUI into arrival-ready states for concurrent drive-up return and drive-up order processing;

responsive to receiving user input from an employee device of the plurality of employee devices indicating completion of the drive-up return for the at least one item at a vehicle of the customer after the customer arrived at the retail environment, generating return confirmation information indicating that (i) the drive-up return for the at least one item is complete, (ii) a refund has been issued to a payment method of the customer, and (iii) the drive-up order for the same customer has been fulfilled; and providing, to the customer device, the return confirmation information that includes instructions for presenting, in the GUI display at the customer device, a notification that displays at least one of (i), (ii), or (iii).

13. The system of claim 12, wherein the operations further comprise:

responsive to the customer device presenting the list of past orders in the GUI display, receiving, from the customer device, user input indicating selection of the order presented in the list of past orders;

transmitting, to the customer device, instructions that, when executed by the customer device, cause the customer device to present a list of items associated with the selected order in the GUI display; and receiving, from the customer device, user input indicating selection of the at least one item to return from the list of items presented in the GUI display.

14. The system of claim 12, wherein the operations further comprise: responsive to receiving the user input indicating selection of the at least one item to return from the order presented in the list of past orders, transmitting instructions that, when executed by the customer device, cause the customer device to present a list of selectable return options in the GUI display, the list of selectable return options including the drive-up return option, an in-store return option, and a mail-in return option.

15. The system of claim 12, wherein the operations further comprise:

responsive to receiving, from the customer device, user input indicating responses to the return questions, transmitting, to the customer device, return information for presentation in the GUI display; and receiving, from the customer device, user input indicating confirmation of the return information.

16. The system of claim 12, wherein the operations further comprise: responsive to receiving, from the customer device, user input at a later time indicating that the customer is on their way to the retail environment for the drive-up return, transmitting, to the customer device, instructions that, when executed by the customer device, cause the customer device to present a map with the retail environment in the GUI display of the customer device.

17. The system of claim 12, wherein the operations further comprise: receiving, from the customer device, user input indicating selection of an item for a drive-up order pickup; transmitting, to the customer device, instructions that, when executed by the customer device, cause the customer device to present, in the GUI display, (i) an indication that the item is ready for the drive-up order pickup and (ii) a reminder to bring the at least one item for the drive-up return.

18. The system of claim 12, wherein the operations further comprise: receiving, from the customer device, user input indicating cancellation of the drive-up return for the at least one item; and deleting the temporary data file responsive to receiving the user input.

19. The system of claim 12, wherein the temporary data file further includes current location information associated with the customer device.

* * * * *